(12) United States Patent
Mishima et al.

(10) Patent No.: US 7,932,015 B2
(45) Date of Patent: Apr. 26, 2011

(54) OPTICAL RECORDING MEDIUM

(75) Inventors: Koji Mishima, Tokyo (JP); Hiroyasu Inoue, Tokyo (JP); Tsuyoshi Komaki, Tokyo (JP); Daisuke Yoshitoku, Tokyo (JP); Hitoshi Arai, Tokyo (JP); Kenji Yamaga, Tokyo (JP); Hironori Kakiuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 1031 days.

(21) Appl. No.: 10/748,979

(22) Filed: Dec. 30, 2003

(65) Prior Publication Data
US 2004/0152016 A1 Aug. 5, 2004

(30) Foreign Application Priority Data

| Jan. 8, 2003 | (JP) | 2003-001753 |
| Oct. 2, 2003 | (JP) | 2003-344865 |
| Oct. 2, 2003 | (JP) | 2003-344866 |
| Nov. 28, 2003 | (JP) | 2003-398736 |
| Nov. 28, 2003 | (JP) | 2003-398737 |

(51) Int. Cl.
*G11B 7/24* (2006.01)

(52) U.S. Cl. ............... 430/270.12; 430/945; 369/284

(58) Field of Classification Search ............ None
See application file for complete search history.

(56) References Cited

U.S. PATENT DOCUMENTS

| 3,959,799 A | 5/1976 | Gambino et al. | 346/135 |
| 4,357,616 A | 11/1982 | Terao et al. | 346/135.1 |
| 4,405,706 A * | 9/1983 | Takahashi et al. | 430/270.12 |
| 4,477,819 A | 10/1984 | Lee et al. | 346/76 L |
| 4,500,889 A * | 2/1985 | Wada et al. | 347/262 |
| 4,529,991 A * | 7/1985 | Wada et al. | 355/31 |
| 4,587,533 A | 5/1986 | Nakane et al. | 346/135.1 |
| 4,609,611 A * | 9/1986 | Sigyo et al. | 430/270.12 |
| 4,647,947 A | 3/1987 | Takeoka | 346/135.1 |
| 4,670,345 A | 6/1987 | Morimoto | 428/411.1 |

(Continued)

FOREIGN PATENT DOCUMENTS

EP 1 122 723 A1 8/2001

(Continued)

OTHER PUBLICATIONS

Translation of JP 54-133134.*

(Continued)

*Primary Examiner* — Martin J Angebranndt
(74) *Attorney, Agent, or Firm* — Seed IP Law Group PLLC

(57) ABSTRACT

An optical recording medium includes a substrate and a plurality of recording layers laminated via at least intermediate layers, at least one of the recording layers other than a recording layer farthest from a light incidence plane among the plurality of recording layers containing at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M. According to the thus constituted optical recording medium, it is possible to record data in and reproduce from a farthest recording layer from a light incidence plane in a desired manner and it is possible to record data in and reproduce from recording layer(s) other than the farthest recording layer from the light incidence plane in a desired manner.

13 Claims, 10 Drawing Sheets

U.S. PATENT DOCUMENTS

| | | | | |
|---|---|---|---|---|
| 4,682,321 A | * | 7/1987 | Takaoka et al. | 369/284 |
| 4,771,413 A | | 9/1988 | Nago | 369/109 |
| 4,772,897 A | | 9/1988 | Ohkawa | 346/135.1 |
| 5,194,363 A | | 3/1993 | Yoshioka et al. | 430/271 |
| 5,208,088 A | | 5/1993 | Tominaga et al. | 428/64 |
| 5,297,132 A | | 3/1994 | Takano et al. | 369/284 |
| 5,325,351 A | | 6/1994 | Uchiyama et al. | 369/275.1 |
| 5,328,813 A | | 7/1994 | Strandjord et al. | 430/321 |
| 5,401,330 A | | 3/1995 | Saito et al. | 136/259 |
| 5,414,451 A | | 5/1995 | Sugiyama et al. | 347/258 |
| 5,458,941 A | | 10/1995 | Hintz | 428/64.4 |
| 5,459,018 A | * | 10/1995 | Akahira | 430/270.12 |
| 5,656,370 A | | 8/1997 | Murakami et al. | 428/332 |
| 5,871,881 A | * | 2/1999 | Nishida et al. | 430/270.11 |
| 5,912,104 A | | 6/1999 | Hirotsune et al. | 430/270.13 |
| 5,948,496 A | | 9/1999 | Kinoshita et al. | 428/64.1 |
| 6,033,752 A | | 3/2000 | Suzuki et al. | 428/64.1 |
| 6,096,399 A | | 8/2000 | Yoshinari et al. | 428/64.1 |
| 6,111,851 A | | 8/2000 | Ohki et al. | 369/286 |
| 6,143,469 A | | 11/2000 | Ohta et al. | 430/270.13 |
| 6,210,860 B1 | | 4/2001 | Fukano et al. | 430/270.12 |
| 6,231,945 B1 | | 5/2001 | Miyamoto et al. | 429/64.1 |
| 6,254,966 B1 | | 7/2001 | Kondo | 428/156 |
| 6,266,299 B1 | | 7/2001 | Oshima et al. | 369/13 |
| 6,333,913 B1 | | 12/2001 | Yoshinari et al. | 369/283 |
| 6,355,326 B1 | | 3/2002 | Lee et al. | 428/64.1 |
| 6,449,239 B1 | | 9/2002 | Uno et al. | 369/275.1 |
| 6,551,679 B1 | | 4/2003 | Kuroda et al. | 428/64.1 |
| 6,608,799 B2 | | 8/2003 | Hozumi | 369/13.26 |
| 6,636,477 B1 | | 10/2003 | Miyamoto et al. | 369/286 |
| 6,656,559 B2 | | 12/2003 | Mizushima et al. | 428/64.1 |
| 6,660,451 B1 | | 12/2003 | Sakaue et al. | 430/270.13 |
| 6,670,014 B2 | | 12/2003 | Nishihara et al. | 428/64.1 |
| 6,699,591 B2 | | 3/2004 | Ishida et al. | 428/641 |
| 6,741,547 B2 | | 5/2004 | Tomura et al. | 369/275.4 |
| 6,788,635 B1 | | 9/2004 | Aratani et al. | 369/100 |
| 6,805,935 B2 | | 10/2004 | Ashida et al. | 428/64.1 |
| 6,807,142 B1 | | 10/2004 | Nagata et al. | 369/275.2 |
| 6,821,707 B2 | | 11/2004 | Uno et al. | 430/270.13 |
| 6,841,218 B2 | | 1/2005 | Hosoda et al. | 428/64.1 |
| 6,929,840 B2 | | 8/2005 | Hosoda et al. | 428/64.1 |
| 6,982,111 B2 | | 1/2006 | Mizushima et al. | 428/64.1 |
| 7,002,887 B2 | | 2/2006 | Kakiuchi et al. | 369/5.12 |
| 7,154,844 B2 | | 12/2006 | Usami | 369/286 |
| 2001/0012257 A1 | | 8/2001 | Suzuki et al. | 369/94 |
| 2001/0021160 A1 | | 9/2001 | Shuy et al. | 369/100 |
| 2001/0044002 A1 | | 11/2001 | Shingai et al. | 428/64.4 |
| 2001/0044073 A1 | | 11/2001 | Fukano et al. | 430/270.12 |
| 2002/0060979 A1 | | 5/2002 | Tsukuda et al. | 369/275.4 |
| 2002/0076646 A1 | | 6/2002 | Zhou et al. | 430/270.13 |
| 2002/0110063 A1 | | 8/2002 | Yamada et al. | 369/47.39 |
| 2003/0086359 A1 | | 5/2003 | Lee et al. | 369/275.3 |
| 2003/0165111 A1 | | 9/2003 | Flynn | 369/288 |
| 2003/0190551 A1 | | 10/2003 | Aoshima et al. | 430/270.12 |
| 2003/0202452 A1 | | 10/2003 | Mishima et al. | 369/112.23 |
| 2003/0224215 A1 | | 12/2003 | Kondo et al. | 429/694 ML |
| 2004/0001418 A1 | | 1/2004 | Shinotsuka et al. | 369/111 |
| 2004/0013069 A1 | | 1/2004 | Uno et al. | 369/59.11 |
| 2004/0018334 A1 | * | 1/2004 | Nee | 428/64.1 |
| 2004/0027652 A1 | * | 2/2004 | Erdogan et al. | 359/359 |
| 2004/0027973 A1 | | 2/2004 | Aoshima et al. | 369/121 |
| 2004/0038080 A1 | | 2/2004 | Inoue et al. | 428/694 SC |
| 2004/0052194 A1 | | 3/2004 | Inoue et al. | 369/112.23 |
| 2004/0076907 A1 | | 4/2004 | Inoue et al. | 430/270.12 |
| 2004/0110086 A1 | | 6/2004 | Kakiuchi et al. | 430/270.12 |
| 2004/0152016 A1 | | 8/2004 | Mishima et al. | 430/270.12 |
| 2004/0157158 A1 | | 8/2004 | Kakiuchi et al. | 430/270.12 |
| 2004/0174804 A1 | | 9/2004 | Kakiuchi et al. | 369/275.4 |
| 2004/0191685 A1 | | 9/2004 | Kakiuchi et al. | 430/270.11 |
| 2004/0202097 A1 | * | 10/2004 | Oyake et al. | 369/283 |
| 2004/0241581 A1 | | 12/2004 | Kakiuchi et al. | 430/270.12 |
| 2005/0018590 A1 | | 1/2005 | Inoue et al. | 369/275.2 |
| 2005/0018591 A1 | | 1/2005 | Inoue et al. | 369/275.2 |
| 2005/0018592 A1 | | 1/2005 | Inoue et al. | 369/275.2 |
| 2005/0047301 A1 | | 3/2005 | Inoue et al. | 369/94 |
| 2005/0047302 A1 | | 3/2005 | Inoue et al. | 369/94 |
| 2005/0047303 A1 | | 3/2005 | Inoue et al. | 369/94 |
| 2005/0047304 A1 | | 3/2005 | Inoue et al. | 369/94 |
| 2005/0047305 A1 | | 3/2005 | Inoue et al. | 369/94 |
| 2005/0047306 A1 | | 3/2005 | Inoue et al. | 369/94 |
| 2005/0048249 A1 | | 3/2005 | Inoue et al. | 428/64.4 |
| 2005/0052194 A1 | | 3/2005 | Kister et al. | 324/755 |
| 2005/0074306 A1 | | 4/2005 | Montresor | 409/179 |
| 2005/0118530 A1 | * | 6/2005 | Mishima et al. | 430/270.12 |

FOREIGN PATENT DOCUMENTS

| | | | |
|---|---|---|---|
| EP | 1 172 811 A2 | | 1/2002 |
| EP | 1 195 756 A2 | | 4/2002 |
| EP | 1 437 724 B1 | | 9/2006 |
| JP | 54-133134 | * | 10/1979 |
| JP | 56-124134 | * | 9/1981 |
| JP | 60-219097 | * | 11/1985 |
| JP | 62-226440 | * | 10/1987 |
| JP | 62-226442 | * | 10/1987 |
| JP | 1-191351 | | 8/1989 |
| JP | 03258590 A | | 11/1991 |
| JP | 5-169819 | | 7/1993 |
| JP | 6-262854 | | 9/1994 |
| JP | 10-143919 | | 5/1998 |
| JP | 11-227334 | | 8/1999 |
| JP | 2001-243655 | | 9/2001 |
| JP | 2001-322357 | | 11/2001 |
| JP | 2002074742 A | | 3/2002 |
| JP | 2002074772 A | | 3/2002 |
| JP | 2003-054135 | * | 2/2003 |
| JP | 2003-77185 | | 3/2003 |
| JP | 2003-260874 | | 9/2003 |
| JP | 2003-326848 | | 11/2003 |
| JP | 2004-158134 | | 6/2004 |
| WO | 02/29787 A1 | | 4/2002 |

OTHER PUBLICATIONS

Translation of JP 2003-054135.*
Nikkei Electronics, May 12, 2003, pp. 119-133.
Narumi, K. et al., "45GB Rewritable Dual-Layer Phase-Change Optical Disk With a Transmittance Balanced Structure", Technical Digest, International Symposium on Optical Memory 2001, Grand Hotel, Taipei, Taiwan, Oct. 16-19, 2001, pp. 202 & 203.

* cited by examiner

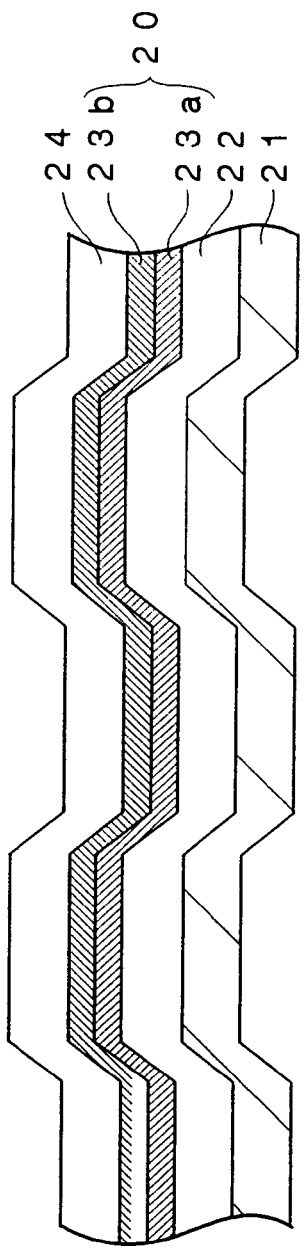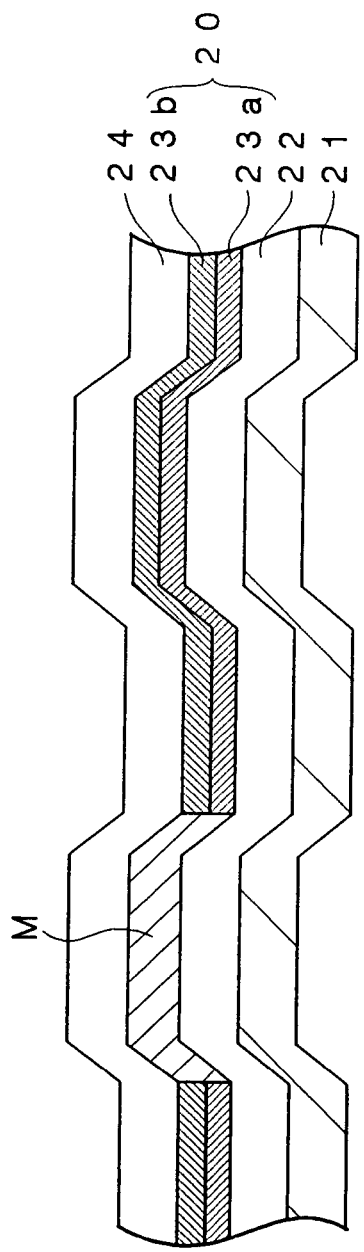

OPTICAL RECORDING MEDIUM

BACKGROUND OF THE INVENTION

The present invention relates to an optical recording medium, and particularly, to an optical recording medium which includes a plurality of recording layers and in which data can be recorded in and reproduced from a farthest recording layer from a light incidence plane in a desired manner and data can be recorded in and data can be reproduced from recording layer(s) other than the farthest recording layer from the light incidence plane in a desired manner.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof.

One of these is an optical recording medium having two recording layers and such an optical recording medium has been already put to the practical use as an optical recording medium adapted to enable only data reading, such as the DVD-Video and the DVD-ROM.

An optical recording medium adapted only for reading data and provided with two recording layers is formed by laminating two substrates each having prepits constituting a recording layer on the surface thereof via an intermediate layer.

Further, an optical recording medium having two recording layers has been recently proposed in connection with optical recording media in which data can be recorded by the user (See Japanese Patent Application Laid Open No. 2001-243655 etc.).

In the optical recording medium disclosed in Japanese Patent Application Laid Open No. 2001-243655, each recording layer includes a recording film and dielectric films (protective films) sandwiching the recording film therebetween and two recording layers each having such a configuration are laminated via an intermediate layer.

In the case where data are to be recorded in an optical recording medium having a plurality of recording films in which data can be recorded by the user, a laser beam whose power has been modulated to be equal to a recording power Pw higher than a reproducing power Pr is focused onto one or the other of the recording layers and projected thereonto, thereby changing the state of a recording film included in the recording layer irradiated with the laser beam and forming a record mark in the recording film.

Since the reflection coefficients differ between the region of the recording film where a record mark is formed and blank regions of the recording film where no record mark is formed, data can be reproduced by projecting a laser beam whose power is set to a reproducing power Pronto the recording layer and detecting the amount of the laser beam reflected by the recording layer.

In an optical recording medium including a plurality of recording layers, recording data of data in and reproduction of data from the recording layer farthest from the light incident plane is accomplished by projecting a laser beam onto the recording layer via the recording layer(s) located closer to the light incidence plane than the farthest recording layer from the light incidence plane.

Therefore, in order to record data in or reproduce data from the recording layer farthest from the light incident plane in a desired manner, it is necessary for each of the recording layers located closer to the light incident plane than the farthest recording layer to have a sufficiently high light transmittance with respect to the laser beam.

On the other hand, in order to reproduce data recorded in the recording layer(s) other than the farthest recording layer from the light incidence plane to obtain a signal having a high C/N ratio, it is necessary to select a material for forming each of the recording layer(s) other than the farthest recording layer from the light incidence plane so that the difference in reflection coefficients between the region thereof where a record mark is formed and the blank region thereof where no record mark is formed becomes sufficiently large.

However, there has not yet been developed an optical recording medium including a plurality of recording layers and constituted so that data can be recorded therein by the user, a recording layer(s) other than the farthest recording layer from the light incidence plane has a sufficiently high light transmittance with respect to a laser beam, and the difference in reflection coefficients between the region thereof where a record mark is formed and the blank region thereof is sufficiently large.

SUMMARY OF THE INVENTION

It is therefore an object of the present invention to provide an optical recording medium which includes a plurality of recording layers and in which data can be recorded in and reproduced from a farthest recording layer from a light incidence plane in a desired manner and data can be recorded in and data can be reproduced from recording layer(s) other than the farthest recording layer from the light incidence plane in a desired manner.

The above and other objects of the present invention can be accomplished by an optical recording medium comprising a substrate and a plurality of recording layers laminated via at least intermediate layers, at least one of the recording layers other than a recording layer farthest from a light incidence plane among the plurality of recording layers containing at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M.

In a study done by the inventors of the present invention, it was found that in the case where at least one of the recording layers other than the recording layer farthest from the light incidence plane among the plurality of recording layers contains at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M, the recording layer has a sufficiently high transmittance with respect to the laser beam.

Therefore, according to the present invention, since it is possible to suppress the reduction in the power of the laser beam to the minimum during the period required for arrival of the laser beam at the farthest recording layer from the light incidence plane, it is possible to record data in the farthest recording layer from the light incidence plane in a desired manner. On other hand, when data are to be reproduced from the farthest recording layer from the light incidence plane, since it is possible to suppress the reduction in the power of the laser beam to the minimum during the period required for arrival of the laser beam reflected by the farthest recording layer at the light incidence plane, it is possible to reproduce data recorded in the farthest recording layer from the light incidence plane in a desired manner.

Further, according to the present invention, since data are recorded in the recording layer containing the metal M and the element X by projecting the laser beam for recording data and combining the metal M and the element X to form a crystal of a compound of the metal M with the element X, it is possible to increase the difference in reflection coefficients with respect to a laser beam between a region where the compound of the metal M with the element X is crystallized and other regions and it is therefore possible to record in and reproduce from not only the farthest recording layer from the light incidence plane but also the recording layer(s) other than the farthest recording layer from the light incidence plane in a desired manner.

In a preferred aspect of the present invention, all of the recording layers other than the farthest recording layer from the light incidence plane among the plurality of recording layers contain at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M.

According to this preferred aspect of the present invention, it is possible to considerably improve the light transmittance of the recording layers other than the farthest recording layer from the light incidence plane as a whole.

In a further preferred aspect of the present invention, all of the recording layers other than the farthest recording layer to the light incidence plane among the plurality of recording layers contain at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M, and are formed in such a manner that the recording layers closer to the light incidence plane are thinner.

According to this preferred aspect of the present invention, since it is possible to much more improve the light transmittance of the recording layers other than the farthest recording layer from the light incidence plane as a whole, it is possible to record data in and reproduce data from the farthest recording layer from the light incidence plane in a desired manner.

Further, in a study done by the inventors of the present invention, it was found that in the case where all of the recording layers other than the farthest recording layer among the plurality of recording layers contain at least one metal M selected from a group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M, and are formed in such a manner that the recording layers closer to the light incidence plane are thinner, the reflection coefficients of the recording layers farther from the light incidence plane with respect to the laser beam become higher and it is therefore possible to reproduce data from the recording layers other than the farthest recording layer from the light incidence plane in a desired manner.

In a further preferred aspect of the present invention, the optical recording medium includes a first recording layer, a second recording layer and a third recording layer on the substrate in this order and the first recording layer, the second recording layer and the third recording layer are formed so that the second recording layer has a thickness of 15 nm to 50 nm and that a ratio of the thickness of the third recording layer to the thickness of the second recording layer is 0.40 to 0.70.

In a study done by the inventors of the present invention, it was found that in the case where the optical recording medium includes a first recording layer, a second recording layer and a third recording layer on the substrate in this order and the first recording layer, the second recording layer and the third recording layer are formed so that the second recording layer has a thickness of 15 nm to 50 nm and that the ratio of the thickness of the third recording layer to the thickness of the second recording layer is 0.40 to 0.70, the amount of the laser beam absorbed by the second recording layer and that absorbed by the third recording layer can be made substantially equal to each other and they can be set to sufficiently high levels, namely, 10% to 30%. Therefore, according to this preferred aspect of the present invention, it is possible to record data in the second recording layer and the third recording layer in a desired manner by projecting laser beams having substantially the same power thereonto.

Further, a study carried out by the inventors of the present invention revealed that in the case where the optical recording medium includes a first recording layer, a second recording layer and a third recording layer on the substrate in this order and the first recording layer, the second recording layer and the third recording layer are formed so that the second recording layer has a thickness of 15 nm to 50 nm and that the ratio of the thickness of the third recording layer to the thickness of the second recording layer is 0.40 to 0.70, the reflection coefficient of the second recording layer and that of the third recording layer with respect to the laser beam can be made substantially equal to each other and they can be made substantially high. Therefore, according to this preferred aspect of the present invention, it is possible to reproduce data from the second recording layer and the third recording layer in a desired manner.

In the present invention, it is more preferable to form the third recording layer and the second recording layer so that a ratio of the thickness of the third recording layer to that of the second recording layer is 0.46 to 0.69 and it is most preferable to form the second recording layer and the third recording layer so that a ratio of the thickness of the third recording layer to that of the second recording layer is 0.50 to 0.63.

In a further preferred aspect of the present invention; the optical recording medium includes a first recording layer, a second recording layer, a third recording layer and a fourth recording layer on the substrate in this order and the first recording layer, the second recording layer, the third recording layer and the fourth recording layer are formed so that the second recording layer has a thickness of 20 nm to 50 nm, that a ratio of the thickness of the third recording layer to the thickness of the second recording layer is 0.48 to 0.93 and that a ratio of the thickness of the fourth recording layer to that of the second recording layer is 0.39 to 0.70.

In a study done by the inventors of the present invention, it was found that in the case where the optical recording medium includes a first recording layer, a second recording layer, a third recording layer and a fourth recording layer on the substrate in this order and the first recording layer, the second recording layer, the third recording layer and the fourth recording layer are formed so that the second recording layer has a thickness of 20 nm to 50 nm, that the ratio of the thickness of the third recording layer to the thickness of the second recording layer is 0.48 to 0.93 and that the ratio of the thickness of the fourth recording layer to that of the second recording layer is 0.39 to 0.70, the amount of the laser beam absorbed by the second recording layer, that absorbed by the third recording layer and that absorbed by the fourth recording layer can be made substantially equal to each other and they can be set to sufficiently high levels, namely, 10% to 20%. Therefore, according to this preferred aspect of the present invention, it is possible to record data in the second recording layer, the third recording layer and the fourth recording layer in a desired manner by projecting laser beams having substantially the same power thereonto.

Further, in a study done by the inventors of the present invention, it was found that in the case where the optical recording medium includes a first recording layer, a second recording layer, a third recording layer and a fourth recording layer on the substrate in this order and the first recording layer, the second recording layer, the third recording layer and the fourth recording layer are formed so that the second recording layer has a thickness of 20 nm to 50 nm, that the ratio of the thickness of the third recording layer to the thickness of the second recording layer is 0.48 to 0.93 and that the ratio of the thickness of the fourth recording layer to that of the second recording layer is 0.39 to 0.70, the reflection coefficient of the second recording layer, that of the third recording layer and that of the fourth recording layer with respect to the laser beam can be made substantially equal to each other and they can be made substantially high. Therefore, according to this preferred aspect of the present invention, it is possible to reproduce data from the second recording layer, the third recording layer and the fourth recording layer in a desired manner.

In the present invention, it is more preferable to form the second recording layer, the third recording layer and the fourth recording layer so that a ratio of the thickness of the third recording layer to that of the second recording layer is 0.50 to 0.90 and a ratio of the thickness of the fourth recording layer to that of the second recording layer is 0.39 to 0.65 and it is most preferable to form the second recording layer, the third recording layer and the fourth recording layer so that a ratio of the thickness of the third recording layer to that of the second recording layer is 0.57 to 0.80 and a ratio of the thickness of the fourth recording layer to that of the second recording layer is 0.42 to 0.54.

In a further preferred aspect of the present invention, the element X is constituted of at least one element selected from a group consisting of S, O, C and N.

S, O, C and N are highly reactive to at least one of metal M selected from the group consisting of Ni, Cu, Si, Ti, Ge, Zr, Nb, Mo, In, Sn, W, Pb, Bi, Zn and La and can be preferably used as the element X. In particular, O and S included in the sixth group elements are adequately reactive to the metal M and, unlike F or Cl included in the seventh group elements, do not react with the metal M without being irradiated with a laser beam for recording data, so that O and S are particularly preferable for the element X.

In a further preferred aspect of the present invention, the at least one recording layer containing the metal M and the element X further contains at least one metal selected from a group consisting of Mg, Al and Ti.

In the present invention, in the case where the at least one recording layer containing the metal M and the element X further contains Mg, it is preferable for the at least one recording layer to contain 18.5 atomic % to 33.7 atomic % of Mg and it is more preferable for the at least one recording layer to contain 20.0 atomic % to 33.5 atomic % of Mg.

On the other hand, in the present invention, in the case where the at least one recording layer containing the metal M and the element X further contains Al, it is preferable for the at least one recording layer to contain 11 atomic % to 40 atomic % of Al and it is more preferable for the at least one recording layer to contain 18 atomic % to 32 atomic % of Al.

Moreover, in the present invention, in the case where the at least one recording layer containing the metal M and the element X further contains Ti, it is preferable for the at least one recording layer to contain 8 atomic % to 34 atomic % of Ti and it is more preferable for the at least one recording layer to contain 10 atomic % to 26 atomic % of Ti.

In a further preferred aspect of the present invention, the farthest recording layer among the plurality of recording layers includes a first recording film containing Cu as a primary component and a second recording film containing Si as a primary component.

According to this preferred aspect of the present invention, since the farthest recording layer among the plurality of recording layers includes a first recording film containing Cu as a primary component and a second recording film containing Si as a primary component, it is possible to suppress the noise level of a signal obtained by reproducing data recorded in the farthest recording layer from the light incidence plane to a lower level and it is possible to increase the change in reflection coefficient between before and after the recording of data. Further, even when the optical recording medium has been stored for a long time, recorded data can be prevented from being degraded and the reliability of the optical recording medium can be increased.

In a further preferred aspect of the present invention, a reflective film is formed between the farthest recording layer from the light incidence plane and the substrate.

According to this preferred aspect of the present invention, when data recorded in the farthest recording layer from the light incidence plane are to be reproduced, since a laser beam projected onto the farthest recording layer via the light incidence plane is reflected by the surface of the reflective film and the laser beam reflected by the reflective film and the laser beam reflected by the farthest recording layer from the light incidence plane interfere with each other, the change in reflection coefficient between before and after the recording of data can be increased and data recorded in the farthest recording layer from the light incidence plane can be reproduced with high sensitivity.

In a further preferred aspect of the present invention, the at least one recording layer containing the metal M and the element X is constituted so that data can be recorded therein and recorded data can be reproduced using a laser beam having a wavelength of 380 nm to 450 nm.

Since the at least one recording layer containing the metal M and the element X exhibits an excellent optical property with respect to a laser beam having a wavelength of 380 nm to 450 nm, it is preferable to record data and reproduce recorded data using the laser beam having a wavelength of 380 nm to 450 nm.

The above and other objects of the present invention can be also accomplished by an optical recording medium comprising a substrate and a plurality of recording layers laminated via at least intermediate layers, at least one of the recording layers other than a recording layer farthest from a light incidence plane among the plurality of recording layers containing at least one kind of metal selected from a group consisting of Ni, Cu, Si, Ti, Ge, Zr, Nb, Mo, In, Sn, W, Pb, Bi, Zn and La and at least one element selected from a group consisting of S, O, C and N as a primary component and being added with at least one kind of metal selected from a group consisting of Mg, Al and Ti.

According to the study of the inventors of the present invention, it was found that in the case where the at least one of the recording layers other than a recording layer farthest from the light incidence plane among the plurality of recording layers contains at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and is added with at least one metal selected from a group consisting of Mg, Al and Ti, the recording layer has a sufficiently high transmittance with respect to the laser beam.

Therefore, according to the present invention, it is possible to record data in and reproduce data from the farthest recording layer from the light incidence plane in a desired manner and it is also possible to record data in and reproduce data from the recording layer(s) other than the farthest recording layer from the light incidence plane.

In the present invention, it is preferable for all of the recording layers other than the farthest recording layer from the light incidence plane among the plurality of recording layers to contain at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and to be added with at least one metal selected from a group consisting of Mg, Al and Ti.

In a preferred aspect of the present invention, the recording layer containing at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and being added with at least one metal selected from a group consisting of Mg, Al and Ti is formed by a vapor growth process using a target containing at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and a target containing at least one metal selected from a group consisting of Mg, Al and Ti as a primary component.

In a further preferred aspect of the present invention, the recording layer containing at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and being added with at least one metal selected from a group consisting of Mg, Al and Ti is formed by a vapor growth process using a target containing a mixture of ZnS and $SiO_2$ or a mixture of $La_2O_3$, $SiO_2$ and $Si_3N_4$ as a primary component and a target containing at least one metal selected from a group consisting of Mg, Al and Ti as a primary component.

In a further preferred aspect of the present invention, the recording layer containing at least one metal selected from a group consisting of Ni, Cu, Si, Ti, Ge, Zr, Nb, Mo, In, Sn, W, Pb, Bi, Zn and La and at least one element selected from a group consisting of S,O, C and N as a primary component and being added with at least one metal selected from a group consisting of Mg, Al and Ti is formed by a vapor growth process using a target consisting of a mixture of ZnS and $SiO_2$ or a mixture of $La_2O_3$, $SiO_2$ and $Si_3N_4$ and a target consisting of at least one metal selected from a group consisting of Mg, Al and Ti.

In the present invention, in the case where the target containing the mixture of ZnS and $SiO_2$ is used, it is preferable to set a mole ratio of ZnS to $SiO_2$ to be 50:50 to 90:10 and more preferably set to be about 80:20.

In the case where the mole ratio of ZnS in the mixture of ZnS and $SiO_2$ is equal to or larger than 50%, the reflection coefficient and the light transmittance of the recording layer with respect to a laser beam can be simultaneously improved and in the case where the mole ratio of ZnS in the mixture of ZnS and $SiO_2$ is equal to or smaller than 90%, it is possible to effectively prevent cracks from being generated in the recording layer owing to stress. Further, in the case where the mole ratio of ZnS to $SiO_2$ of the mixture of ZnS and $SiO_2$ is about 80:20, both of the reflection coefficient and the light transmittance of the recording layer with respect to a laser beam can be much more improved, while it is possible to more effectively prevent cracks from being generated in the recording layer.

Further, in the present invention, in the case where the target containing the mixture of $La_2O_3$, $SiO_2$ and $Si_3N_4$ is used, it is preferable to set a mole ratio of $SiO_2$ to $La_2O_3$ and $Si_3N_4$ to be 10:90 to 50:50 and it is more preferable to set a mole ratio of $La_2O_3$, $SiO_2$ and $Si_3N_4$ to be 20:30:50.

In the case where the mole ratio of $SiO_2$ in the mixture of $La_2O_3$, $SiO_2$ and $Si_3N_4$ is equal to or smaller than 10%, cracks tend to be generated in the recording layer and in the case where the mole ratio of $SiO_2$ in the mixture of $La_2O_3$, $SiO_2$ and $Si_3N_4$ exceeds 50%, the refractive index of the recording layer becomes low, whereby the reflection coefficient of the recording layer becomes low. On the other hand, in the case where the mole ratio of $La_2O_3$ and $Si_3N_4$ is 50% to 90%, it is possible to increase the refractive index of the recording layer and to prevent cracks from being generated in the recording layer.

The above and other objects and features of the present invention will become apparent from the following description made with reference to the accompanying drawings.

BRIEF DESCRIPTION OF THE DRAWINGS

FIG. 10 is a schematic enlarged cross-sectional view showing a first recording layer before data are recorded therein.

FIG. 11 is a schematic enlarged cross-sectional view showing a first recording layer after data were recorded therein.

DESCRIPTION OF THE PREFERRED EMBODIMENTS

Figure 1:
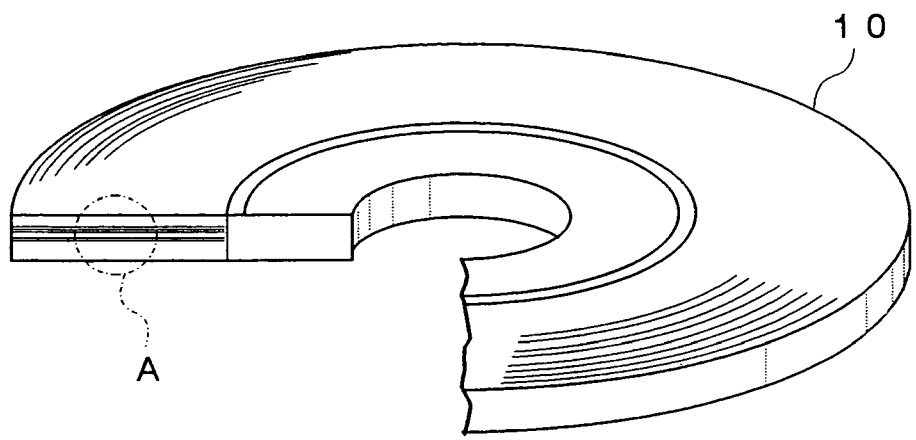
FIG. 1 is a schematic perspective view showing an optical recording medium that is a preferred embodiment of the present invention.
Figure 2:
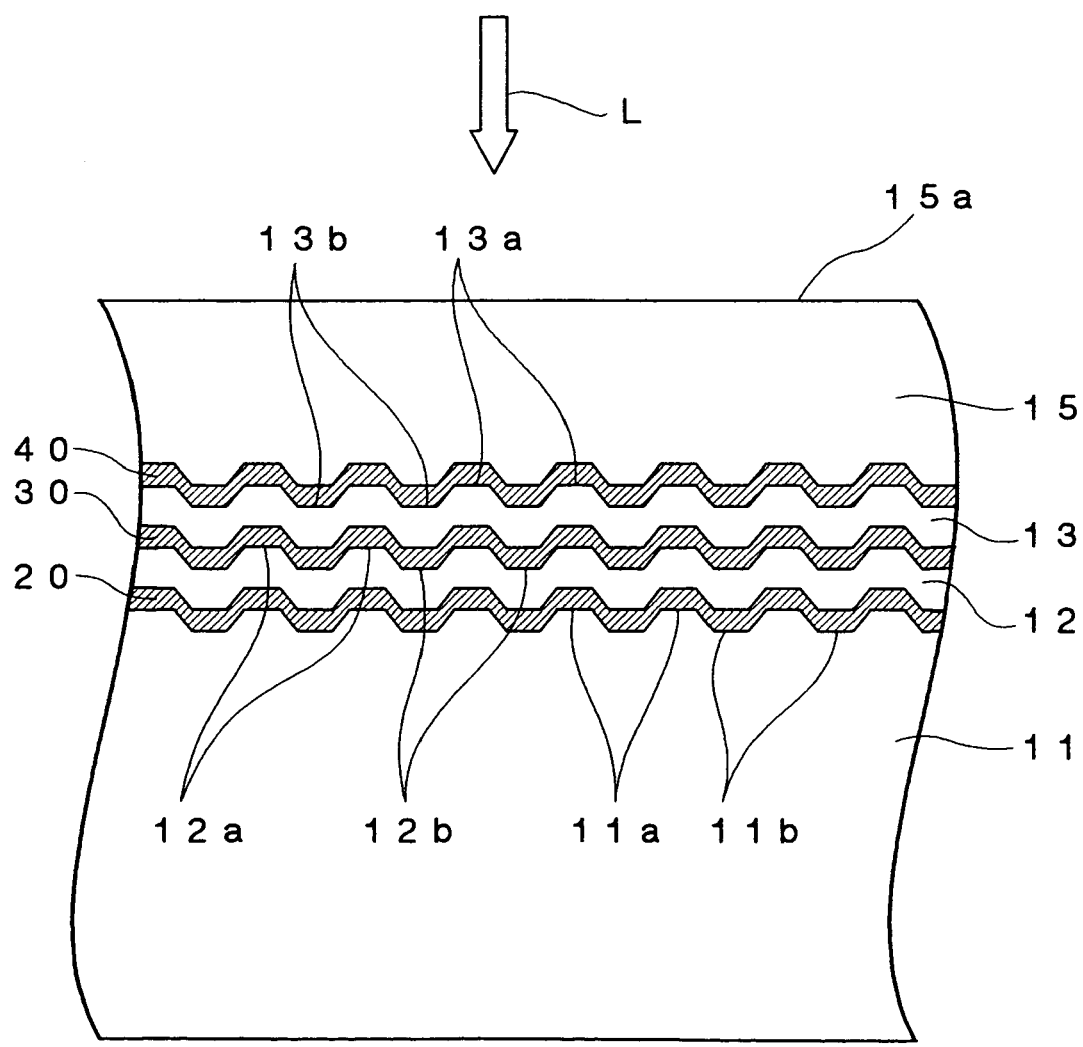
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is a schematic enlarged cross-sectional view indicated by A in FIG. 1.

As shown in FIG. 1, an optical recording medium 10 according to this embodiment is formed disk-like and has a outer diameter of about 120 mm and a thickness of about 1.2 mm.

As shown in FIG. 2, the optical recording medium 10 according to this embodiment includes a support substrate 11, a first recording layer 20, a first intermediate layer 12, a second recording layer 30, a second intermediate layer 13, a third recording layer 40 and a light transmission layer 15.

The first recording layer 20, the second recording layer 30 and the third recording layer 40 are recording layers in which data are recorded, i.e., the optical recording medium 10 according to this embodiment includes three recording layers.

As shown in FIG. 2, the optical recording medium 10 according to this embodiment is constituted so that a laser beam L is projected onto the light transmission layer 15 and a light incidence plane 15a is constituted by one surface of the light transmission layer 15. As shown in FIG. 2, the first recording layer 20 constitutes a recording layer farthest from the light incident plane 15a and the third recording layer 40 constitutes a recording layer closest to from the light incident plane 15a.

When data are to be recorded in the first recording layer 20, the second recording layer 30 or the third recording layer 40 or when data recorded in the first recording layer 20, the second recording layer 30 or the third recording layer 40 are to be reproduced, a blue laser beam L having a wavelength λ of 380 nm to 450 nm is projected from the side of the light incidence plane 15a and focused onto one of the first recording layer 20, the second recording layer 30 and the third recording layer 40.

Therefore, when data are to be recorded in the first recording layer 20 or when data recorded in the first recording layer 20 are to be reproduced, the first recording layer 20 is irradiated with the laser beam L via the second recording layer 30 and the third recording layer 40 and when data are to be recorded in the second recording layer 30 or when data recorded in the second recording layer 30 are to be reproduced, the second recording layer 30 is irradiated with the laser beam L via the third recording layer 40.

The support substrate 11 serves as a support for ensuring mechanical strength required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 15a located opposite to the support substrate 11, it is unnecessary for the support substrate 11 to have a light transmittance property.

In this embodiment, the support substrate 11 has a thickness of about 1.1 mm.

As shown in FIG. 2, grooves 11a and lands 11b are alternately and spirally formed on the surface of the support substrate 11. The grooves 11a and/or lands 11b serve as a guide track for the laser beam L when data are to be recorded in the first recording layer 20 and data are reproduced from the first recording layer 20.

The depth of the groove 11a is not particularly limited and is preferably set to 10 nm to 40 nm. The pitch of the grooves 11a is not particularly limited and is preferably set to 0.2 μm to 0.4 μm.

As shown in FIG. 2, the first recording layer 20 is formed on the surface of the support substrate 11.

Figure 3:
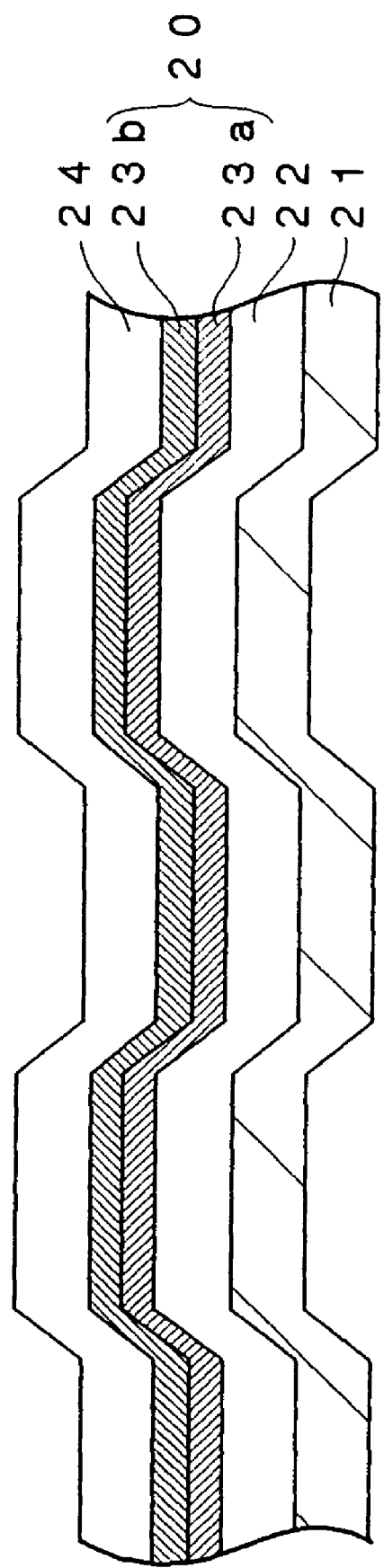
FIG. 3 is an enlarged schematic cross-sectional view showing a first recording layer.

FIG. 3 is an enlarged schematic cross-sectional view showing the first recording layer 20.

As shown in FIG. 3, the first recording layer 20 is constituted by laminating a reflective film 21, a second dielectric film 22, a first recording film 23a, a second recording film 23b and a first dielectric film 24.

The reflective film 21 serves to reflect the laser beam L entering the light incident plane 15a so as to emit it from the light incident plane 15a and effectively radiate heat generated in the first recording film 23a and the second recording film 23b by the irradiation with the laser beam L.

The material used to form the reflective film 21 is not particularly limited insofar as it can reflect a laser beam, and the reflective film 21 can be formed of Mg, Al, Ti, Cr, Fe, Co, Ni, Cu, Zn, Ge, Ag, Pt, Au and the like. Among these materials, it is preferable to form the reflective film 21 of Al, Au, Ag, Cu or alloy thereof since they have a high reflection coefficient and high thermal conductivity.

The reflective film 21 is preferably formed so as to have a thickness of 20 nm to 200 nm. When the reflective film 21 is thinner than 20 nm, it is difficult to form the reflective film 21 having a sufficiently high reflection coefficient and the reflective film 21 does not readily radiate heat generated in the first recording layer 20. On the other hand, when the reflective film 21 is thicker than 200 nm, the productivity of the optical recording medium 10 is lowered since a long time is required for forming the reflective film 21 and there is a risk of cracking the reflective film 21 due to internal stress or the like.

As shown in FIG. 3, the second dielectric film 22 is formed on the surface of the reflective film 21.

The second dielectric film 22 serves to prevent the support substrate 11 from being deformed by heat and also serves as a protective film for protecting the first recording film 23a and the second recording film 23b together with the first dielectric film 24.

The dielectric material for forming the second dielectric film 22 is not particularly limited insofar as it is transparent in the wavelength range of the laser beam L and the second dielectric film 22 can be formed of a dielectric material containing oxide, nitride, sulfide, fluoride or a combination thereof, for example, as a primary component. The second dielectric film 22 is preferably formed of oxide, nitride, sulfide, fluoride or a combination thereof containing at least one metal selected from the group consisting of Si, Ge, Zn, Al, Ta, Ti, Co, Zr, Pb, Ag, Sn, Ca, Ce, V, Cu, Fe and Mg. The mixture of ZnS and $SiO_2$ is particularly preferable as a dielectric material for forming the second dielectric film 22 and the mole ratio of ZnS to $SiO_2$ is preferably 50:50 to 85:15 and more preferably about 80:20.

As shown in FIG. 3, the first recording film 23a is formed on the surface of the second dielectric film 22 and the second recording film 23b is further formed on the surface of the first recording film 23a.

The first recording film 23a and the second recording film 23b are recording films in which data are to be recorded.

In this embodiment, the first recording film 23a contains Cu as a primary component and the second recording film 23b contains Si as a primary component.

In this specification, the statement that a recording film contains a certain element as a primary component means that the content of the element is 50 atomic % to 100 atomic %.

It is preferable for the first recording film 23a containing Cu as a primary component to be added with at least one element selected from the group consisting of Al, Zn, Sn, Mg and Au. In the case where the at least one element selected from the group consisting of Al, Zn, Sn, Mg and Au is added to the first recording film 23a containing Cu as a primary component, it is possible to decrease the noise level in the reproduced signal and improve the long term storage reliability.

It is preferable to form the first recording film 23a and the second recording film 23b so that the total thickness thereof is 2 nm to 40 nm.

In the case where the total thickness of the first recording film 23a and the second recording film 23b is thinner than 2 nm, the change in reflection coefficient between before and after irradiation with the laser beam L is small so that a reproduced signal having a high C/N ratio cannot be obtained. On the other hand, when the total thickness of the first recording film 23a and the second recording film 23b exceeds 40 nm, the recording characteristic of the first recording layer 20 is degraded.

The individual thicknesses of the first recording film 23a and the second recording film 23b are not particularly limited but it is preferable to define the ratio of the thickness of the first recording film 23a to the thickness of the second recording film 23b, namely, thickness of first recording layer 31/thickness of second recording layer 32 to be from 0.2 to 5.0.

As shown in FIG. 3, the first dielectric film 24 is formed on the surface of the second recording film 23b.

The first dielectric film 24 can be formed of the material usable for forming the second dielectric film 22.

As shown in FIG. 2, the first intermediate layer 12 is formed on the surface of the first recording layer 20.

The first intermediate layer 12 serves to space the first recording layer 20 and the second recording layer 30 apart by a physically and optically sufficient distance.

As shown in FIG. 2, grooves 12a and lands 12b are alternately formed on the surface of the first intermediate layer 12. The grooves 12a and/or lands 12b formed on the surface of the first intermediate layer 12 serve as a guide track for the laser beam L when data are to be recorded in the second recording layer 30 or when data are to be reproduced from the second recording layer 30.

As shown in FIG. 2, the second recording layer 30 is formed on the first intermediate layer 12 and the second intermediate layer 13 is formed on the surface of the second recording layer 30.

The second intermediate layer 13 serves to space the second recording layer 30 and the third recording layer 40 apart by a physically and optically sufficient distance.

As shown in FIG. 2, grooves 13a and lands 13b are alternately formed on the surface of the second intermediate layer 13. The grooves 13a and/or lands 13b formed on the surface of the second intermediate layer 13 serve as a guide track for the laser beam L when data are to be recorded in the third recording layer 40 or when data are to be reproduced from the third recording layer 40.

The depth of the groove 12a, 13a and the pitch of the grooves 12a, 13a can be set substantially the same as those of the grooves 11a formed on the surface of the support substrate 11.

It is necessary for the first intermediate layer 12 to have sufficiently high light transmittance since the laser beam L passes through the first intermediate layer 12 when data are to be recorded in the first recording layer 20 and data recorded in the first recording layer 20 are to be reproduced and it is necessary for the second intermediate layer 13 to have sufficiently high light transmittance since the laser beam L passes through the second intermediate layer 13 when data are to be recorded in the first recording layer 20 and data recorded in the first recording layer 20 are to be reproduced and when data are to be recorded in the second recording layer 30 and data recorded in the second recording layer 30 are to be reproduced.

The material for forming each of the first intermediate layer 12 and the second intermediate layer 13 is not particularly limited insofar as it has a high light transmittance for the laser beam L and an ultraviolet ray curable acrylic resin is preferably used for forming each of the first intermediate layer 12 and the second intermediate layer 13.

It is preferable to form each of the first intermediate layer 12 and the second intermediate layer 13 so as to have a thickness of 5 μm to 50 μm and it is more preferable to form it so as to have a thickness of 10 μm to 40 μm.

The second recording layer 30 is a recording layer in which data are to be recorded and in this embodiment, the second recording layer 30 is constituted as a single film.

As shown in FIG. 2, the third recording layer 40 is formed on the surface of the second intermediate layer 13.

The third recording layer 40 is a recording layer in which data are to be recorded and in this embodiment, the third recording layer 40 is constituted as a single film.

In this embodiment, each of the second recording layer 30 and the third recording layer 40 contains Zn, Si, S and O as a primary component and at least one metal selected from the group consisting of Mg, Al and Ti as an additive.

Concretely, the second recording layer 30 is formed on the surface of the first intermediate layer 12 by a vapor growth process such as a sputtering process using a target consisting of the mixture of ZnS and $SiO_2$ and a target consisting of at least one metal selected from the group consisting of Mg, Al and Ti. During the process for forming the second recording layer 30, the at least one metal selected from the group consisting of Mg, Al and Ti acts on the mixture of ZnS and $SiO_2$ as a reducing agent and as a result, Zn is separated from S and simple substances of Zn are uniformly dispersed in the second recording layer 30.

In this embodiment, the third recording layer 30 has the same composition as that of the second recording layer 30 and, therefore, the third recording layer 40 is formed on the surface of the second intermediate layer 13 by a vapor growth process such as a sputtering process using a target consisting of the mixture of ZnS and $SiO_2$ and a target consisting of at least one metal selected from the group consisting of Mg, Al and Ti.

Further, in this embodiment, the second recording layer 30 is formed so as to have a thickness of 15 nm to 50 nm and the third recording layer 40 is formed so that the ratio D3/D2 of the thickness D3 of the third recording layer 40 to the thickness D2 of the second recording layer 30 is 0.40 to 0.70.

Since a laser beam L passes through the second recording layer 30 when data are to be recorded in or data recorded in the first recording layer 20 are to be reproduced, it is necessary for the second recording layer 30 to have sufficiently high light transmittance so that a signal having a high level can be obtained when data recorded in the first recording layer 30 are reproduced. Further, since a laser beam L passes through the third recording layer 40 when data are to be recorded in the first recording layer 20 or data recorded in the first recording layer 20 are to be reproduced or when data are to be recorded in the second recording layer 30 or data recorded in the second recording layer 30 are to be reproduced, it is necessary for the third recording layer 40 to have sufficiently high light transmittance so that a signal having a high level can be obtained when data recorded in the first recording layer 20 or when data recorded in the second recording layer 30 are reproduced.

On the other hand, since a laser beam L reflected by the second recording layer 30 and emitted through the light incidence plane 15a is detected when data recorded in the second recording layer 30 are to be reproduced and a laser beam L reflected by the third recording layer 40 and emitted through the light incidence plane 15a is detected when data recorded in the third recording layer 40 are to be reproduced, each of the second recording layer 30 and the third recording layer 40 has a sufficiently high light reflection coefficient so that a signal having a high level can be obtained when data recorded in each of them are reproduced.

In this embodiment, each of the second recording layer 30 and the third recording layer 40 contains Zn, Si, S and O as a primary component and at least one metal selected from the group consisting of Mg, Al and Ti as an additive. In a study done by the inventors of the present invention, it was found that in the case where each of the second recording layer 30 and the third recording layer 40 contains Zn, Si, S and O as a primary component and at least one metal selected from the group consisting of Mg, Al and Ti as an additive, each of them has a high light transmittance for a laser beam L having a wavelength of 380 nm to 450 nm.

Further, in this embodiment, the second recording layer 30 and the third recording layer 40 are formed so that the ratio D3/D2 of the thickness D3 of the third recording layer 40 to the thickness D2 of the second recording layer 30 is 0.40 to 0.70. A study carried out by the inventors of the present invention revealed that in the case where the second recording layer 30 and the third recording layer 40 are formed so that the thickness D2 of the second recording layer 30 is larger than the thickness D3 of the third recording layer 40, each of them has a much higher light transmittance for the laser beam L having a wavelength of 380 nm to 450 nm.

Therefore, according to this embodiment, in the case where data are to be recorded in the first recording layer 20, since it is possible to suppress the reduction in the power of the laser beam L to the minimum during the period required for arrival of the laser beam L at the first recording layer 20, it is possible to record data in the first recording layer in a desired manner. On other hand, when data recorded in the first recording layer 20 are to be reproduced, since it is possible to suppress the reduction in the power of the laser beam L to the minimum during the period required for arrival of the laser beam L reflected by the first recording layer 20 at the light incidence plane 15a, it is possible to reproduce data recorded in the first recording layer 20 in a desired manner.

Further, in a study done by the inventors of the present invention, it was found that in the case where each of the second recording layer 30 and the third recording layer 40 contains Zn, Si, S and O as a primary component and at least one metal selected from the group consisting of Mg, Al and Ti as an additive and the thickness D2 of the second recording layer 30 is larger than the thickness D3 of the third recording layer 40, the reflection coefficient of the recording layer farther from the light incidence plane 15a with respect to the laser beam L can be increased. Therefore, according to this embodiment, it is possible to reproduce data not only from the first recording layer 20 but also from the second recording layer 30 and the third recording layer 40 in a desired manner.

Further, it is preferable for the amount of the laser beam L absorbed by the second recording layer 30 and that absorbed by the third recording layer 40 to be substantially equal to each other so that laser beams L for recording data having substantially same powers are projected onto the second recording layer 30 and the third recording layer 40 and data can be similarly recorded therein.

Moreover, in order to similarly reproduce data recorded in the second recording layer 30 and the third recording layer 40, it is preferable for the reflection coefficient of the second recording layer 30 with respect to a laser beam L focused onto the second recording layer 20 and projected thereonto via the third recording layer 40 and the reflection coefficient of the third recording layer 40 with respect to the laser beam L focused and projected onto the third recording layer 40 to be substantially equal.

In a study done by the inventors of the present invention, it was found that in the case where the second recording layer 30 and the third recording layer 40 are formed so that the second recording layer 30 has a thickness of 15 nm to 50 nm and that the ratio D3/D2 of the thickness D3 of the third recording layer 40 to the thickness D2 of the second recording layer 30 is 0.40 to 0.70, the second recording layer 30 and the third recording layer 40 can be formed so that the amount of the laser beam L absorbed by the second recording layer 30 and that absorbed by the third recording layer can be made substantially equal to each other and that the absorption coefficient of the second recording layer 30 with respect to the laser beam L having a power and projected thereonto and that of the third recording layer with respect to the laser beam L having a power and projected thereonto are sufficiently high, namely, 10% to 30%. Therefore, according to this embodiment, it is possible to record data in the second recording layer and the third recording layer in a desired manner.

In a further study done by the inventors of the present invention, it was found that in the case where each of the second recording layer 30 and the third recording layer 40 contains Zn, Si, S and O as a primary component and at least one metal selected from the group consisting of Mg, Al and Ti as an additive, the second recording layer 30 has a thickness of 15 nm to 50 nm and the ratio D3/D2 of the thickness D3 of the third recording layer 40 to the thickness D2 of the second recording layer 30 is 0.40 to 0.70, the second recording layer 30 and the third recording layer 40 can be formed so that the reflection coefficient of the second recording layer 30 and that of the third recording layer 40 are substantially equal to each other and that each of them has a sufficiently high reflection coefficient. Therefore, according to this embodiment, it is possible to reproduce data from the second recording layer 30 and the third recording layer 40 in a desired manner.

As shown in FIG. 2, the light transmission layer 15 is formed on the surface of the third recording layer 40.

The light transmission layer 15 serves to transmit the laser beam L and the light incident plane 15a is constituted by one of the surfaces thereof.

It is preferable to form the light transmission layer 15 so as to have a thickness of 30 μm to 200 μm.

The material for forming the light transmission layer 15 is not particularly limited and, similarly to the first intermediate layer 12 and the second intermediate layer 13, an ultraviolet ray curable acrylic resin is preferably used for forming the light transmission layer 15.

The light transmission layer 15 may be formed by adhering a sheet made of light transmittable resin to the surface of the third recording layer 40 using an adhesive agent.

It is necessary for the light transmission layer 15 to have sufficiently high light transmittance since the laser beam L passes through the light transmission layer 15 when data are to be recorded in the first recording layer 20, the second recording layer 30 or the third recording layer 40 and when data recorded in the first recording layer 20, the second recording layer 30 or the third recording layer 40 are to be reproduced.

The optical recording medium 10 having the above-described configuration can, for example, be fabricated in the following manner.

FIGS. 4 to 8 show steps for manufacturing the optical recording medium 10.

Figure 4:
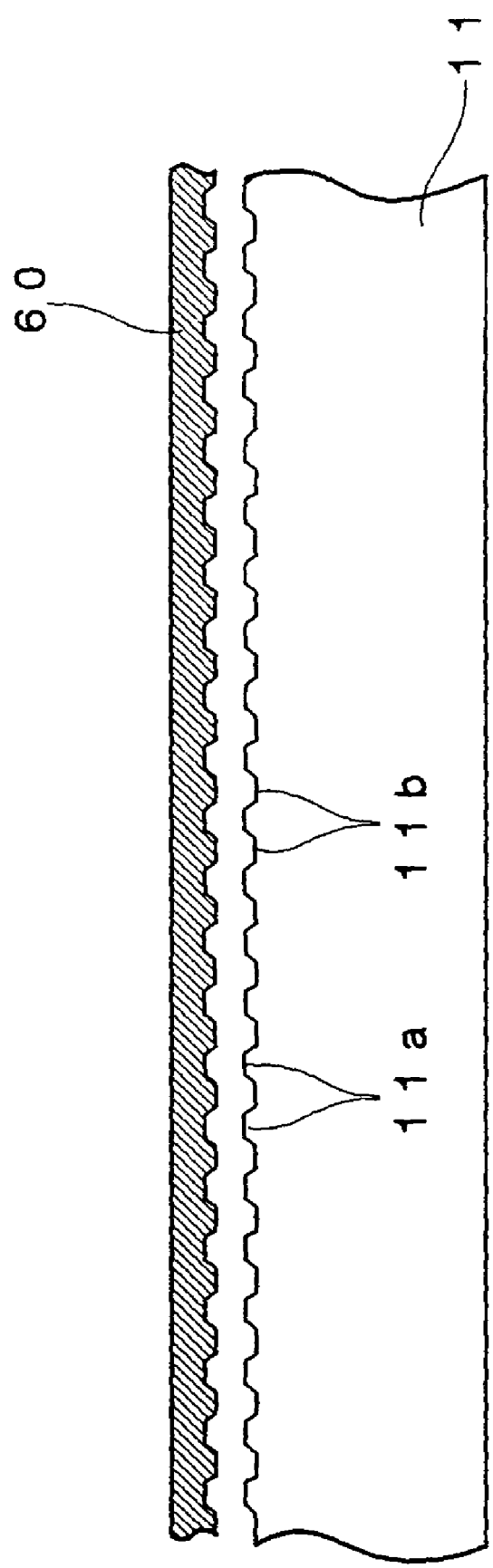
FIG. 4 shows a step for manufacturing an optical recording medium that is a preferred embodiment of the present invention.

As shown in FIG. 4, the support substrate 11 having the groove 11a and the land 11b on the surface thereof is first fabricated by injection molding using a stamper 60.

Figure 5:
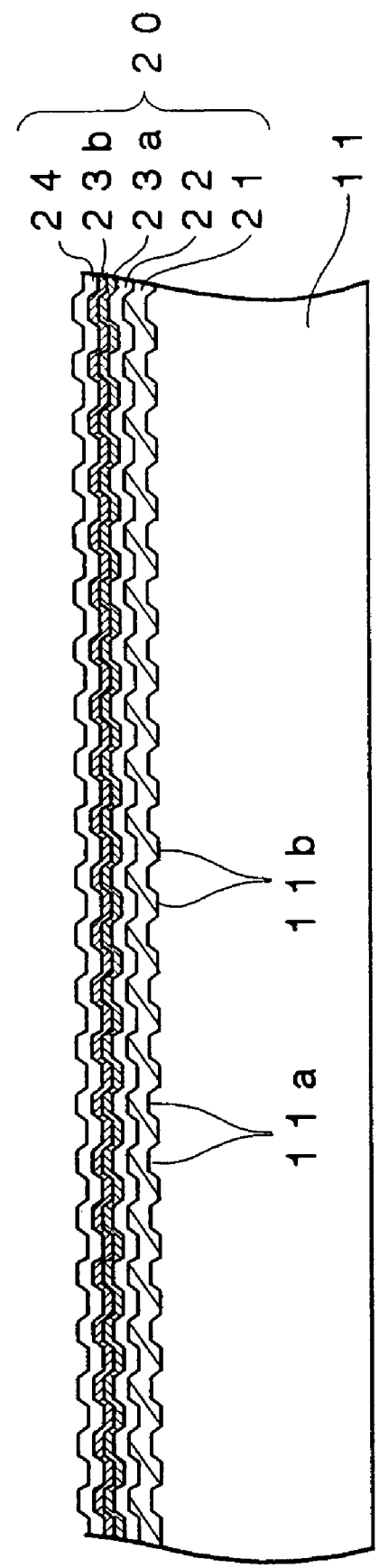
FIG. 5 shows a step for manufacturing an optical recording medium that is a preferred embodiment of the present invention.

Then, as shown in FIG. 5, the reflective film 21, the second dielectric film 22, the first recording film 23a, the second recording film 23b and the first dielectric film 24 are sequentially formed using a vapor growth process such as a sputtering process on the surface of the support substrate 11 formed with the groove 11a and the land 11b, thereby forming the first recording layer 20.

Figure 6:
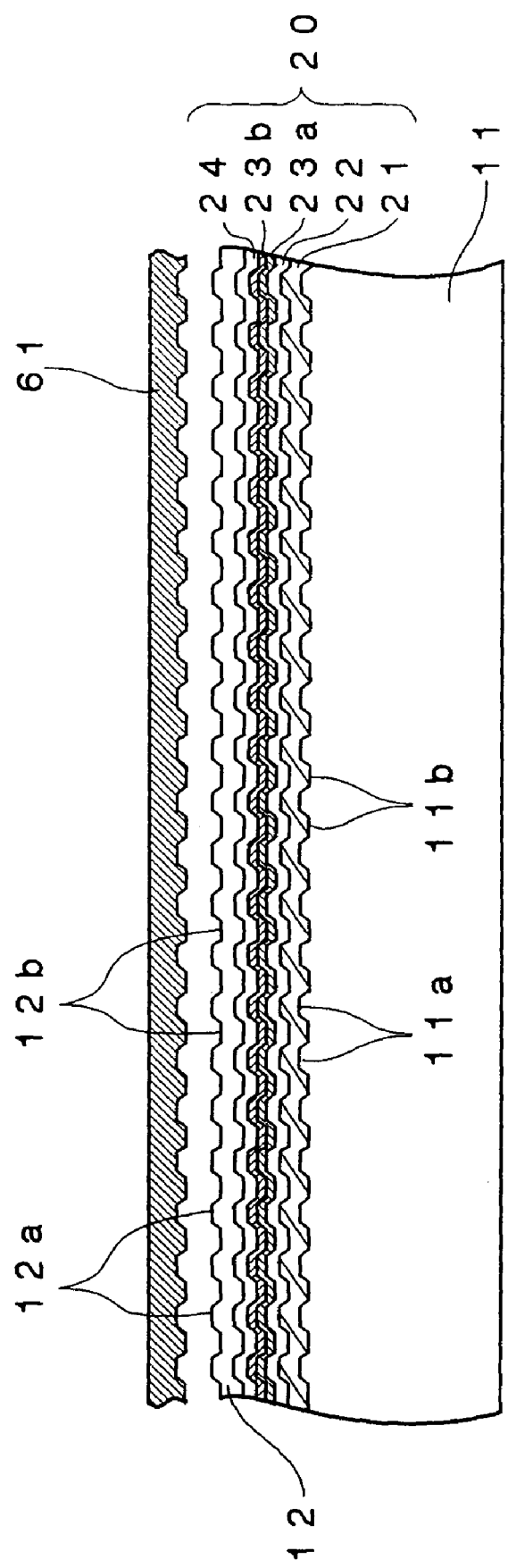
FIG. 6 shows a step for manufacturing an optical recording medium that is a preferred embodiment of the present invention.
Figure 7:
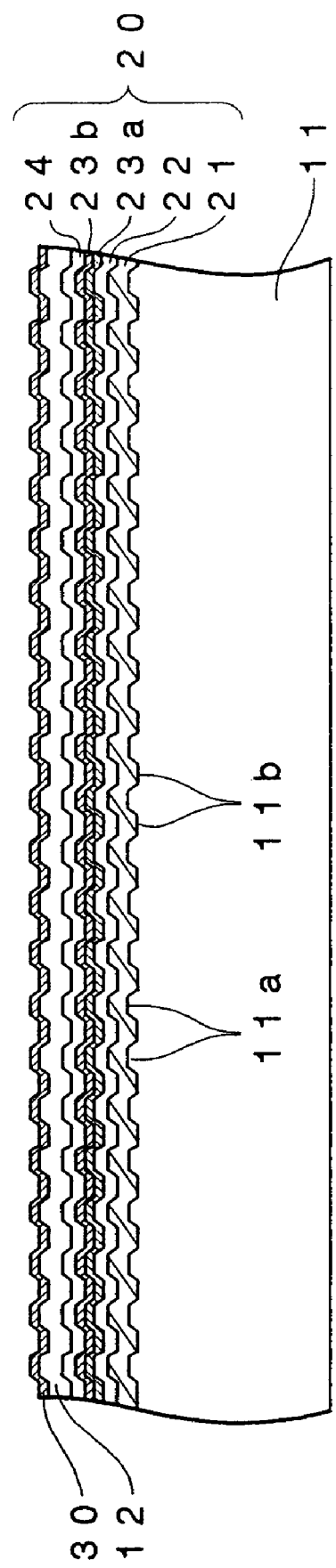
FIG. 7 shows a step for manufacturing an optical recording medium that is a preferred embodiment of the present invention.

Further, as shown in FIG. 6, an ultraviolet ray curable resin is applied onto the first recording layer 20 by a spin coating method to form a coating film and the surface of the coating film is irradiated with an ultraviolet ray via a stamper 61 while it is covered by the stamper 61, thereby forming the first intermediate layer 12 formed with grooves 12a and lands 12b on the surface thereof and having a thickness of 5 μm to 50 μm.

The second recording layer 30 is then formed on the surface of the first intermediate layer 12.

Further, the second recording layer 30 having a thickness of 15 nm to 50 nm is formed on the surface of the first intermediate layer 12 by a vapor growth process such as a sputtering process using a target consisting of the mixture of $ZnS$ and $SiO_2$ and a target consisting of at least one metal selected from the group consisting of Mg, Al and Ti. During the process for forming the second recording layer 30, the at least one metal selected from the group consisting of Mg, Al and Ti acts on the mixture of $ZnS$ and $SiO_2$ as a reducing agent and as a result, Zn is separated from S and simple substances of Zn are uniformly dispersed in the second recording layer 30.

On the other hand, although not altogether clear, it is reasonable to conclude that the at least one metal selected from the group consisting of Mg, Al and Ti combines a part of S separated from Zn or S contained in ZnS to form a compound.

In this embodiment, the mole ratio of ZnS to $SiO_2$ of the mixture of ZnS and $SiO_2$ contained in the target used for forming the second recording layer 30 is preferably set to be 50:50 to 90:10 and more preferably set to be about 80:20.

In the case where the mole ratio of ZnS in the mixture of ZnS and $SiO_2$ is set equal to or larger than 50%, the reflection coefficient and the light transmittance of the second recording layer 30 with respect to a laser beam can be simultaneously improved and in the case where the mole ratio of ZnS in the mixture of ZnS and $SiO_2$ is set equal to or smaller than 90%, it is possible to effectively prevent cracks from being generated in the second recording layer 30 owing to stress.

Further, in the case where the mole ratio of ZnS to $SiO_2$ of the mixture of ZnS and $SiO_2$ is set to be about 80:20, both of the reflection coefficient and the light transmittance of the second recording layer 30 with respect to a laser beam can be much more improved, while it is possible to more effectively prevent cracks from being generated in the second recording layer 30.

In this embodiment, in the case where Mg is contained in the second recording layer 30, the content of Mg is preferably 18.5 atomic % to 33.7 atomic % and more preferably 20 atomic % to 33.5 atomic %.

On the other hand, in the case where Al is contained in the second recording layer 30, the content of Al is preferably 11 atomic % to 40 atomic % and more preferably 18 atomic % to 32 atomic %.

Further, in the case where Ti is contained in the second recording layer 30, the content of Ti is preferably 8 atomic % to 34 atomic % and more preferably 10 atomic % to 26 atomic %.

Figure 8:
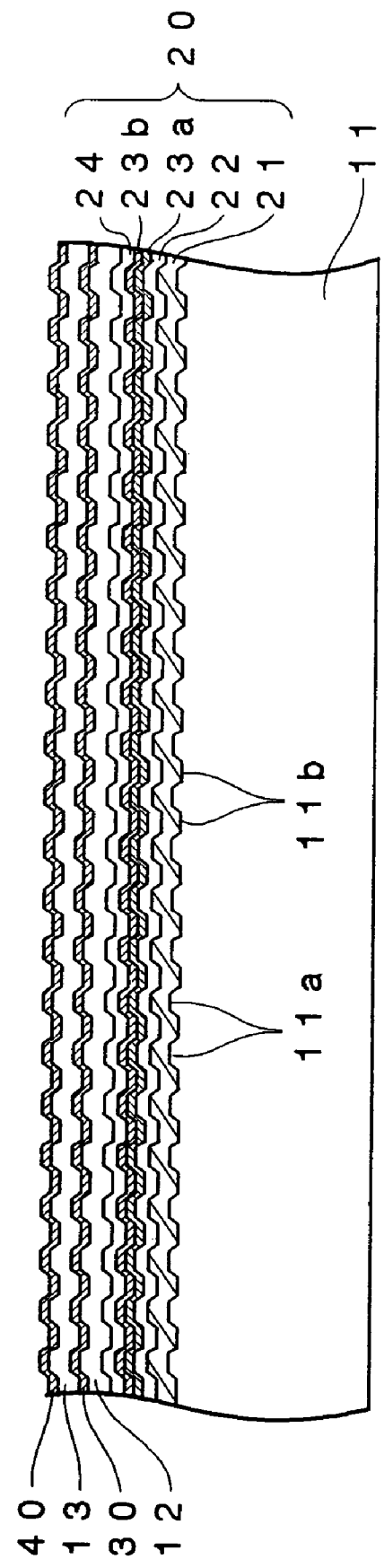
FIG. 8 shows a step for manufacturing an optical recording medium that is a preferred embodiment of the present invention.

Then, as shown in FIG. 8, an ultraviolet ray curable resin is applied onto the second recording layer 30 by a spin coating method to form a coating film and the surface of the coating film is irradiated with an ultraviolet ray via a stamper (not shown) while it is covered by the stamper, thereby forming the second intermediate layer 13 formed with grooves 13a and lands 13b on the surface thereof.

Further, as shown in FIG. 8, the third recording layer 40 is formed on the surface of the second intermediate layer 13 by a vapor growth process such as a sputtering process using a target consisting of the mixture of $ZnS$ and $SiO_2$ and a target consisting of at least one metal selected from the group consisting of Mg, Al and Ti so that the ratio D3/D2 of the thickness D3 of the third recording layer 40 to the thickness D2 of the second recording layer 40 is 0.40 to 0.70.

In this embodiment, the same targets as those used for forming the second recording layer 30 are used and therefore, the third recording layer 40 has the same composition as that of the second recording layer 30.

Finally, an ultraviolet ray curable resin is applied onto the third recording layer 40 by a spin coating method to form a coating film and the surface of the coating film is irradiated with an ultraviolet ray to cure the ultraviolet ray curable resin, thereby forming the light transmission layer 15 having a thickness of 30 μm to 200 μm.

This completes the fabrication of the optical recording medium 10.

Data are recorded in the thus constituted optical recording medium 10 according to this embodiment as follows.

In this embodiment, when data are to be recorded in the optical recording medium 10, the light incident plane 15a of the light transmission layer 15 is irradiated with a laser beam L having a wavelength of 380 nm to 450 nm and the laser beam L is focused onto one of the first recording layer 20, the second recording layer 30 and the third recording layer 40.

Figure 9:
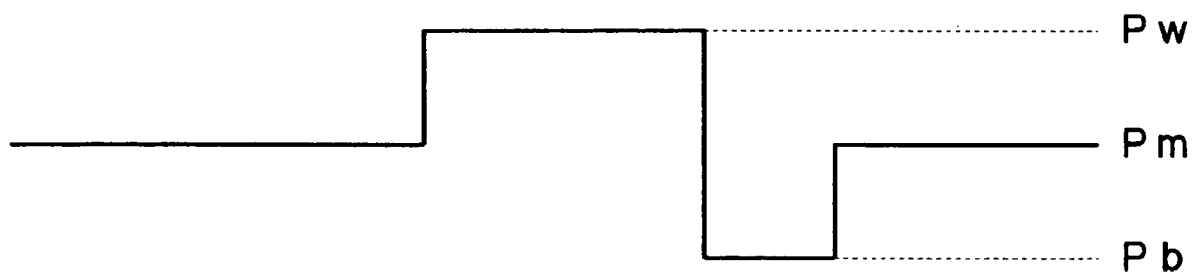
FIG. 9 is a diagram showing a pulse train pattern of a laser power control signal for controlling the power of a laser beam when data are to be recorded in an optical recording medium.

FIG. 9 is a diagram showing a pulse train pattern of a laser power control signal for controlling the power of the laser beam L when data are to be recorded in the first recording layer 20, the second recording layer 30 or the third recording layer 40.

As shown in FIG. 9, the pulse train pattern of the laser power control signal used for recording data in the first recording layer 20, the second recording layer 30 or the third recording layer 40 includes pulses whose levels are modulated between a level corresponding to the recording power Pw, a level corresponding to the intermediate power Pm and a level corresponding to the ground power Pb.

The recording power Pw, the intermediate power Pm and the ground power Pb are set so that the recording power Pw is higher than the intermediate power Pm and the intermediate power Pm is equal to or higher than the ground power Pb and the above mentioned three levels of the pulse train pattern are determined correspondingly.

When data are to be recorded in the first recording layer 20, the laser beam L whose power is modulated in accordance with the laser power control signal having the pulse train pattern shown in FIG. 9 is focused onto the first recording layer 20 and projected thereonto via the light transmission layer 15, the third recording layer 40 and the second recording layer 30.

FIG. 10 is a schematic enlarged cross-sectional view showing the first recording layer 20 before data are recorded therein and FIG. 11 is a schematic enlarged cross-sectional view showing the first recording layer 20 after data were recorded therein.

When the laser beam L is projected onto the first recording layer 20, the first recording film 23a and the second recording film 23b included in the first recording layer 20 are heated, whereby Cu contained in the first recording film 23a as a primary component and Si contained in the second recording film 23b are mixed to form a mixed region M. Since the reflection coefficient of the mixed region M with respect to the laser beam is different from those of other regions, the mixed region M can be used as a record mark.

In this embodiment, since each of the second recording layer 30 and the third recording layer 40 contains Zn, Si, S and O as a primary component and at least one metal selected from the group consisting of Mg, Al and Ti as an additive, the second recording layer 30 has a thickness of 15 nm to 50 nm and the ratio D3/D2 of the thickness D3 of the third recording layer 40 to the thickness D2 of the second recording layer 30 is 0.40 to 0.70, the second recording layer 30 and the third recording layer 40 have sufficiently high light transmittances with respect to the laser beam L. Therefore, since it is possible to suppress the reduction in the power of the laser beam L to the minimum when the laser beam L passes through the third recording layer 40 and the second recording layer 30, data can be recorded in the first recording layer 20 in a desired manner.

On the other hand, in the case where data recorded in the first recording layer 20 are to be reproduced, since it is possible to suppress the reduction in the power of the laser beam L to the minimum when the laser beam L passes through the third recording layer 40 and the second recording layer 30 and it is possible to suppress the reduction in the power of the laser beam L reflected by the first recording layer 20 to the minimum when the laser beam L passes through the second recording layer 30 and the third recording layer 40, data recorded in the first recording layer 20 can be reproduced in a desired manner.

Further, in this embodiment, since the reflective film 21 is formed between the support substrate 11 and the first recording layer 20, the laser beam L reflected by the reflective film 21 and the laser beam L reflected by the first recording layer 20 interfere with each other, whereby the change in reflection coefficient between before and after the recording of data can be increased. Therefore, data recorded in the first recording layer 20 can be reproduced with high sensitivity.

On the other hand, when data are to be recorded in the second recording layer 30, the laser beam L whose power is modulated in accordance with the laser power control signal having the pulse train pattern shown in FIG. 9 is focused onto the second recording layer 30 and projected thereonto via the light transmission layer 15 and the third recording layer 40.

When the laser beam L whose power is modulated to the recording power Pw is projected onto the second recording layer 30, the second recording layer is heated and Zn contained in the heated region of the second recording layer 30 in the form of a single substance reacts with S, whereby crystalline ZnS grains are formed. As a result, the crystalline ZnS grains nucleate and amorphous ZnS present around the crystalline ZnS grains crystallizes. Since the region where the crystalline ZnS grains have formed in this manner has a different reflection coefficient with respect to the laser beam having a wavelength of 380 nm to 450 nm from those other regions of the second recording layer 30, it can be used as a record mark and data are recorded in the second recording layer 30.

When data are to be recorded in the third recording layer 40, the laser beam L whose power is modulated in accordance with the laser power control signal having the pulse train pattern shown in FIG. 9 is focused onto the third recording layer 40 and projected thereonto via the light transmission layer 15.

In this embodiment, since the third recording layer 40 has the same composition as that of the second recording layer 30, when the laser beam L is projected onto the third recording layer 40, a region of the third recording layer 40 irradiated with the laser beam L is crystallized and data are recorded in the third recording layer 40 similarly to the second recording layer 30.

In this embodiment, since each of the second recording layer 30 and the third recording layer 40 contains Zn, Si, S and O as a primary component and at least one metal selected from the group consisting of Mg, Al and Ti as an additive, the second recording layer 30 has a thickness of 15 nm to 50 nm and the ratio D3/D2 of the thickness D3 of the third recording layer 40 to the thickness D2 of the second recording layer 30 is 0.40 to 0.70, the second recording layer 30 and the third recording layer 40 can be formed so that an amount of the laser beam L absorbed by the second recording layer 30 and that absorbed by the third recording layer 40 can be made substantially equal to each other and that the absorption coefficient of the second recording layer 30 with respect to the laser beam L having a power and projected thereonto and that of the third recording layer with respect to the laser beam L having a power and projected thereonto are sufficiently high, namely, 10% to 30%. Therefore, according to this embodiment, it is possible to record data in the second recording layer 30 and the third recording layer 40 in a desired manner.

In this embodiment, the recording power Pw of the laser beam L is set for each of the first recording layer 20, the second recording layer 30 and the third recording layer 40 in which data are to be recorded.

More specifically, when data are to be recorded in the first recording layer 20, the recording power Pw is set to such a level that Cu contained in the first recording film 23a as a primary component and Si contained in the second recording film 23b as a primary component can be reliably mixed by projecting the laser beam L onto the first recording layer 20, thereby forming a mixed region M. On the other hand, when data are to be recorded in the second recording layer 30 or the third recording layer 40, the recording power Pw is set to such a level that Zn and S contained in the second recording layer 30 or the third recording layer 40 can be reliably combined by projecting the laser beam L onto the second recording layer 30 or the third recording layer 40, thereby forming ZnS.

Similarly, the intermediate power Pm and the ground power Pb of the laser beam L are set for each of the first recording layer 20, the second recording layer 30 and the third recording layer 40 in which data are to be recorded.

More specifically, when data are to be recorded in the first recording layer 20, the intermediate power Pm or the ground power Pb is set to such a level that Cu contained in the first recording film 23a as a primary component and Si contained in the second recording film 23b as a primary component cannot be mixed even when the laser beam L of the intermediate power Pm or the ground power Pb is projected onto the first recording layer 20. On the other hand, when data are to be recorded in the second recording layer 30 or the third recording layer 40, the intermediate power Pm or the ground power Pb is set to such a level that Zn and S contained in the second recording layer 30 or the third recording layer 40 cannot be combined even when the laser beam L of the intermediate power Pm or the ground power Pb is projected onto the first recording layer 20.

In particular, the ground power Pb is set to an extremely low level so that a region heated by the laser beam L whose power is set to the recording power Pw can be quickly cooled by switching the level of the laser beam L from the recording power Pw to the ground power Pb.

Figure 12:
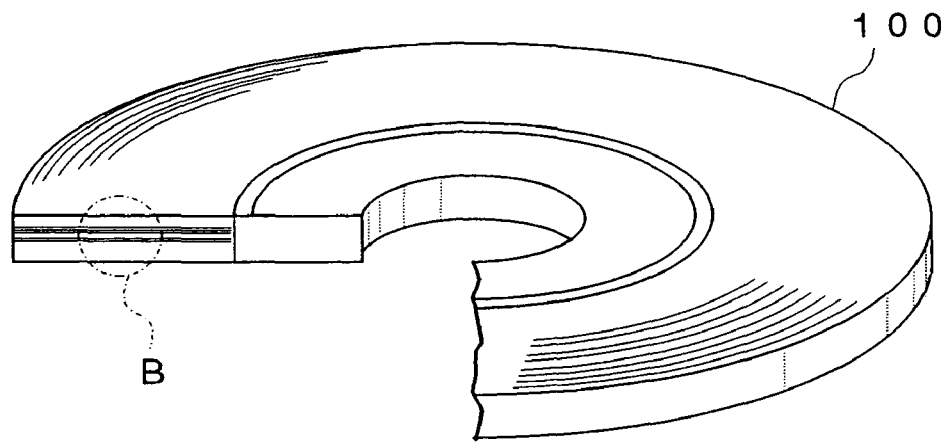
FIG. 12 is a schematic perspective view showing an optical recording medium that is another preferred embodiment of the present invention.
Figure 13:
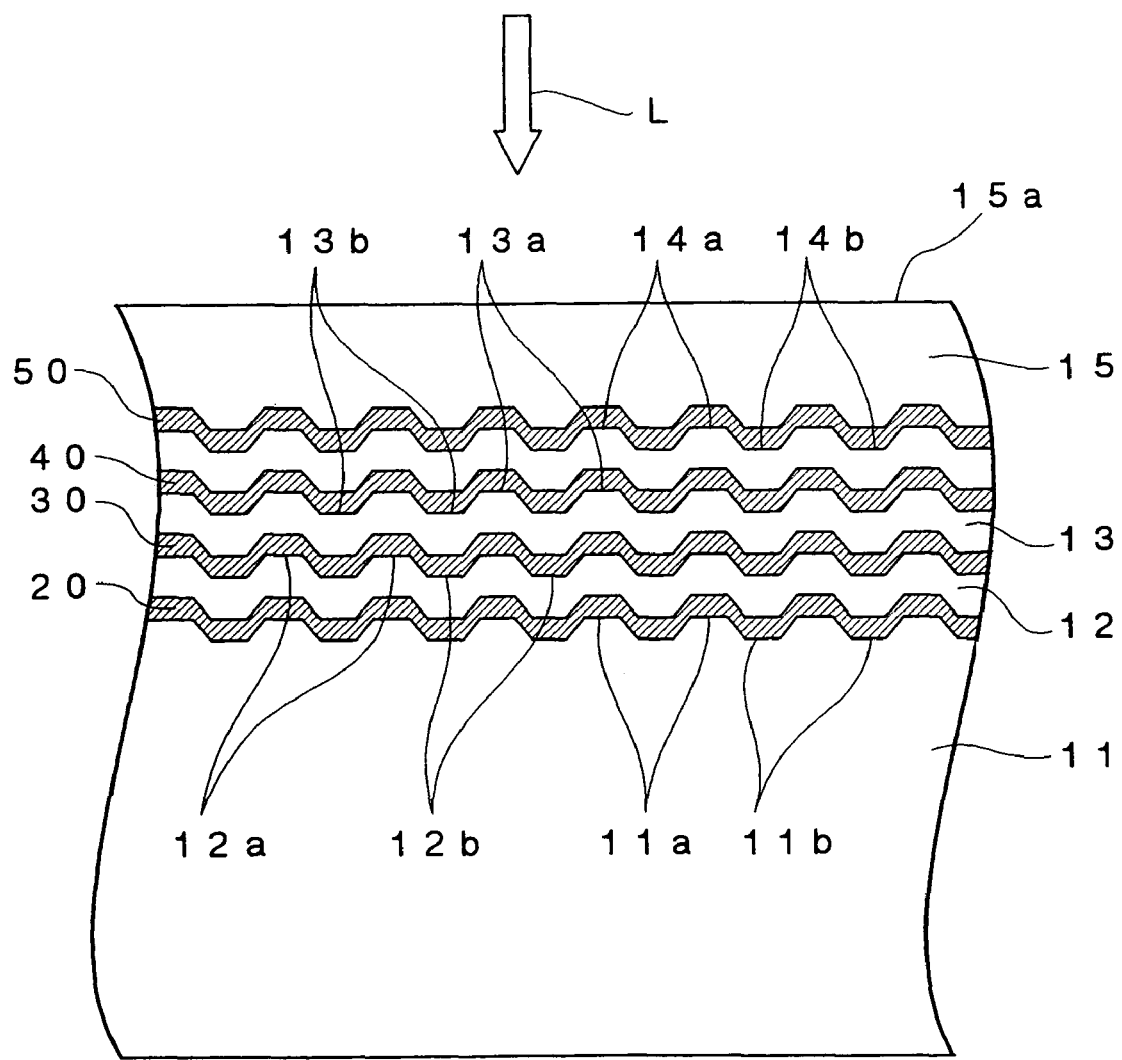
FIG. 13 is an enlarged schematic cross-sectional view of the part of the optical recording medium indicated by B in FIG. 12.

FIG. 12 is a schematic perspective view showing an optical recording medium that is another preferred embodiment of the present invention and FIG. 13 is an enlarged schematic cross-sectional view of the part of the optical recording medium indicated by B in FIG. 12.

As shown in FIG. 13, the optical recording medium 100 according to this embodiment includes a support substrate 11, a first recording layer 20 formed on the surface of the support substrate 11, a first intermediate layer 12 formed on the surface of the first recording layer 20, a second recording layer 30 formed on the surface of the first intermediate layer 12, a second intermediate layer 13 formed on the surface of the second recording layer 30, a third recording layer 40 formed on the surface of the second intermediate layer 13, a third intermediate layer 14 formed on the surface of the third recording layer 40, a fourth recording layer 50 formed on the surface of the third intermediate layer 14 and a light transmission layer 15 formed on the surface of the fourth recording layer 50 and has a similar configuration to that of the optical recording medium 10 shown in FIGS. 1 and 2 except that the third intermediate layer 14 and the fourth recording layer 50 are formed and that the it has four recording layers.

The third intermediate layer 14 serves to space the third recording layer 40 and the fourth recording layer 50 apart by a physically and optically sufficient distance.

As shown in FIG. 13, grooves 14a and lands 14b are alternately formed on the surface of the third intermediate layer 14. The grooves 14a and/or lands 14b formed on the surface of the third intermediate layer 14 serve as a guide track for the laser beam L when data are to be recorded in the fourth recording layer 50 or when data are to be reproduced from the fourth recording layer 50.

The material for forming the third intermediate layer 14 is not particularly limited insofar as it has a high light transmittance for the laser beam L and an ultraviolet ray curable acrylic resin is preferably used for forming the third intermediate layer 14 similarly to the first intermediate layer 12 and the second intermediate layer 13.

It is preferable to form the fourth intermediate layer 14 so as to have a thickness of 5 μm to 50 μm and it is more preferable to form it so as to have a thickness of 10 μm to 40 μm.

The fourth recording layer 50 is formed on the surface of the third intermediate layer 14 by a vapor growth process such as a sputtering process using a target consisting of the mixture of ZnS and $SiO_2$ and a target consisting of at least one metal selected from the group consisting of Mg, Al and Ti.

In this embodiment, the same targets as those used for forming the second recording layer 30 and the third recording layer 40 are used and therefore, the fourth recording layer 50 has the same composition as that of each of the second recording layer 30 and the third recording layer 40.

The second recording layer 30, the third recording layer 40 and the fourth recording layer 50 are formed so that the second recording layer 30 has a thickness of 20 nm to 50 nm, that the ratio D3/D2 of the thickness D3 of the third recording layer 40 to the thickness D2 of the second recording layer 30 is 0.48 to 0.93, that the ratio D4/D2 of the thickness D4 of the fourth recording layer 50 to the thickness D2 of the second recording layer 30 is 0.39 to 0.70, and the thickness D2 of the second recording layer 30, the thickness D3 of the third recording layer 40 and the thickness D4 of the fourth recording layer 50 satisfy D2>D3>D4.

The inventors of the present invention conducted a study regarding the case where each of the second recording layer 30, the third recording layer 40 and the fourth recording layer 50 contains Zn, Si, S and O as a primary component and at least one metal selected from the group consisting of Mg, Al and Ti as an additive, the thickness D2 of the second recording layer 30, the thickness D3 of the third recording layer 40 and the thickness D4 of the fourth recording layer 50 satisfy D2>D3>D4 . As a result, they found that in such a case each of the second recording layer 30, the third recording layer 40 and the fourth recording layer 50 has a sufficiently high light transmittance with respect to the laser beam L. Therefore, according to this embodiment, since it is possible to suppress the reduction in the power of the laser beam L to the minimum when the laser beam L passes through the fourth recording layer 50, the third recording layer 40 and the second recording layer 30, data can be recorded in the first recording layer 20 in a desired manner. On the other hand, in the case where data recorded in the first recording layer 20 are to be reproduced, since it is possible to suppress the reduction in the power of the laser beam L to the minimum when the laser beam L passes through the third recording layer 40, the second recording layer 30 and the fourth recording layer 50 and it is possible to suppress the reduction in the power of the laser beam L reflected by the first recording layer 20 to the minimum when the laser beam L passes through the second recording layer 30, the third recording layer 40 and the fourth recording layer 50, data recorded in the first recording layer 20 can be reproduced in a desired manner.

Furthermore, the inventors of the present invention carried out a study regarding the case where each of the second recording layer 30, the third recording layer 40 and the fourth recording layer 50 contains Zn, Si, S and O as a primary component and at least one metal selected from the group consisting of Mg, Al and Ti as an additive and the thickness D2 of the second recording layer 30, the thickness D3 of the third recording layer 40 and the thickness D4 of the fourth recording layer 50 satisfy D2>D3>D4 . As a result, they found that in such a case the reflection coefficient of the recording layer farther from the light incidence plane 15a with respect to the laser beam L can be increased. Therefore, according to this embodiment, it is possible to reproduce data not only from the first recording layer 20 but also from the second recording layer 30, the third recording layer 40 and the fourth recording layer 50 in a desired manner.

Moreover, the inventors of the present invention conducted a study regarding the case where each of the second recording layer 30, the third recording layer 40 and the fourth recording layer 50 is contains Zn, Si, S and O as a primary component and at least one metal selected from the group consisting of Mg, Al and Ti as an additive, the second recording layer 30 has a thickness of 20 nm to 50 nm, the ratio D3/D2 of the thickness D3 of the third recording layer 40 to the thickness D2 of the second recording layer 30 is 0.48 to 0.93, and the ratio D4/D2 of the thickness D4 of the fourth recording layer 50 to the thickness D2 of the second recording layer 30 is 0.39 to 0.70 As a result they found that in such a case the second recording layer 30, the third recording layer 40 and the fourth recording layer 50 can be formed so that the amount of the laser beam L absorbed by the second recording layer 30, that absorbed by the third recording layer 40 and that absorbed by the fourth recording layer 50 can be made substantially equal to each other and that each of the absorption coefficients of the second recording layer 30, the third recording layer 40 and the fourth recording layer 50 with respect to the laser beam L having a power and projected thereonto via the light transmission layer 15 are sufficiently high, namely, 10% to 20%. Therefore, according to this embodiment, it is possible to record data in the second recording layer, the third recording layer and the fourth recording layer 50 in a desired manner.

Further, the inventors of the present invention conducted a study regarding the case where each of the second recording layer 30, the third recording layer 40 and the fourth recording layer 50 contains Zn, Si, S and O as a primary component and at least one metal selected from the group consisting of Mg, Al and Ti as an additive, the second recording layer 30 has a thickness of 20 nm to 50 nm, the ratio D3/D2 of the thickness D3 of the third recording layer 40 to the thickness D2 of the second recording layer 30 is 0.48 to 0.93, and the ratio D4/D2 of the thickness D4 of the fourth recording layer 50 to the thickness D2 of the second recording layer 30 is 0.39 to 0.70. As a result they found that in such a case the second recording layer 30, the third recording layer 40 and the fourth recording layer 50 can be formed so that the reflection coefficients of the second recording layer 30, the third recording layer 40 and the fourth recording layer 50 are substantially equal to each other and that each of them has a sufficiently high reflection coefficient. Therefore, according to this embodiment, it is possible to reproduce data from the second recording layer 30, the third recording layer 40 and the fourth recording layer 50 in a desired manner.

WORKING EXAMPLES

Hereinafter, working examples will be set out in order to further clarify the advantages of the present invention.

Working Example 1

An optical recording disk sample #1 was fabricated in the following manner.

A polycarbonate substrate having a thickness of 1.1 mm and a diameter of 120 mm and formed with grooves and lands on the surface thereof was first fabricated by an injection molding process so that the groove pitch was equal to 0.32 μm.

Then, the polycarbonate substrate was set on a sputtering apparatus and a reflective film consisting of an alloy of Ag, Pd and Cu and having a thickness of 100 nm, a second dielectric film containing a mixture of ZnS and $SiO_2$ and having a thickness of 39 nm, a first recording film containing Cu as a primary component, added with 23 atomic % of Al and 13 atomic % of Au and having a thickness of 5 nm, a second recording film containing Si as a primary component and having a thickness of 5 nm and a first dielectric film containing the mixture of ZnS and $SiO_2$ and having a thickness of 20 nm were sequentially formed on the surface of the polycarbonate substrate on which the grooves and lands were formed, using the sputtering process, thereby forming a first recording layer on the surface of the polycarbonate substrate.

The mole ratio of ZnS to $SiO_2$ in the mixture of ZnS and $SiO_2$ contained in the first dielectric layer and the second dielectric layer was 80:20.

Further, the polycarbonate substrate formed with the first recording layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 10 μm and formed with grooves and lands on the surface thereof so that the groove pitch was equal to 0.32 μm was formed by removing the stamper.

Then, the polycarbonate substrate formed with the first intermediate layer on the surface thereof was set on the sputtering apparatus and a second recording layer having a thickness of 32 nm was formed by the sputtering process using a mixture target consisting of the mixture of ZnS and $SiO_2$ and a target consisting of Mg.

The mole ratio of ZnS to $SiO_2$ in the mixture of ZnS and $SiO_2$ contained in the target was 80:20.

The composition of the second recording layer was measured by the FP method using a fluorescent X-ray apparatus "RIX2000" (Product Name) manufactured by Rigaku Corporation, by generating an X-ray under conditions of an X-ray tube voltage of the Rh tube of 50 kV and an X-ray tube current of 50 mA. As a result, it was found that the second recording layer contained 21.5 atomic % of Zn, 10.1 atomic % of Si, 20.8 atomic % of Mg, 20.1 atomic % of O and 27.5 atomic % of S. Since O was contained in the polycarbonate substrate, the content of O was determined to be about double the content of Si, assuming that O combined with Si to form $SiO_2$.

Then, similarly to the manner of forming the first intermediate layer on the first recording layer, a second intermediate layer having a thickness of 10 μm was formed by the sputtering process on the second recording layer and similarly to the manner of forming the second recording layer on the first intermediate layer, a third recording layer having a thickness of 24 nm was formed by the sputtering process on the second intermediate layer.

Further, similarly to the manner of forming the first intermediate layer on the first recording layer, a third intermediate layer having a thickness of 10 μm was formed by the sputtering process on the second recording layer and similarly to the manner of forming the second recording layer on the first intermediate layer, a fourth recording layer having a thickness of 18 nm was formed by the sputtering process on the third intermediate layer.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 85 μm.

Thus, the optical recording disk sample #1 was fabricated.

Then, the optical recording disk sample #1 was set in an optical recording medium evaluation apparatus "DDU1000" (Product Name) manufactured by Pulstec Industrial Co., Ltd. and data were recorded as follows.

A blue laser beam having a wavelength of 405 nm was used as a laser beam for recording data and the laser beam was condensed onto the first recording layer via the light transmission layer using an objective lens having a numerical aperture of 0.85, thereby forming record marks each having a length of 2 T in the (1,7) RLL Modulation Code and record marks each having a length of 8 T in the first recording layer under the following signal recording conditions., Further, the laser beam was condensed onto the first recording layer via the light transmission layer and data were recorded therein by randomly combining record marks having a length of 2 T to 8 T.

As a laser power control signal for controlling the power of the laser beam, the pulse train pattern shown in FIG. 9 was used so that the recording power Pw of the laser beam was set to 5 mW, the intermediate power Pm was set to 4 mW and the ground power Pb was set to 3 mW Further, data were sequentially recorded in the first recording layer by increasing the recording power Pw of the laser beam little by little in the range of 5 mW to 12 mW.

Modulation Code: (1,7) RLL
Linear recording velocity: 5.3 m/sec
Channel bit length: 0.12 μm
Channel clock: 66 MHz
Recording Track: On-groove recording Then, the laser beam whose power was set to the reproducing power was projected onto the first recording layer of the optical recording disk sample #1 using the above mentioned optical recording medium evaluation apparatus, thereby reproducing data recorded in a track between two tracks in which data were recorded and the reflection coefficient of a region where no record mark was formed, a C/N ratio of a signal obtained by reproducing data recorded by forming record marks each having a length of 2 T, a C/N ratio of a signal obtained by reproducing data recorded by forming record marks each having a length of 8 T and clock jitter of a signal obtained by reproducing data recorded by randomly forming record marks having lengths of 2 T to 8 T were measured.

Since the optical recording disk sample #1 had four recording layers and the laser beam projected onto the first recording layer and reflected from the optical recording disk sample #1 included the laser beam reflected by the second recording layer, the third recording layer and the fourth recording layer in addition to the laser beam reflected by the first recording layer, influence of the laser beam reflected by the second recording layer, the third recording layer and the fourth recording layer was removed in the following manner and the reflection coefficient of the first recording layer was measured.

Specifically, an optical recording disk sample including only a single recording layer and optical recording disk samples including two recording layers laminated via an intermediate layer of different thickness were prepared and the reflection coefficient of the single recording layer of the optical recording disk sample including the single recording layer was measured. Then, the reflection coefficient of the farther recording layer from the light incidence plane of each of the optical recording disk samples having two recording layers was measured and compared with that of the optical recording disk sample.

As a result, it was found that in the case where the intermediate layer had a thickness of 10 mm, 8% of the reflection coefficient of the farther recording layer from the light incidence plane was caused by the laser beam reflected by the closer recording layer to the light incidence plane and that in the case where the intermediate layer had a thickness of 15 mm, 2% of the reflection coefficient of the farther recording layer from the light incidence plane was caused by the laser beam reflected by the closer recording layer to the light incidence plane. Based on these results, the influences of the second recording layer, the third recording layer and the fourth recording layer of the optical recording disk sample #1 on the reflection coefficient of the first recording layer were calculated and the reflection coefficient of the first recording layer was calculated by subtracting the influences of these recording layers from the amount of the laser beam reflected from the optical recording disk sample #1 when the laser beam was projected onto the first recording layer.

The C/N ratios of the reproduced signals were measured using a spectrum analyzer "spectrum analyzer XK180" (Product Name) manufactured by Advantest Corporation.

The fluctuation σ of a reproduced signal was measured using a time interval analyzer and the clock jitter was calculated as σ/Tw, where Tw was one clock period. When the clock jitter was measured, a limit equalizer was used and jitter was measured for 4 ms.

When data were reproduced, the laser beam having a wavelength of 405 nm and an objective lens having a numerical aperture of 0.85 were used and the reproducing power of the laser beam was set to 0.7 mW.

Further, the recording power Pw of the laser beam at which the C/N ratio of a signal obtained by varying the recording power Pw of the laser beam from 5 mW to 12 mW and reproducing data recorded in the first recording layer of the optical recording disk sample #1 was minimum was measured and the C/N ratio and jitter of a signal obtained by reproducing data recorded in the first recording layer of the optical recording disk sample #1 at the recording power Pwwere measured.

The results of the measurement are shown in Table 1.

Then, the laser beam was sequentially projected onto the second recording layer, the third recording layer and the fourth recording layer of the optical recording disk sample #1 using the above mentioned optical recording medium evaluation apparatus, thereby forming record marks each having a length of 2 T in the (1,7) RLL Modulation Code and record marks each having a length of 8 T.

Further, the laser beam was sequentially projected onto the second recording layer, the third recording layer and the fourth recording layer of the optical recording disk sample #1 using the above mentioned optical recording medium evaluation apparatus, thereby randomly forming record marks having lengths of 2 T to 8 T to record data therein.

As a laser power control signal for controlling the power of the laser beam, the pulse train pattern shown in FIG. 9 was used with the recording power Pw of the laser beam set to 5 mW, the intermediate power Pm set to 4 mW and the ground power Pb set to 3 mW.

Further, data were sequentially recorded in the second recording layer, the third recording layer and the fourth recording layer of the optical recording disk sample #1 by increasing the recording power Pw of the laser beam little by little in the range of 0.5 mW to 12 mW, similarly to the case of recording data in the first recording layer of the optical recording disk sample #1.

Then, the laser beam whose power was set to the reproducing power was sequentially projected onto the second recording layer, the third recording layer and the fourth recording layer of the optical recording disk sample #1 using the above mentioned optical recording medium evaluation apparatus, whereby the reflection coefficient of a region where no record mark was formed, a C/N ratio of a signal obtained by reproducing data recorded by forming record marks each having a length of 2 T, a C/N ratio of a signal obtained by reproducing data recorded by forming record marks each having a length of 8 T and clock jitter of a signal obtained by reproducing data recorded by randomly forming record marks having lengths of 2 T to 8 T were measured.

When data were reproduced, similarly to the case of reproducing data recorded in the first recording layer, data recorded in a track between two tracks in which data were recorded were reproduced.

The reflection coefficients of the second recording layer, the third recording layer and the fourth recording layer of the optical recording disk sample #1 were calculated similarly to the case of calculating the reflection coefficient of the first recording layer.

Further, the recording power Pw of the laser beam at which the C/N ratio of a signal obtained by varying the recording power Pw of the laser beam from 5 mW to 12 mW and reproducing data recorded in each of the second recording layer, the third recording layer and the fourth recording layer of the optical recording disk sample #1 was minimum was measured and the C/N ratio and jitter of a signal obtained by reproducing data recorded in each of the second recording layer, the third recording layer and the fourth recording layer of the optical recording disk sample #1 at the recording power Pw were measured.

The results of the measurement are shown in Table 1.

TABLE 1

|  | reflection coefficient (%) | 2T: C/N (dB) | 8T: C/N (dB) | jitter (%) | recording power (mW) |
|---|---|---|---|---|---|
| fourth recording layer | 4.7 | 41.2 | 49.6 | 10.5 | 12 |
| third recording layer | 5.4 | 44.0 | 49.8 | 9.8 | 12 |
| second recording layer | 3.7 | 44.3 | 53.5 | 9.8 | 10 |
| first recording layer | 4.6 | 39.4 | 53.0 | 10.7 | 9 |

As shown in Table 1, the reflection coefficients of regions of the first recording layer, the second recording layer, the third recording layer and the fourth recording layer of the optical recording disk sample #1 where no record mark was formed were 4.6%, 3.7%, 5.4% and 4.7%, respectively, and it was found that the reflection coefficients of regions of the first recording layer, the second recording layer, the third recording layer and the fourth recording layer of the optical recording disk sample #1 were equal to or higher than 3.0% and sufficiently high.

Further, as shown in Table 1, it was found that the C/N ratio of the signal obtained by reproducing data recorded by forming record marks each having a length of 2 T in each of the first recording layer, the second recording layer, the third recording layer and the fourth recording layer of the optical recording disk sample #1 was equal to or higher than 39 dB, that the C/N ratio of a signal obtained by reproducing data recorded by forming record marks each having a length of 8 T in each of the first recording layer, the second recording layer, the third recording layer and the fourth recording layer of the optical recording disk sample #1 was equal to or higher than 49 dB and that reproduced signals having high C/N ratios could be obtained.

Moreover, as shown in Table 1, jitter of the signal obtained by reproducing data recorded by randomly forming record marks having lengths of 2 T to 8 T in each of the first recording layer, the second recording layer, the third recording layer and the fourth recording layer of the optical recording disk sample #1 was equal to or lower than 11% and reproduced signals having low jitter could be obtained.

Then, the state of the fourth recording layer of the optical recording disk sample #1 was inspected as follows.

First, optical recording disk samples #1-1, #1-2 and #1-3 were fabricated in the manner of the optical recording disk sample #1 and data were recorded in a part of the fourth recording layer of each of the optical recording disk samples #1-1, #1-2 and #1-3 similarly to the case of recording data in the optical recording disk sample #1.

The optical recording disk sample #1-1 was incised using a cutter to peel the light transmission layer, thereby exposing the fourth recording layer to the outside. Then, a dielectric film having a thickness of 20 nm and containing $Al_2O_3$ as a primary component and a metal film having a thickness of 100 nm and containing Al as a primary component were sequentially formed on the exposed fourth recording layer by the sputtering process.

Then, a hole having a diameter of about 2 mm was formed in the dielectric film and the metal film of the optical recording disk sample #1-1 by locally sputtering the surface of the metal film, thereby exposing the fourth recording layer to the outside.

Further, energy spectrums in a region of the fourth recording layer of the optical recording disk sample #1-1 where a record mark was formed and a region thereof where no record mark was formed were measured using an Auger spectrum analysis apparatus "SAM680" (Product Name) manufactured by ALVAC-PHI, Inc. under the following measurement conditions.

Acceleration voltage: 5 kV

Tilt: 30 degrees

Sample current: 10 nA

Ar ion beam sputter-etching acceleration voltage: 2 kV

The energy spectrum in which a metal energy spectrum and a compound energy spectrum appeared to be mixed was measured at the region where no record mark was formed and, on the other hand, only the compound energy spectrum was measured at the region where the record mark was formed.

Then, the optical recording disk sample #1-2 was incised using a cutter to remove the light transmission layer, the fourth recording layer and the third intermediate layer and the thus removed light transmission layer, fourth recording layer and third intermediate layer were bonded onto a slide glass using an ultraviolet ray curable resin in such a manner that the light transmission layer was brought into contact with the slide glass.

Further, light absorption coefficients with respect to a laser beam having a wavelength of 405 nm of a region of the fourth recording layer of the optical recording disk sample #1-2 where the record mark was formed and a region thereof where no record mark was formed were measured using an optical film thickness measuring apparatus "ETA-RT" (Product Name) manufactured by steag ETA-OPTIK Co, Ltd.

The light absorption coefficient of the region where no record mark was formed was 17% and that of the region where the record mark was formed was 13%.

It was reasonable to conclude that the light absorption coefficient of the region where the record mark was formed was lower than that of the region where no record mark was formed because free electrons of Zn absorbing much light combined with S to form a compound, whereby the number of free electrons of Zn decreased in the region where the record mark was formed.

Then, the optical recording disk sample #1-3 was cut using a microtome to form a sample for a transmission electron microscope and the electron diffraction pattern of the fourth recording layer was measured using a transmission electron microscope "JEM-3010" (Product Name) manufactured by JEOL LTD. The acceleration voltage was set to 300 kV.

As a result, a broad diffraction ring of ZnS was observed at the region of the fourth recording layer of the optical recording disk sample #1-3 where no record mark was formed and, on the other hand, a spot of ZnS was observed at the region thereof where the record mark was formed.

From the above experiments, it was reasonable to conclude that Zn was present in the form of a simple substance and a compound with S at the region of the fourth recording layer where no record mark was formed, namely, the fourth recording layer before data were recorded, and that crystals of ZnS formed by the combination of Zn and S were present at the region of the fourth recording layer where the record mark was formed, namely, the fourth recording layer after data were recorded.

Working Example 2

A polycarbonate substrate having a thickness of 1.1 mm and a diameter of 120 mm was set on a sputtering apparatus and a recording layer having a thickness of 18 nm was formed on the polycarbonate substrate by the sputtering process using a mixture target consisting of the mixture of ZnS and $SiO_2$ and a target consisting of Mg, thereby fabricating an optical recording disk sample #2.

The mole ratio of ZnS to $SiO_2$ in the mixture of ZnS and $SiO_2$ contained in the target was 80:20.

The composition of the recording layer of the optical recording disk sample #2 was measured similarly to in Working Example 1. It was found that the recording layer contained 21.5 atomic % of Zn, 10.1 atomic % of Si, 20.8 atomic % of Mg, 20.1 atomic % of O and 27.5 atomic % of S.

Then, a polycarbonate substrate having a thickness of 1.1 mm and a diameter of 120 mm was set on a sputtering apparatus and a recording layer having a thickness of 24 nm was formed on the polycarbonate substrate by the sputtering process using a mixture target consisting of the mixture of ZnS and $SiO_2$ and a target consisting of Mg, thereby fabricating an optical recording disk sample #3.

The mole ratio of ZnS to $SiO_2$ in the mixture of ZnS and $SiO_2$ contained in the target was 80:20.

The composition of the recording layer of the optical recording disk sample #3 was measured similarly to in Working Example 1. It was found that the recording layer contained 21.5 atomic % of Zn, 10.1 atomic % of Si, 20.8 atomic % of Mg, 20.1 atomic % of O and 27.5 atomic % of S.

Further, a polycarbonate substrate having a thickness of 1.1 mm and a diameter of 120 mm was set on a sputtering apparatus and a recording layer having a thickness of 32 nm was formed on the polycarbonate substrate by the sputtering process using a mixture target consisting of the mixture of ZnS and $SiO_2$ and a target consisting of Mg, thereby fabricating an optical recording disk sample #4.

The mole ratio of ZnS to $SiO_2$ in the mixture of ZnS and $SiO_2$ contained in the target was 80:20.

The composition of the recording layer of the optical recording disk sample #4 was measured similarly to in Working Example 1. It was found that the recording layer contained 21.5 atomic % of Zn, 10.1 atomic % of Si, 20.8 atomic % of Mg, 20.1 atomic % of O and 27.5 atomic % of S.

A laser beam was sequentially projected onto the optical recording disk samples #2 to #4 using the above mentioned optical film thickness measuring apparatus and the light transmittance T1 of the recording layer of the optical recording disk sample #2, the light transmittance T2 of the recording layer of the optical recording disk sample #3 and the light transmittance T3 of the recording layer of the optical recording disk sample #4 were measured.

The results of the measurement are shown in Table 2.

TABLE 2

|  | light transmittance(%) |
|---|---|
| sample #2 | 80 |
| sample #3 | 69 |
| sample #4 | 63 |

As shown in Table 2, the light transmittance T1 of the recording layer of the optical recording disk sample #2, the light transmittance T2 of the recording layer of the optical recording disk sample #3 and the light transmittance T3 of the recording layer of the optical recording disk sample #4 were 80%, 69% and 63%, respectively, and they exceeded 60% and were very high.

Working Example 3

An optical recording disk sample #5 was fabricated in the manner of the optical recording disk sample #1 except that when the second recording layer, the third recording layer and the fourth recording layer were formed using a target consisting of a mixture of $La_2O_3$, $SiO_2$ and $Si_3N_4$ whose mole ratio was 20:30:50 instead of the target consisting of the mixture of ZnS and $SiO_2$ was 80:20 so that the second recording layer had thickness of 28 nm, the third recording layer had a thickness of 18 nm and the fourth recording layer had a thickness of 15 nm.

The compositions of the second recording layer, the third recording layer and the fourth recording layer of the optical recording disk sample #5 were measured similarly to in Working Example 1. It was found that each of the second recording layer, the third recording layer and the fourth recording layer contained 6.2 atomic % of La, 24.1 atomic % of Si, 23.1 atomic % of Mg, 24.6 atomic % of O and 22.0 atomic % of N.

Since O is contained in the polycarbonate substrate, the content of O was determined as follows. The content of Si combined with N in $Si_3N_4$ was first calculated based on the content of N contained in the optical recording disk sample #5 and the thus calculated content of Si was subtracted from the content of Si contained in the optical recording disk sample #5, thereby calculating the content of Si in $SiO_2$. The content of O in $SiO_2$ was calculated by doubling the content of Si in $SiO_2$. Then, the content of O combined with La in $La_2O_3$ was calculated based on the content of La contained in the optical recording disk sample #5 and the content of O contained in the optical recording disk sample #5 was calculated by adding the content of O combined with Si in $SiO_2$ to the content of O combined with La in $La_2O_3$.

Then, the above mentioned optical recording medium evaluating apparatus was used to sequentially project a laser beam whose power was set to the reproducing power onto the first recording layer, the second recording layer, the third recording layer and the fourth recording layer of the optical recording disk sample #5 and the reflection coefficients thereof where no record mark was formed were measured. The reproducing power of the laser beam was set to 0.7 mW The reflection coefficients of the first recording layer, the second recording layer, the third recording layer and the fourth recording layer of the optical recording disk sample #5 were measured in the manner of Working Example 1

The results of the measurement are shown in Table 3.

TABLE 3

|  | reflection coefficient (%) |
| --- | --- |
| fourth recording layer | 3.6 |
| third recording layer | 4.8 |
| second recording layer | 4.3 |
| first recording layer | 3.3 |

As shown in Table 3, the reflection coefficients of the first recording layer, the second recording layer, the third recording layer and the fourth recording layer of the optical recording disk sample #5 where no record mark was formed were 3.3%, 4.3%, 4.8% and 3.3%, respectively, and it was found that each of the reflection coefficients of the first recording layer, the second recording layer, the third recording layer and the fourth recording layer of the optical recording disk sample #5 was equal to or higher than 3.0% and sufficiently high.

Then, the fourth recording layer of the optical recording disk sample #5 was inspected similarly to in Working Example 1. Compounds of La and O were observed at the region of the fourth recording layer onto which the laser beam for recording data was projected and in which a record mark was formed.

Working Example 4

An optical recording disk sample #6 was fabricated in the following manner.

Similarly to in Working Example 1, a polycarbonate substrate was fabricated and a first recording layer and a first intermediate layer were sequentially formed on the surface of the polycarbonate substrate.

Then, the polycarbonate substrate formed with the first recording layer and the first intermediate layer on the surface thereof was set on a sputtering apparatus and a second recording layer having a thickness of 35 nm was formed on the surface of the first intermediate layer by the sputtering process using a target consisting of ZnS and a target consisting of Mg.

The composition of the second recording layer was inspected similarly to in Working Example 1. It was found that the second recording layer contained 39.1 atomic % of Zn, 47.0 atomic % of S and 13.9 atomic % of Mg.

Then, similarly to the manner of forming the first intermediate layer on the first recording layer, a second intermediate layer having a thickness of 10 μm was formed by the sputtering process on the second recording layer and similarly to the manner of forming the second recording layer on the first intermediate layer, a third recording layer having a thickness of 21 nm was formed by the sputtering process on the second intermediate layer.

The composition of the third recording layer was inspected similarly to in Working Example 1. It was found that the third recording layer contained 39.1 atomic % of Zn, 47.0 atomic % of S and 13.9 atomic % of Mg.

Further, similarly to the manner of forming the first intermediate layer on the first recording layer, a third intermediate layer having a thickness of 10 μm was formed by the sputtering process on the second recording layer and similarly to the manner of forming the second recording layer on the first intermediate layer, a fourth recording layer having a thickness of 17 nm was formed by the sputtering process on the third intermediate layer.

The composition of the fourth recording layer was inspected similarly to in Working Example 1. It was found that the fourth recording layer contained 39.1 atomic % of Zn, 47.0 atomic % of S and 13.9 atomic % of Mg.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #1 was fabricated.

Then, an optical recording disk sample #7 was fabricated in the manner of the optical recording disk sample #6 except that the electric power used in the sputtering process was changed and the second recording layer, the third recording layer and the fourth recording layer were formed so that each of them contained 34.8 atomic % of Zn, 44.2 atomic % of S and 20.0 atomic % of Mg.

Further, an optical recording disk sample #8 was fabricated in the manner of the optical recording disk sample #6 except that the electric power used in the sputtering process was changed and the second recording layer, the third recording layer and the fourth recording layer were formed so that each of them contained 32.9 atomic % of Zn, 42.8 atomic % of S and 24.3 atomic % of Mg.

Then, an optical recording disk sample #9 was fabricated in the manner of the optical recording disk sample #6 except that the electric power used in the sputtering process was changed and the second recording layer, the third recording layer and the fourth recording layer were formed so that each of them contained 28.9 atomic % of Zn, 37.6 atomic % of S and 33.5 atomic % of Mg.

Further, an optical recording disk sample #10 was fabricated in the manner of the optical recording disk sample #6 except that the electric power used in the sputtering process was changed and the second recording layer, the third recording layer and the fourth recording layer were formed so that each of them contained 29.9 atomic % of Zn, 30.2 atomic % of S and 39.9 atomic % of Mg.

Then, the above mentioned optical recording medium evaluation apparatus was used to condense a laser beam onto the fourth recording layer of the optical recording disk sample #6 via the light transmission layer and record marks each having a length of 8 T were formed, thereby recording data therein. The recording power Pw of the laser beam was set to 5 mW.

Further, data were sequentially recorded in the fourth recording layer of the optical recording disk sample #6 by increasing the recording power Pw of the laser beam little by little in the range of 5 mW to 12 mW Then, a laser beam whose power was set to the reproducing power was projected using the above mentioned optical recording medium evaluation apparatus onto the fourth recording layer of the optical recording disk sample #6, whereby data recorded in the fourth recording layer were reproduced and the C/N ratio of the reproduced signal was measured. The reproducing power of the laser beam was set to 1.0 mW Further, the recording power Pw of the laser beam at which the C/N ratio of a signal obtained by varying the recording power Pw of the laser beam from 5 mW to 12 mW and reproducing data recorded in the fourth recording layer of the optical recording disk sample #6 was minimum was measured and the C/N ratio of a signal obtained by reproducing data recorded in the fourth recording layer of the optical recording disk sample #6 at the recording power Pw was measured.

The results of the measurement are shown in Table 4.

Then, the above mentioned optical recording medium evaluation apparatus was used to sequentially focus a laser beam onto the first recording layer, the second recording layer and the third recording layer of the optical recording disk sample #6 and whether or not the laser beam could be focused onto each of the first recording layer, the second recording layer and the third recording layer in a desired manner was judged.

The results of the judgment are shown in Table 4.

In Table 4, the evaluation "GOOD" indicates that the laser beam could be focused onto all of the first recording layer, the second recording layer and the third recording layer of the optical recording disk sample #6 and the evaluation "BAD" indicates that the laser beam could not be focused onto at least one of the first recording layer, the second recording layer and the third recording layer of the optical recording disk sample #6.

Then, the above mentioned optical recording medium evaluation apparatus was used to sequentially project a laser beam whose recording power Pw was set to 5 mW onto the fourth recording layers of the optical recording disk samples #7 to #10 and record marks each having a length of 8 T, thereby recording data therein.

Further, data were sequentially recorded in the fourth recording layer of each of the optical recording disk samples #7 to #10 by increasing the recording power Pw of the laser beam little by little in the range of 5 mW to 12 mW.

Then, data recorded in the fourth recording layer of each of the optical recording disk samples #7 to #10 were reproduced using the above mentioned optical recording medium evaluation apparatus and the C/N ratio of the reproduced signal was measured. Further, the above mentioned optical recording medium evaluation apparatus was used to sequentially focus the laser beam onto the first recording layer, the second recording layer and the third recording layer of each of the optical recording disk samples #7 to #10 and whether or not the laser beam could be focused onto each of the first recording layer, the second recording layer and the third recording layer in a desired manner was judged.

Further, the recording power Pw of the laser beam at which the C/N ratio of a signal obtained by varying the recording power Pw of the laser beam from 5 mW to 12 mW and reproducing data recorded in the fourth recording layer of each of the optical recording disk samples #7 to #10 was minimum was measured and the C/N ratio of a signal obtained by reproducing data recorded in the fourth recording layer of each of the optical recording disk samples #7 to #10 at the recording power Pw were measured.

The results of the measurement and the judgment are shown in Table 4.

TABLE 4

| | composition (atomic %) | | | recording power | 8T: C/N | |
|---|---|---|---|---|---|---|
| | Zn | S | Mg | (mW) | (dB) | focusing |
| sample #6 | 39.1 | 47.0 | 13.9 | 12 | 10.6 | GOOD |
| sample #7 | 34.8 | 44.2 | 20.0 | 12 | 40.7 | GOOD |
| sample #8 | 32.9 | 42.8 | 24.3 | 10 | 49.1 | GOOD |
| sample #9 | 28.9 | 37.6 | 33.5 | 7 | 48.8 | GOOD |
| sample #10 | 29.9 | 30.2 | 39.9 | 7 | 43.4 | BAD |

As shown in Table 4, it was found that in the optical recording disk samples #7 to #9 containing 20 atomic % to 35 atomic % of Mg, the C/N of the signal obtained by reproducing data recorded in the fourth recording layer of each of them was equal to or higher than 40 dB and that the laser beam could be focused onto the first recording layer, the second recording layer and the third recording layer of each of them in a desired manner.

To the contrary, it was found that in the optical recording disk sample #6 containing less than 20 atomic % of Mg, the C/N of the signal obtained by reproducing data recorded in the fourth recording layer thereof was lower than 40 dB and that in the optical recording disk sample #10 containing more than 35 atomic % of Mg, the laser beam could not be focused onto the first recording layer, the second recording layer and the third recording layer thereof in a desired manner.

Working Example 5

An optical recording disk sample #11 was fabricated in the manner of the optical recording disk sample #6 except that the second recording layer, the third recording layer and the fourth recording layer were formed using a target consisting of Al instead of the target consisting of Mg.

The compositions of the second recording layer, the third recording layer and the fourth recording layer of the optical recording disk sample #11 were measured similarly to in Working Example 1. It was found that each of the second recording layer, the third recording layer and the fourth recording layer contained 39.7 atomic % of Zn, 50.3 atomic % of S and 10.0 atomic % of AL.

Further, an optical recording disk sample #12 was fabricated in the manner of the optical recording disk sample #11 except that the electric power used in the sputtering process was changed and the second recording layer, the third recording layer and the fourth recording layer were formed so that each of them contained 35.7 atomic % of Zn, 45.4 atomic % of S and 18.9 atomic % of Al.

Then, an optical recording disk sample #13 was fabricated in the manner of the optical recording disk sample #11 except that the electric power used in the sputtering process was changed and the second recording layer, the third recording layer and the fourth recording layer were formed so that each of them contained 32.8 atomic % of Zn, 41.6 atomic % of S and 25.6 atomic % of Al.

Further, an optical recording disk sample #14 was fabricated in the manner of the optical recording disk sample #11 except that the electric power used in the sputtering process was changed and the second recording layer, the third recording layer and the fourth recording layer were formed so that each of them contained 29.7 atomic % of Zn, 39.0 atomic % of S and 31.3 atomic % of Al.

Then, an optical recording disk sample #15 was fabricated in the manner of the optical recording disk sample #11 except that the electric power used in the sputtering process was changed and the second recording layer, the third recording layer and the fourth recording layer were formed so that each of them contained 25.3 atomic % of Zn, 33.5 atomic % of S and 41.2 atomic % of Al.

Further, similarly to in the Working Example 4, the above mentioned optical recording medium evaluation apparatus was used to condense a laser beam onto the fourth recording layer of each of the optical recording disk samples #11 to #15 via the light transmission layer and record marks each having a length of 8 T were formed, thereby recording data therein. The recording power Pw of the laser beam was set to 5 mW.

Furthermore, data were sequentially recorded in the fourth recording layer of each of the optical recording disk samples #11 to #15 by increasing the recording power Pw of the laser beam little by little in the range of 5 mW to 12 mW.

Then, similarly to in the Working Example 4, data recorded in the fourth recording layer of each of the optical recording disk samples #11 to #15 were reproduced using the above mentioned optical recording medium evaluation apparatus and the C/N ratio of the signal reproduced from each of them was measured.

Further, the recording power Pw of the laser beam at which the C/N ratio of a signal obtained by varying the recording power Pw of the laser beam from 5 mW to 12 mW and reproducing data recorded in the fourth recording layer of each of the optical recording disk samples #11 to #15 was minimum was measured and the C/N ratio of a signal obtained by reproducing data recorded in the fourth recording layer of each of them at the recording power Pw were measured.

Then, similarly to the Working Example 4, a laser beam was focused using the above mentioned optical recording medium evaluation apparatus onto the first recording layer, the second recording layer and the third recording layer of each of the optical recording disk samples #11 to #15 and whether or not the laser beam could be focused onto the first recording layer, the second recording layer and the third recording layer of each of them in a desired manner was judged.

The results of the measurement and the judgment are shown in Table 5.

TABLE 5

| | composition (atomic %) | | | recording power | 8T: C/N | |
|---|---|---|---|---|---|---|
| | Zn | S | Al | (mW) | (dB) | focusing |
| sample #11 | 39.7 | 50.3 | 10.0 | 12 | 30.8 | GOOD |
| sample #12 | 35.7 | 45.4 | 18.9 | 12 | 42.9 | GOOD |
| sample #13 | 32.8 | 41.6 | 25.6 | 12 | 47.7 | GOOD |
| sample #14 | 29.7 | 39.0 | 31.3 | 8 | 47.8 | GOOD |
| sample #15 | 25.3 | 33.5 | 41.2 | 5 | 42.2 | BAD |

As shown in Table 5, it was found that in the optical recording disk samples #12 to #14 containing 18 atomic % to 32 atomic % of Al, the C/N of the signal obtained by reproducing data recorded in the fourth recording layer of each of them was equal to or higher than 40 dB and that the laser beam could be focused onto the first recording layer, the second recording layer and the third recording layer of each of them in a desired manner.

To the contrary, it was found that in the optical recording disk sample #11 containing less than 18 atomic % of Al, the C/N of the signal obtained by reproducing data recorded in the fourth recording layer thereof was lower than 40 dB and that in the optical recording disk sample #15 containing more than 32 atomic % of Al, the laser beam could not be focused onto the first recording layer, the second recording layer and the third recording layer thereof in a desired manner.

Working Example 6

An optical recording disk sample #16 was fabricated in the manner of the optical recording disk sample #6 except that the second recording layer having a thickness of 30 nm, the third recording layer having a thickness of 18 nm and the fourth recording layer having a thickness of 14 nm were formed using a target consisting of Ti instead of the target consisting of Mg.

The compositions of the second recording layer, the third recording layer and the fourth recording layer of the optical recording disk sample #16 were measured similarly to in Working Example 1. It was found that each of the second recording layer, the third recording layer and the fourth recording layer contained 43.6 atomic % of Zn, 48.8 atomic % of S and 7.6 atomic % of Ti.

Further, an optical recording disk sample #17 was fabricated in the manner of the optical recording disk sample #16 except that the electric power used in the sputtering process was changed and the second recording layer, the third recording layer and the fourth recording layer were formed so that each of them contained 41.8 atomic % of Zn, 47.9 atomic % of S and 10.3 atomic % of Ti.

Then, an optical recording disk sample #18 was fabricated in the manner of the optical recording disk sample #16 except that the electric power used in the sputtering process was changed and the second recording layer, the third recording layer and the fourth recording layer were formed so that each of them contained 38.3 atomic % of Zn, 46.6 atomic % of S and 14.8 atomic % of Ti.

Further, an optical recording disk sample #19 was fabricated in the manner of the optical recording disk sample #16 except that the electric power used in the sputtering process was changed and the second recording layer, the third recording layer and the fourth recording layer were formed so that each of them contained 35.7 atomic % of Zn, 42.2 atomic % of S and 22.1 atomic % of Ti.

Then, an optical recording disk sample #20 was fabricated in the manner of the optical recording disk sample #16 except that the electric power used in the sputtering process was changed and the second recording layer, the third recording layer and the fourth recording layer were formed so that each of them contained 33.9 atomic % of Zn, 40.1 atomic % of S and 26.0 atomic % of Ti.

Further, an optical recording disk sample #21 was fabricated in the manner of the optical recording disk sample #16 except that the electric power used in the sputtering process was changed and the second recording layer, the third recording layer and the fourth recording layer were formed so that each of them contained 30.8 atomic % of Zn, 33.8 atomic % of S and 35.4 atomic % of Ti.

Then, similarly to in the Working Example 4, the above mentioned optical recording medium evaluation apparatus was used to condense a laser beam onto the fourth recording layer of each of the optical recording disk samples #16 to #21 via the light transmission layer and record marks each having a length of 8 T were formed, thereby recording data therein. The recording power Pw of the laser beam was set to 5 mW.

Furthermore, data were sequentially recorded in the fourth recording layer of each of the optical recording disk samples #16 to #21 by increasing the recording power Pw of the laser beam little by little in the range of 5 mW to 12 mW.

Then, similarly to in the Working Example 4, data recorded in the fourth recording layer of each of the optical recording disk samples #16 to #21 were reproduced using the above mentioned optical recording medium evaluation apparatus and the C/N ratio of the signal reproduced from each of them was measured.

Further, the recording power Pw of the laser beam at which the C/N ratio of a signal obtained by varying the recording power Pw of the laser beam from 5 mW to 12 mW and reproducing data recorded in the fourth recording layer of each of the optical recording disk samples #16 to #21 was minimum was measured and the C/N ratio of a signal obtained by reproducing data recorded in the fourth recording layer of each of them at the recording power Pw were measured.

Then, similarly to the Working Example 4, the above mentioned optical recording medium evaluation apparatus was used to focus a laser beam onto the first recording layer, the second recording layer and the third recording layer of each of the optical recording disk samples #16 to #21 and whether or not the laser beam could be focused onto the first recording layer, the second recording layer and the third recording layer of each of them in a desired manner was judged.

The results of the measurement and the judgment are shown in Table 6.

TABLE 6

| | composition (atomic %) | | | recording power (mW) | 8T: C/N (dB) | focusing |
|---|---|---|---|---|---|---|
| | Zn | S | Ti | | | |
| sample #16 | 43.6 | 48.8 | 7.6 | 12 | 18.9 | GOOD |
| sample #17 | 41.6 | 47.9 | 10.3 | 12 | 41.7 | GOOD |
| sample #18 | 38.3 | 46.6 | 14.8 | 8 | 46.7 | GOOD |
| sample #19 | 35.7 | 42.2 | 22.1 | 7 | 49.9 | GOOD |
| sample #20 | 33.9 | 40.1 | 26.0 | 6 | 51.3 | GOOD |
| sample #21 | 30.8 | 33.8 | 35.4 | 5 | 43.0 | BAD |

As shown in Table 6, it was found that in the optical recording disk samples #17 to #20 containing 10 atomic % to 26 atomic % of Ti, the C/N of the signal obtained by reproducing data recorded in the fourth recording layer of each of them was equal to or higher than 40 dB and that the laser beam could be focused onto the first recording layer, the second recording layer and the third recording layer of each of them in a desired manner.

To the contrary, it was found that in the optical recording disk sample #16 containing less than 10 atomic % of Ti, the C/N of the signal obtained by reproducing data recorded in the fourth recording layer thereof was lower than 40 dB and that in the optical recording disk sample #21 containing more than 26 atomic % of Ti, the laser beam could not be focused onto the first recording layer, the second recording layer and the third recording layer thereof in a desired manner.

Working Example 7

An optical recording disk sample #22 was fabricated in the manner of the optical recording disk sample #6 except that when the second recording layer, the third recording layer and the fourth recording layer were formed using a target consisting of a mixture of ZnS and $SiO_2$ whose mole ratio was 80:20 instead of the target consisting of ZnS so that the third recording layer had a thickness of 24 nm.

The compositions of the second recording layer, the third recording layer and the fourth recording layer of the optical recording disk sample #22 were measured similarly to in Working Example 1. It was found that each of the second recording layer, the third recording layer and the fourth recording layer contained 21.8 atomic % of Zn, 10.8 atomic % of Si, 18.3 atomic % of Mg, 21.6 atomic % of O and 27.5 atomic % of S.

Further, an optical recording disk sample #23 was fabricated in the manner of the optical recording disk sample #22 except that the electric power used in the sputtering process was changed and the second recording layer, the third recording layer and the fourth recording layer were formed so that each of them contained 21.5 atomic % of Zn, 10.1 atomic % of Si, 20.8 atomic % of Mg, 20.1 atomic % of O and 27.5 atomic % of S.

Then, an optical recording disk sample #24 was fabricated in the manner of the optical recording disk sample #22 except that the electric power used in the sputtering process was changed and the second recording layer, the third recording layer and the fourth recording layer were formed so that each of them contained 20.0 atomic % of Zn, 9.7 atomic % of Si, 23.6 atomic % of Mg, 19.4 atomic % of O and 27.3 atomic % of S.

Further, an optical recording disk sample #25 was fabricated in the manner of the optical recording disk sample #22 except that the electric power used in the sputtering process was changed and the second recording layer, the third recording layer and the fourth recording layer were formed so that each of them contained 20.3 atomic % of Zn, 9.1 atomic % of Si, 25.6 atomic % of Mg, 18.2 atomic % of O and 27.0 atomic % of S.

Then, an optical recording disk sample #26 was fabricated in the manner of the optical recording disk sample #22 except that the electric power used in the sputtering process was changed and the second recording layer, the third recording layer and the fourth recording layer were formed so that each of them contained 19.6 atomic % of Zn, 8.3 atomic % of Si, 30.8 atomic % of Mg, 16.6 atomic % of O and 24.7 atomic % of S.

Further, an optical recording disk sample #27 was fabricated in the manner of the optical recording disk sample #22 except that the electric power used in the sputtering process was changed and the second recording layer, the third recording layer and the fourth recording layer were formed so that each of them contained 19.1 atomic % of Zn, 8.0 atomic % of Si, 33.9 atomic % of Mg, 16.0 atomic % of O and 23.0 atomic % of S.

Then, similarly to in the Working Example 4, the above mentioned optical recording medium evaluation apparatus was used to condense a laser beam onto the fourth recording layer of each of the optical recording disk samples #22 to #27 via the light transmission layer and record marks each having a length of 8 T were formed, thereby recording data therein. The recording power Pw of the laser beam was set to 5 mW.

Furthermore, data were sequentially recorded in the fourth recording layer of each of the optical recording disk samples

22 to #27 by increasing the recording power Pw of the laser beam little by little in the range of 5 mW to 12 mW.

Then, similarly to in the Working Example 4, data recorded in the fourth recording layer of each of the optical recording disk samples #22 to #27 were reproduced using the above mentioned optical recording medium evaluation apparatus and the C/N ratio of the signal reproduced from each of them was measured.

Further, the recording power Pw of the laser beam at which the C/N ratio of a signal obtained by varying the recording power Pw of the laser beam from 5 mW to 12 mW and reproducing data recorded in the fourth recording layer of each of the optical recording disk samples #22 to #27 was minimum was measured and the C/N ratio of a signal obtained by reproducing data recorded in the fourth recording layer of each of them at the recording power Pw were measured.

Then, similarly to in the Working Example 4, the above mentioned optical recording medium evaluation apparatus was used to focus a laser beam onto the first recording layer, the second recording layer and the third recording layer of each of the optical recording disk samples #22 to #27 and whether or not the laser beam could be focused onto the first recording layer, the second recording layer and the third recording layer of each of them in a desired manner was judged.

The results of the measurement and the judgment are shown in Table 7.

TABLE 7

| | composition (atomic %) | | | | | recording power (mW) | 8T: C/N (dB) | focusing |
|---|---|---|---|---|---|---|---|---|
| | Zn | Si | Mg | O | S | | | |
| sample #22 | 21.8 | 10.8 | 18.3 | 21.6 | 27.5 | 12 | 30.0 | GOOD |
| sample #23 | 21.5 | 10.1 | 20.8 | 20.1 | 27.5 | 11 | 48.8 | GOOD |
| sample #24 | 20.0 | 9.7 | 23.6 | 19.4 | 27.3 | 12 | 46.4 | GOOD |
| sample #25 | 20.3 | 9.1 | 25.6 | 18.2 | 27.0 | 11 | 50.3 | GOOD |
| sample #26 | 19.6 | 8.3 | 30.8 | 16.6 | 24.7 | 8 | 52.4 | GOOD |
| sample #27 | 19.1 | 8.0 | 33.9 | 16.0 | 23.0 | 6 | 53.8 | BAD |

As shown in Table 7, it was found that in the optical recording disk samples #23 to #26 containing 20 atomic % to 31 atomic % of Mg, the C/N of the signal obtained by reproducing data recorded in the fourth recording layer of each of them was equal to or higher than 40 dB and that the laser beam could be focused onto the first recording layer, the second recording layer and the third recording layer of each of them in a desired manner.

To the contrary, it was found that in the optical recording disk sample #22 containing less than 20 atomic % of Mg, the C/N of the signal obtained by reproducing data recorded in the fourth recording layer thereof was lower than 40 dB and that in the optical recording disk sample #27 containing more than 31 atomic % of Mg, the laser beam could not be focused onto the first recording layer, the second recording layer and the third recording layer thereof in a desired manner.

Working Example 8

An optical recording disk sample #28 was fabricated in the manner of the optical recording disk sample #6 except that when the second recording layer, the third recording layer and the fourth recording layer were formed using a target consisting of a mixture of ZnS and SiO$_2$ whose mole ratio was 50:50 instead of the target consisting of ZnS so that the third recording layer had a thickness of 24 nm.

The compositions of the second recording layer, the third recording layer and the fourth recording layer of the optical recording disk sample #28 were measured similarly to in Working Example 1. It was found that each of the second recording layer, the third recording layer and the fourth recording layer contained 14.5 atomic % of Zn, 16.6 atomic % of Si, 17.8 atomic % of Mg, 33.2 atomic % of O and 17.9 atomic % of S.

Further, an optical recording disk sample #29 was fabricated in the manner of the optical recording disk sample #28 except that the electric power used in the sputtering process was changed and the second recording layer, the third recording layer and the fourth recording layer were formed so that each of them contained 13.1 atomic % of Zn, 15.9 atomic % of Si, 23.3 atomic % of Mg, 31.8 atomic % of O and 16.9 atomic % of S.

Then, an optical recording disk sample #30 was fabricated in the manner of the optical recording disk sample #28 except that the electric power used in the sputtering process was changed and the second recording layer, the third recording layer and the fourth recording layer were formed so that each of them contained 12.9 atomic % of Zn, 15.0 atomic % of Si, 26.1 atomic % of Mg, 30.0 atomic % of O and 16.0 atomic % of S.

Further, an optical recording disk sample #31 was fabricated in the manner of the optical recording disk sample #28 except that the electric power used in the sputtering process was changed and the second recording layer, the third recording layer and the fourth recording layer were formed so that each of them contained 11.8 atomic % of Zn, 13.2 atomic % of Si, 32.8 atomic % of Mg, 26.4 atomic % of O and 15.8 atomic % of S.

Then, an optical recording disk sample #32 was fabricated in the manner of the optical recording disk sample #28 except that the electric power used in the sputtering process was changed and the second recording layer, the third recording layer and the fourth recording layer were formed so that each of them contained 9.7 atomic % of Zn, 10.7 atomic % of Si, 46.2 atomic % of Mg, 21.4 atomic % of O and 12.2 atomic % of S.

Then, similarly to in the Working Example 4, the above mentioned optical recording medium evaluation apparatus was used to condense a laser beam onto the fourth recording layer of each of the optical recording disk samples #28 to #32 via the light transmission layer and record marks each having a length of 8 T were formed, thereby recording data therein. The recording power Pw of the laser beam was set to 5 mW.

Furthermore, data were sequentially recorded in the fourth recording layer of each of the optical recording disk samples #28 to #32 by increasing the recording power Pw of the laser beam little by little in the range of 5 mW to 12 mW.

Then, similarly to in the Working Example 4, data recorded in the fourth recording layer of each of the optical recording disk samples #28 to #32 were reproduced using the above mentioned optical recording medium evaluation apparatus and the C/N ratio of the signal reproduced from each of them was measured.

Further, the recording power Pw of the laser beam at which the C/N ratio of a signal obtained by varying the recording power Pw of the laser beam from 5 mW to 12 mW and reproducing data recorded in the fourth recording layer of each of the optical recording disk samples #28 to #32 was minimum was measured and the C/N ratio of a signal obtained by reproducing data recorded in the fourth recording layer of each of them at the recording power Pw were measured.

Then, similarly to in the Working Example 4, the above mentioned optical recording medium evaluation apparatus was used to focus a laser beam onto the first recording layer, the second recording layer and the third recording layer of each of the optical recording disk samples #28 to #32 and whether or not the laser beam could be focused onto the first recording layer, the second recording layer and the third recording layer of each of them in a desired manner was judged.

The results of the measurement and the judgment are shown in Table 8.

TABLE 8

| | composition (atomic %) | | | | | recording power | 8T: C/N | focus- |
|---|---|---|---|---|---|---|---|---|
| | Zn | Si | Mg | O | S | (mW) | (dB) | ing |
| sample #28 | 14.5 | 16.6 | 17.8 | 33.2 | 17.9 | 12 | 16.6 | GOOD |
| sample #29 | 13.1 | 15.9 | 22.3 | 31.8 | 16.9 | 12 | 43.6 | GOOD |
| sample #30 | 12.9 | 15.0 | 26.1 | 30.0 | 16.0 | 10 | 48.6 | GOOD |
| sample #31 | 11.8 | 13.2 | 32.8 | 26.4 | 15.8 | 7 | 46.1 | GOOD |
| sample #32 | 9.5 | 10.7 | 46.2 | 21.4 | 12.2 | 6 | 36.3 | BAD |

As shown in Table 8, it was found that in the optical recording disk samples #29 to #31 containing 20 atomic % to 33 atomic % of Mg, the C/N of the signal obtained by reproducing data recorded in the fourth recording layer of each of them was equal to or higher than 40 dB and that the laser beam could be focused onto the first recording layer, the second recording layer and the third recording layer of each of them in a desired manner.

To the contrary, it was found that in the optical recording disk sample #28 containing less than 20 atomic % of Mg, the C/N of the signal obtained by reproducing data recorded in the fourth recording layer thereof was lower than 40 dB and that in the optical recording disk sample #32 containing more than 33 atomic % of Mg, the laser beam could not be focused onto the first recording layer, the second recording layer and the third recording layer thereof in a desired manner.

Working Example 9

An optical recording disk sample #33 was fabricated in the manner of the optical recording disk sample #6 except that when the second recording layer, the third recording layer and the fourth recording layer were formed using a target consisting of a mixture of $La_2O_3$, $SiO_2$ and $Si_3N_4$ whose mole ratio was 20:30:50 instead of the target consisting of the mixture of ZnS so that the second recording layer had thickness of 40 nm, the third recording layer had a thickness of 24 nm and the fourth recording layer had a thickness of 19 nm.

The compositions of the second recording layer, the third recording layer and the fourth recording layer of the optical recording disk sample #33 were measured similarly to in Working Example 1. It was found that each of the second recording layer, the third recording layer and the fourth recording layer contained 6.2 atomic % of La, 24.1 atomic % of Si, 23.1 atomic % of Mg, 24.6 atomic % of O and 22.0 atomic % of N.

Then, similarly to in the Working Example 4, the above mentioned optical recording medium evaluation apparatus was used to condense a laser beam onto the fourth recording layer of the optical recording disk sample #33 via the light transmission layer and record marks each having a length of 8 T were formed, thereby recording data therein. The recording power Pw of the laser beam was set to 5 mW.

Furthermore, data were sequentially recorded in the fourth recording layer of the optical recording disk sample #33 by increasing the recording power Pw of the laser beam little by little in the range of 5 mW to 12 mW.

Then, similarly to the Working Example 4, data recorded in the fourth recording layer of the optical recording disk sample #33 were reproduced using the above mentioned optical recording medium evaluation apparatus and a C/N ratio of the signal reproduced therefrom was measured.

Further, the recording power Pw of the laser beam at which the C/N ratio of a signal obtained by varying the recording power Pw of the laser beam from 5 mW to 12 mW and reproducing data recorded in the fourth recording layer of the optical recording disk sample #33 was minimum was measured and the C/N ratio of a signal obtained by reproducing data recorded in the fourth recording layer thereof at the recording power Pw were measured.

Then, similarly to in the Working Example 4, the above mentioned optical recording medium evaluation apparatus was used to focus a laser beam onto the first recording layer, the second recording layer and the third recording layer of the optical recording disk sample #33 and whether or not the laser beam could be focused onto the first recording layer, the second recording layer and the third recording layer thereof in a desired manner was judged.

The results of the measurement and the judgment are shown in Table 9.

TABLE 9

| | composition (atomic %) | | | | | recording power | 8T: C/N | focus- |
|---|---|---|---|---|---|---|---|---|
| | La | Si | Mg | O | N | (mW) | (dB) | ing |
| sample #33 | 6.2 | 24.1 | 23.1 | 24.6 | 22.0 | 12 | 50.5 | GOOD |

As shown in Table 9, it was found that the C/N of the signal obtained by reproducing data recorded in the fourth recording layer of the optical recording disk sample #33 was equal to or higher than 40 dB and that the laser beam could be focused onto the first recording layer, the second recording layer and the third recording layer thereof in a desired manner.

Working Example 10

Similarly to in the Working Example 1, a polycarbonate substrate was fabricated and a first recording layer was formed on the surface of the polycarbonate substrate.

Then, the polycarbonate substrate formed with the first recording layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 15 μm and formed with grooves and lands on the surface thereof so that the groove pitch was equal to 0.32 μm was formed by removing the stamper.

Then, the polycarbonate substrate formed with the first intermediate layer on the surface thereof was set in the sputtering apparatus and a second recording layer having a thickness of 35 nm was formed by the sputtering process using a mixture target consisting of the mixture of ZnS and SiO$_2$ and a target consisting of Mg.

The mole ratio of ZnS to SiO$_2$ in the mixture of ZnS and SiO$_2$ contained in the target was 80:20.

The composition of the second recording layer was measured similarly to in Working Example. It was found that the second recording layer contained 21.5 atomic % of Zn, 10.1 atomic % of Si, 20.8 atomic % of Mg, 20.1 atomic % of O and 27.5 atomic % of S.

Then, similarly to the manner of forming the first intermediate layer on the first recording layer, a second intermediate layer having a thickness of 15 μm was formed by the sputtering process on the second recording layer and similarly to the manner of forming the second recording layer on the first intermediate layer, a third recording layer having a thickness of 16 nm was formed by the sputtering process on the second intermediate layer.

The ratio D3/D2 of the thickness D3 of the third recording layer to the thickness D2 of the second recording layer was 0.46.

Finally, the third recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #34 was fabricated.

Then, an optical recording disk sample #35 was fabricated in the manner of fabricating the optical recording disk sample #34 except that the third recording layer was formed so that it had a thickness D3 of 19 nm and the ratio D3/D2 of the thickness D3 thereof to the thickness D2 of the second recording layer was 0.54.

Further, an optical recording disk sample #36 was fabricated in the manner of fabricating the optical recording disk sample #34 except that the third recording layer was formed so that it had a thickness D3 of 22 nm and the ratio D3/D2 of the thickness D3 thereof to the thickness D2 of the second recording layer was 0.63.

Then, an optical recording disk sample #37 was fabricated in the manner of fabricating the optical recording disk sample #34 except that the third recording layer was formed so that it had a thickness D3 of 24 nm and the ratio D3/D2 of the thickness D3 thereof to the thickness D2 of the second recording layer was 0.69.

Further, an optical recording disk comparative sample #1 was fabricated in the manner of fabricating the optical recording disk sample #34 except that the third recording layer was formed so that it had a thickness D3 of 10 nm and the ratio D3/D2 of the thickness D3 thereof to the thickness D2 of the second recording layer was 0.29.

Then, an optical recording disk comparative sample #2 was fabricated in the manner of fabricating the optical recording disk sample #34 except that the third recording layer was formed so that it had a thickness D3 of 13 nm and the ratio D3/D2 of the thickness D3 thereof to the thickness D2 of the second recording layer was 0.37.

Further, an optical recording disk comparative sample #3 was fabricated in the manner of fabricating the optical recording disk sample #34 except that the third recording layer was formed so that it had a thickness D3 of 27 nm and the ratio D3/D2 of the thickness D3 thereof to the thickness D2 of the second recording layer was 0.77.

Then, the optical recording disk sample #34 was set in the above mentioned optical recording medium evaluation apparatus and a laser beam having a wavelength of 405 nm was projected onto the first recording layer, the second recording layer and the third recording layer of the optical recording disk sample #34, thereby measuring the reflection coefficient R0 of the first recording layer, the reflection coefficient R1 of the second recording layer and the reflection coefficient R2 of the third recording layer.

The power of the laser beam was set to 1.0 mW and the laser beam was projected using an objective lens having a numerical aperture of 0.85 onto the first recording layer, the second recording layer and the third recording layer.

The reflection coefficient R0 of the first recording layer and the reflection coefficient R1 of the second recording layer were calculated similarly to in Working Example 1.

Further, the difference in the reflection coefficients was calculated by subtracting the minimum reflection coefficient among the reflection coefficient R0 of the first recording layer, the reflection coefficient R1 of the second recording layer and the reflection coefficient R2 of the third recording layer of the optical recording disk sample #34 from the maximum reflection coefficient among them.

The results of the measurement and the calculation are shown in Table 10.

Similarly to the above, the optical recording disk samples #35 to #37 and the optical recording disk comparative samples #1 to #3 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer and the reflection coefficient R2 of the third recording layer thereof were measured and the difference in reflection coefficients thereof was calculated.

The results of the measurement and the calculation are shown in Table 10.

TABLE 10

|  | D3/D2 | R2 (%) | R1 (%) | R0 (%) | difference in reflection coefficients (%) |
| --- | --- | --- | --- | --- | --- |
| sample #34 | 0.46 | 4.7 | 7.1 | 7.2 | 2.6 |
| sample #35 | 0.54 | 6.1 | 6.5 | 6.6 | 0.5 |
| sample #36 | 0.63 | 7.4 | 6.0 | 6.1 | 1.3 |
| sample #37 | 0.69 | 8.2 | 5.7 | 5.8 | 2.5 |
| comparative sample #1 | 0.29 | 2.2 | 8.5 | 8.7 | 6.5 |
| comparative sample #2 | 0.37 | 3.4 | 7.7 | 7.9 | 4.5 |
| comparative sample #3 | 0.77 | 9.4 | 5.3 | 5.4 | 4.1 |

As shown in Table 10, it was found that in the optical recording disk samples #34 to #37 in each of which the ratio D3/D2 of the thickness D3 of the third recording layer to the thickness D2 of the second recording layer was 0.40 to 0.70, the reflection coefficient R0 of the first recording layer, the reflection coefficient R1 of the second recording layer and the reflection coefficient R2 of the third recording layer of each optical recording disk sample exceeded 3% and were sufficiently high. Further, it was found that the differences in reflection coefficients of the optical recording disk samples #34 to #37 were 2.6%, 0.5%, 1.3% and 2.5%, respectively, and lower than 3.0% and that the reflection coefficient R0 of the first recording layer, the reflection coefficient R1 of the second recording layer and the reflection coefficient R2 of the third recording layer of each optical recording disk sample were substantially equal to each other.

To the contrary, it was found that in the optical recording disk comparative samples #1 to #3 in each of which the ratio D3/D2 of the thickness D3 of the third recording layer to the thickness D2 of the second recording layer was outside of the range of 0.40 to 0.70, the reflection coefficient R2 of the third recording layer of the optical recording disk comparative sample #1 was lower than 3% and the differences in reflection coefficients of the optical recording disk comparative samples #1 to #3 were 6.5%, 4.5% and 4.1%, respectively, and exceeded 3%. Therefore, it was found that the reflection coefficient R0 of the first recording layer, the reflection coefficient R1 of the second recording layer and the reflection coefficient R2 of the third recording layer of each optical recording disk comparative sample were different from each other.

Working Example 11

A polycarbonate substrate was fabricated similarly to in Working Example 1.

Then, the polycarbonate substrate was set on a sputtering apparatus and a reflective film consisting of an alloy of Ag, Pd and Cu and having a thickness of 100 nm, a second dielectric film containing a mixture of ZnS and SiO$_2$ and having a thickness of 37 nm, a first recording film containing Cu as a primary component and having a thickness of 5 nm, a second recording film containing Si as a primary component and having a thickness of 5 nm and a first dielectric film containing the mixture of ZnS and SiO$_2$ and having a thickness of 20 nm were sequentially formed on the surface of the polycarbonate substrate on which the grooves and lands were formed, using the sputtering process, thereby forming a first recording layer on the surface of the polycarbonate substrate.

The mole ratio of ZnS to SiO$_2$ in the mixture of ZnS and SiO$_2$ contained in the first dielectric layer and the second dielectric layer was 80:20.

Further, the polycarbonate substrate formed with the first recording layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 15 μm and formed with grooves and lands on the surface thereof so that the groove pitch was equal to 0.32 μm was formed by removing the stamper.

Then, the polycarbonate substrate formed with the first recording layer and the first intermediate layer on the surface thereof was set on the sputtering apparatus and a second recording layer having a thickness of 35 nm was formed by the sputtering process using a mixture target consisting of the mixture of ZnS and SiO$_2$ and a target consisting of Mg.

The mole ratio of ZnS to SiO$_2$ in the mixture of ZnS and SiO$_2$ contained in the target was 80:20.

The composition of the second recording layer was measured similarly to in Working Example 1. It was found that the second recording layer contained 21.5 atomic % of Zn, 10.1 atomic % of Si, 20.8 atomic % of Mg, 20.1 atomic % of O and 27.5 atomic % of S.

Then, similarly to the manner of forming the first intermediate layer on the first recording layer, a second intermediate layer having a thickness of 15 μm was formed by the sputtering process on the second recording layer and similarly to the manner of forming the second recording layer on the first intermediate layer, a third recording layer having a thickness of 17 nm was formed by the sputtering process on the second intermediate layer.

The ratio D3/D2 of the thickness D3 of the third recording layer to the thickness D2 of the second recording layer was 0.49.

Further, similarly to the manner of forming the first intermediate layer on the first recording layer, a third intermediate layer having a thickness of 15 μm was formed by the sputtering process on the second recording layer and similarly to the manner of forming the second recording layer on the first intermediate layer, a fourth recording layer having a thickness of 15 nm was formed by the sputtering process on the third intermediate layer.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #38 was fabricated.

Then, an optical recording disk sample #39 was fabricated in the manner of fabricating the optical recording disk sample #38 except that the third recording layer was formed so that it had a thickness D3 of 20 nm and the ratio D3/D2 of the thickness D3 thereof to the thickness D2 of the second recording layer was 0.57.

Further, an optical recording disk sample #40 was fabricated in the manner of fabricating the optical recording disk sample #38 except that the third recording layer was formed so that it had a thickness D3 of 24 nm and the ratio D3/D2 of the thickness D3 thereof to the thickness D2 of the second recording layer was 0.69.

Then, an optical recording disk sample #41 was fabricated in the manner of fabricating the optical recording disk sample #38 except that the third recording layer was formed so that it had a thickness D3 of 28 nm and the ratio D3/D2 of the thickness D3 thereof to the thickness D2 of the second recording layer was 0.80.

Further, an optical recording disk comparative sample #4 was fabricated in the manner of fabricating the optical recording disk sample #38 except that the third recording layer was formed so that it had a thickness D3 of 10 nm and the ratio D3/D2 of the thickness D3 thereof to the thickness D2 of the second recording layer was 0.29.

Then, an optical recording disk comparative sample #5 was fabricated in the manner of fabricating the optical recording disk sample #38 except that the third recording layer was formed so that it had a thickness D3 of 13 nm and the ratio D3/D2 of the thickness D3 thereof to the thickness D2 of the second recording layer was 0.37.

Further, an optical recording disk comparative sample #6 was fabricated in the manner of fabricating the optical recording disk sample #38 except that the third recording layer was formed so that it had a thickness D3 of 33 nm and the ratio D3/D2 of the thickness D3 thereof to the thickness D2 of the second recording layer was 0.94.

Then, similarly to in Working Example 10, the optical recording disk samples #38 to #41 and the optical recording disk comparative samples #4 to #6 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 11.

TABLE 11

|  | D3/D2 | R3 (%) | R2 (%) | R1 (%) | R0 (%) | difference in reflection coefficients (%) |
|---|---|---|---|---|---|---|
| sample #38 | 0.49 | 4.1 | 3.3 | 4.4 | 4.5 | 1.2 |
| sample #39 | 0.57 | 4.1 | 4.2 | 4.1 | 4.2 | 0.1 |
| sample #40 | 0.69 | 4.1 | 5.3 | 3.7 | 3.7 | 1.6 |
| sample #41 | 0.80 | 4.1 | 6.2 | 3.3 | 3.4 | 2.9 |
| comparative sample #4 | 0.29 | 4.1 | 1.4 | 5.5 | 5.6 | 4.2 |
| comparative sample #5 | 0.37 | 4.1 | 2.2 | 5.0 | 5.1 | 2.9 |
| comparative sample #6 | 0.94 | 4.1 | 6.8 | 3.1 | 3.2 | 3.7 |

As shown in Table 11, in the case where the second recording layer, the third recording layer and the fourth recording layer were formed using the target consisting of the mixture of ZnS and $SiO_2$ and the target consisting of Mg, it was found that in the optical recording disk samples #38 to #41 in each of which the ratio D3/D2 of the thickness D3 of the third recording layer to the thickness D2 of the second recording layer was 0.49 to 0.70, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #38 to #41 were 1.2%, 0.1%, 1.6%, and 2.9%, respectively, and lower than 3.0% and that the reflection coefficient R0 of the first recording layer, the reflection coefficient R1 of the second recording layer, the reflection coefficient R2 of the third recording layer and the reflection coefficient R3 of the fourth recording layer of each optical recording disk sample were substantially equal to each other.

To the contrary, it was found that in the optical recording disk comparative samples #4 to #6 in each of which the ratio D3/D2 of the thickness D3 of the third recording layer to the thickness D2 of the second recording layer was outside of the range of 0.49 to 0.70, the reflection coefficient R2 of the third recording layer of each of the optical recording disk comparative sample #4 and #5 was lower than 3% and the differences in reflection coefficients of the optical recording disk comparative samples #4 and #6 were 4.2% and 3.7% and exceeded 3%.

Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

Working Example 12

An optical recording disk sample #42 was fabricated in the manner of fabricating the optical recording disk sample #38 except that the third recording layer and the fourth recording layer were formed so that the thickness D3 of the third recording layer was equal to 20 nm and that the thickness D4 of the fourth recording layer was equal to 14 nm.

The ratio D4/D2 of the thickness D4 of the fourth recording layer to the thickness D2 of the second recording layer was 0.40.

Then, an optical recording disk sample #43 was fabricated in the manner of fabricating the optical recording disk sample #42 except that the fourth recording layer was formed so that it had a thickness D4 of 15 nm and the ratio D4/D2 of the thickness D4 thereof to the thickness D2 of the second recording layer was 0.43.

Further, an optical recording disk sample #44 was fabricated in the manner of fabricating the optical recording disk sample #42 except that the fourth recording layer was formed so that it had a thickness D4 of 19 nm and the ratio D4/D2 of the thickness D4 thereof to the thickness D2 of the second recording layer was 0.54.

Then, an optical recording disk comparative sample #7 was fabricated in the manner of fabricating the optical recording disk sample #42 except that the fourth recording layer was formed so that it had a thickness D4 of 10 nm and the ratio D4/D2 of the thickness D4 thereof to the thickness D2 of the second recording layer was 0.29.

Further, an optical recording disk comparative sample #8 was fabricated in the manner of fabricating the optical recording disk sample #42 except that the fourth recording layer was formed so that it had a thickness D4 of 25 nm and the ratio D4/D2 of the thickness D4 thereof to the thickness D2 of the second recording layer was 0.71.

Then, the optical recording disk samples #42 to #44 and the optical recording disk comparative samples #7 and #8 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 12.

TABLE 12

|  | D4/D2 | R3 (%) | R2 (%) | R1 (%) | R0 (%) | difference in reflection coefficients (%) |
|---|---|---|---|---|---|---|
| sample #42 | 0.40 | 3.8 | 4.3 | 4.2 | 4.4 | 0.5 |
| sample #43 | 0.43 | 4.3 | 4.1 | 4.0 | 4.1 | 0.3 |
| sample #44 | 0.54 | 6.1 | 3.7 | 3.6 | 3.7 | 2.5 |

TABLE 12-continued

|  | D4/D2 | R3 (%) | R2 (%) | R1 (%) | R0 (%) | difference in reflection coefficients (%) |
|---|---|---|---|---|---|---|
| comparative sample #7 | 0.29 | 2.2 | 4.8 | 4.7 | 4.8 | 2.7 |
| comparative sample #8 | 0.71 | 8.6 | 3.2 | 3.0 | 3.1 | 5.6 |

As shown in Table 12, in the case where the second recording layer, the third recording layer and the fourth recording layer were formed using the target consisting of the mixture of ZnS and SiO$_2$ and the target consisting of Mg, it was found that in the optical recording disk samples #42 to #44 in each of which the ratio D4/D2 of the thickness D4 of the fourth recording layer to the thickness D2 of the second recording layer was 0.40 to 0.54, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #42 to #44 were 0.5%, 0.3% and 2.5%, respectively, and lower than 3.0% and that the reflection coefficient R0 of the first recording layer, the reflection coefficient R1 of the second recording layer, the reflection coefficient R2 of the third recording layer and the reflection coefficient R3 of the fourth recording layer of each optical recording disk sample were substantially equal to each other.

To the contrary, it was found that in the optical recording disk comparative samples #7 and #8 in each of which the ratio D4/D2 of the thickness D4 of the fourth recording layer to the thickness D2 of the second recording layer was outside of the range 0.40 to 0.54, the reflection coefficient R3 of the fourth recording layer of the optical recording disk comparative sample #7 was lower than 3% and the difference in reflection coefficients of the optical recording disk comparative sample #8 was 5.6% and exceeded 3%. Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

Working Example 13

Similarly to in Working Example 11, a polycarbonate substrate was fabricated and a first recording layer and a first intermediate layer were sequentially formed on the surface of the polycarbonate substrate.

Then, the polycarbonate substrate formed with the first recording layer and the first intermediate layer on the surface thereof was set on the sputtering apparatus and a second recording layer having a thickness of 28 nm was formed by the sputtering process using a mixture target consisting of the mixture of ZnS and SiO$_2$ and a target consisting of Al.

The mole ratio of ZnS to SiO$_2$ in the mixture of ZnS and SiO$_2$ contained in the target was 80:20.

The composition of the second recording layer was measured similarly to in Working Example. It was found that the second recording layer contained 22.2 atomic % of Zn, 9.8 atomic % of Si, 19.3 atomic % of Al, 19.6 atomic % of O and 29.1 atomic % of S.

Then, similarly to the manner of forming the first intermediate layer on the first recording layer, a second intermediate layer having a thickness of 15 μm was formed by the sputtering process on the second recording layer and similarly to the manner of forming the second recording layer on the first intermediate layer, a third recording layer having a thickness of 15 nm was formed by the sputtering process on the second intermediate layer.

The ratio D3/D2 of the thickness D3 of the third recording layer to the thickness D2 of the second recording layer was 0.54.

Further, similarly to the manner of forming the first intermediate layer on the first recording layer, a third intermediate layer having a thickness of 15 μm was formed by the sputtering process on the second recording layer and similarly to the manner of forming the second recording layer on the first intermediate layer, a fourth recording layer having a thickness of 12 nm was formed by the sputtering process on the third intermediate layer.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #45 was fabricated.

Then, an optical recording disk sample #46 was fabricated in the manner of fabricating the optical recording disk sample #45 except that the third recording layer was formed so that it had a thickness D3 of 18 nm and the ratio D3/D2 of the thickness D3 thereof to the thickness D2 of the second recording layer was 0.64.

Further, an optical recording disk sample #47 was fabricated in the manner of fabricating the optical recording disk sample #45 except that the third recording layer was formed so that it had a thickness D3 of 22 nm and the ratio D3/D2 of the thickness D3 thereof to the thickness D2 of the second recording layer was 0.79.

Then, an optical recording disk comparative sample #9 was fabricated in the manner of fabricating the optical recording disk sample #45 except that the third recording layer was formed so that it had a thickness D3 of 10 nm and the ratio D3/D2 of the thickness D3 thereof to the thickness D2 of the second recording layer was 0.36.

Further, an optical recording disk comparative sample #10 was fabricated in the manner of fabricating the optical recording disk sample #45 except that the third recording layer was formed so that it had a thickness D3 of 27 nm and the ratio D3/D2 of the thickness D3 thereof to the thickness D2 of the second recording layer was 0.96.

Then, similarly to in Working Example 10, the optical recording disk samples #45 to #47 and the optical recording disk comparative samples #9 to #10 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 13.

TABLE 13

|  | D3/D2 | R3 (%) | R2 (%) | R1 (%) | R0 (%) | difference in reflection coefficients (%) |
|---|---|---|---|---|---|---|
| sample #45 | 0.54 | 3.6 | 3.2 | 3.9 | 3.8 | 0.7 |
| sample #46 | 0.64 | 3.6 | 4.2 | 3.5 | 3.4 | 0.8 |
| sample #47 | 0.79 | 3.6 | 5.4 | 3.0 | 3.0 | 2.4 |
| comparative sample #9 | 0.36 | 3.6 | 1.7 | 4.7 | 4.6 | 3.0 |
| comparative sample #10 | 0.96 | 3.6 | 6.7 | 2.6 | 2.6 | 4.1 |

As shown in Table 13, in the case where the second recording layer, the third recording layer and the fourth recording layer were formed using the target consisting of the mixture of ZnS and $SiO_2$ and the target consisting of Al, it was found that in the optical recording disk samples #45 to #47 in each of which the ratio D3/D2 of the thickness D3 of the third recording layer to the thickness D2 of the second recording layer was 0.54 to 0.79, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #45 to #47 were 0.7%, 0.8% and 2.4%, respectively, and lower than 3.0%, and that the reflection coefficient R0 of the first recording layer, the reflection coefficient R1 of the second recording layer, the reflection coefficient R2 of the third recording layer and the reflection coefficient R3 of the fourth recording layer of each optical recording disk sample were substantially equal to each other.

To the contrary, it was found that in the optical recording disk comparative samples #9 and #10 in each of which the ratio D3/D2 of the thickness D3 of the third recording layer to the thickness D2 of the second recording layer was outside of the range of 0.54 to 0.79, the reflection coefficient R2 of the third recording layer of the optical recording disk comparative sample #9 was lower than 3% and the difference in reflection coefficients of the optical recording disk comparative sample #10 was 4.2% exceeded 3%. Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

Working Example 14

An optical recording disk sample #48 was fabricated in the manner of fabricating the optical recording disk sample #45 except that the third recording layer and the fourth recording layer were formed so that the thickness D3 of the third recording layer was equal to 16.4 nm and that the thickness D4 of the fourth recording layer was equal to 11 nm.

The ratio D4/D2 of the thickness D4 of the fourth recording layer to the thickness D2 of the second recording layer was 0.39.

Then, an optical recording disk sample #49 was fabricated in the manner of fabricating the optical recording disk sample #48 except that the fourth recording layer was formed so that it had a thickness D4 of 13 nm and the ratio D4/D2 of the thickness D4 thereof to the thickness D2 of the second recording layer was 0.46.

Further, an optical recording disk sample #50 was fabricated in the manner of fabricating the optical recording disk sample #48 except that the fourth recording layer was formed so that it had a thickness D4 of 16 nm and the ratio D4/D2 of the thickness D4 thereof to the thickness D2 of the second recording layer was 0.57.

Then, an optical recording disk comparative sample #11 was fabricated in the manner of fabricating the optical recording disk sample #48 except that the fourth recording layer was formed so that it had a thickness D4 of 10 nm and the ratio D4/D2 of the thickness D4 thereof to the thickness D2 of the second recording layer was 0.36.

Further, an optical recording disk comparative sample #12 was fabricated in the manner of fabricating the optical recording disk sample #48 except that the fourth recording layer was formed so that it had a thickness D4 of 21 nm and the ratio D4/D2 of the thickness D4 thereof to the thickness D2 of the second recording layer was 0.75.

Then, an optical recording disk comparative sample #13 was fabricated in the manner of fabricating the optical recording disk sample #48 except that the fourth recording layer was formed so that it had a thickness D4 of 25 nm and the ratio D4/D2 of the thickness D4 thereof to the thickness D2 of the second recording layer was 0.89.

Then, similarly to in Working Example 10, the optical recording disk samples #48 to #50 and the optical recording disk comparative samples #11 to #13 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 14.

TABLE 14

|  | D4/D2 | R3 (%) | R2 (%) | R1 (%) | R0 (%) | difference in reflection coefficients (%) |
|---|---|---|---|---|---|---|
| sample #48 | 0.39 | 3.1 | 3.8 | 3.8 | 3.7 | 0.7 |
| sample #49 | 0.46 | 4.1 | 3.5 | 3.5 | 3.5 | 0.6 |
| sample #50 | 0.57 | 5.7 | 3.2 | 3.2 | 3.1 | 2.6 |
| comparative sample #11 | 0.36 | 2.7 | 4.0 | 4.0 | 3.9 | 1.3 |
| comparative sample #12 | 0.75 | 8.2 | 2.7 | 2.7 | 2.6 | 5.6 |
| comparative sample #13 | 0.89 | 10.0 | 2.3 | 2.3 | 2.3 | 7.7 |

As shown in Table 14, in the case where the second recording layer, the third recording layer and the fourth recording layer were formed using the target consisting of the mixture of ZnS and $SiO_2$ and the target consisting of Al, it was found that in the optical recording disk samples #48 to #50 in each of which the ratio D4/D2 of the thickness D4 of the fourth recording layer to the thickness D2 of the second recording layer was 0.39 to 0.57, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #48 to #50 were 0.7%, 0.6% and 2.6%, respectively, and lower than 3.0%, and that the reflection coefficient R0 of the first recording layer, the reflection coefficient R1 of the second recording layer, the reflection coefficient R2 of the third recording layer and the reflection coefficient R3 of the fourth recording layer of each optical recording disk sample were substantially equal to each other.

To the contrary, it was found that in the optical recording disk comparative samples #11 to #13 in each of which the ratio D4/D2 of the thickness D4 of the fourth recording layer to the thickness D2 of the second recording layer was outside of the range 0.39 to 0.57, the reflection coefficient R3 of the fourth recording layer of the optical recording disk comparative sample #11, the reflection coefficient R1 of the second recording layer and the reflection coefficient R2 of the third recording layer of the optical recording disk comparative sample #12 and the reflection coefficient R0 of the first recording layer, the reflection coefficient R1 of the second recording layer and the reflection coefficient R2 of the third recording layer of the optical recording disk comparative sample #13 were lower than 3% and the differences in reflection coefficients of the optical recording disk comparative samples #12 and #13 were 5.6% and 7.7% and exceeded 3%. Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

Working Example 15

Similarly to in Working Example 11, a polycarbonate substrate was fabricated and a first recording layer and a first intermediate layer were sequentially formed on the surface of the polycarbonate substrate.

Then, the polycarbonate substrate formed with the first recording layer and the first intermediate layer on the surface thereof was set on the sputtering apparatus and a second recording layer having a thickness of 21.2 nm was formed by the sputtering process using a mixture target consisting of the mixture of ZnS and $SiO_2$ and a target consisting of Zn.

The mole ratio of ZnS to $SiO_2$ in the mixture of ZnS and $SiO_2$ contained in the target was 80:20.

The composition of the second recording layer was measured similarly to in Working Example 1 and as a result, the second recording layer contained 42.1 atomic % of Zn, 9.7 atomic % of Si, 18.4 atomic % of O and 29.8 atomic % of S.

Then, similarly to the manner of forming the first intermediate layer on the first recording layer, a second intermediate layer having a thickness of 15 μm was formed by the sputtering process on the second recording layer and similarly to the manner of forming the second recording layer on the first intermediate layer, a third recording layer having a thickness of 12 nm was formed by the sputtering process on the second intermediate layer.

The ratio D3/D2 of the thickness D3 of the third recording layer to the thickness D2 of the second recording layer was 0.57.

Further, similarly to the manner of forming the first intermediate layer on the first recording layer, a third intermediate layer having a thickness of 15 μm was formed by the sputtering process on the second recording layer and similarly to the manner of forming the second recording layer on the first intermediate layer, a fourth recording layer having a thickness of 10.8 nm was formed by the sputtering process on the third intermediate layer.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #51 was fabricated.

Then, an optical recording disk sample #52 was fabricated in the manner of fabricating the optical recording disk sample #51 except that the third recording layer was formed so that it had a thickness D3 of 14 nm and the ratio D3/D2 of the thickness D3 thereof to the thickness D2 of the second recording layer was 0.66.

Further, an optical recording disk sample #53 was fabricated in the manner of fabricating the optical recording disk sample #51 except that the third recording layer was formed so that it had a thickness D3 of 16 nm and the ratio D3/D2 of the thickness D3 thereof to the thickness D2 of the second recording layer was 0.75.

Then, an optical recording disk sample #54 was fabricated in the manner of fabricating the optical recording disk sample #51 except that the third recording layer was formed so that it had a thickness D3 of 19 nm and the ratio D3/D2 of the thickness D3 thereof to the thickness D2 of the second recording layer was 0.90.

Further, an optical recording disk comparative sample #14 was fabricated in the manner of fabricating the optical recording disk sample #51 except that the third recording layer was formed so that it had a thickness D3 of 10 nm and the ratio D3/D2 of the thickness D3 thereof to the thickness D2 of the second recording layer was 0.47.

Further, an optical recording disk comparative sample #15 was fabricated in the manner of fabricating the optical recording disk sample #51 except that the third recording layer was formed so that it had a thickness D3 of 21 nm and the ratio D3/D2 of the thickness D3 thereof to the thickness D2 of the second recording layer was 0.99.

Further, similarly to in Working Example 10, the optical recording disk samples #51 to #54 and the optical recording disk comparative samples #14 to #15 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 15.

TABLE 15

|  | D3/D2 | R3 (%) | R2 (%) | R1 (%) | R0 (%) | difference in reflection coefficients (%) |
| --- | --- | --- | --- | --- | --- | --- |
| sample #51 | 0.57 | 4.0 | 3.1 | 4.3 | 4.3 | 1.2 |
| sample #52 | 0.66 | 4.0 | 4.0 | 4.0 | 4.0 | 0.0 |
| sample #53 | 0.75 | 4.0 | 4.8 | 3.7 | 3.7 | 1.1 |
| sample #54 | 0.90 | 4.0 | 6.1 | 3.3 | 3.3 | 2.8 |

TABLE 15-continued

|  | D3/D2 | R3 (%) | R2 (%) | R1 (%) | R0 (%) | difference in reflection coefficients (%) |
|---|---|---|---|---|---|---|
| comparative sample #14 | 0.47 | 4.0 | 2.3 | 4.7 | 4.7 | 2.4 |
| comparative sample #15 | 0.99 | 4.0 | 6.9 | 3.1 | 3.1 | 3.8 |

As shown in Table 15, in the case where the second recording layer, the third recording layer and the fourth recording layer were formed using the target consisting of the mixture of ZnS and $SiO_2$ and the target consisting of Zn, it was found that in the optical recording disk samples #51 to #54 in each of which the ratio D3/D2 of the thickness D3 of the third recording layer to the thickness D2 of the second recording layer was 0.57 to 0.90, the reflective coefficient R0 of the first recording layer, the reflective coefficient R1 of the second recording layer, the reflective coefficient R2 of the third recording layer and the reflective coefficient R3 of the fourth recording layer of each optical recording disk sample exceeded 3% and were sufficiently high. Further, it was found that the differences in reflective coefficients of the optical recording disk samples #51 to #54 were 1.2%, 0.0%, 1.1% and 2.8%, respectively, and lower than 3.0%, and that the reflective coefficient R0 of the first recording layer, the reflective coefficient R1 of the second recording layer, the reflective coefficient R2 of the third recording layer and the reflective coefficient R3 of the fourth recording layer of each optical recording disk sample were substantially equal to each other.

To the contrary, it was found that in the optical recording disk comparative samples #14 and #15 in each of which the ratio D3/D2 of the thickness D3 of the third recording layer to the thickness D2 of the second recording layer was outside of the range of 0.57 to 0.90, the reflection coefficient R2 of the third recording layer of the optical recording disk comparative sample #14 was lower than 3% and the difference in reflection coefficients of the optical recording disk comparative sample #15 was 3.8% and exceeded 3%. Therefore, it was found that the reflective coefficient R0 of the first recording layer, the reflective coefficient R1 of the second recording layer, the reflective coefficient R2 of the third recording layer and the reflective coefficient R3 of the fourth recording layer of each optical recording disk comparative sample were different from each other.

Working Example 16

An optical recording disk sample #55 was fabricated in the manner of fabricating the optical recording disk sample #51 except that the third recording layer and the fourth recording layer were formed so that the thickness D3 of the third recording layer was equal to 14 nm and that the thickness D4 of the fourth recording layer was equal to 9 nm.

The ratio D4/D2 of the thickness D4 of the fourth recording layer to the thickness D2 of the second recording layer of the optical recording disk sample #55 was 0.42.

Then, an optical recording disk sample #56 was fabricated in the manner of fabricating the optical recording disk sample #55 except that the fourth recording layer was formed so that it had a thickness D4 of 11 nm and the ratio D4/D2 of the thickness D4 thereof to the thickness D2 of the second recording layer was 0.52.

Further, an optical recording disk sample #57 was fabricated in the manner of fabricating the optical recording disk sample #55 except that the fourth recording layer was formed so that it had a thickness D4 of 14.5 nm and the ratio D4/D2 of the thickness D4 thereof to the thickness D2 of the second recording layer was 0.68.

Then, an optical recording disk comparative sample #16 was fabricated in the manner of fabricating the optical recording disk sample #55 except that the fourth recording layer was formed so that it had a thickness D4 of 8 nm and the ratio D4/D2 of the thickness D4 thereof to the thickness D2 of the second recording layer was 0.38.

Further, an optical recording disk comparative sample #17 was fabricated in the manner of fabricating the optical recording disk sample #55 except that the fourth recording layer was formed so that it had a thickness D4 of 16 nm and the ratio D4/D2 of the thickness D4 thereof to the thickness D2 of the second recording layer was 0.75.

Then, similarly to in Working Example 10, the optical recording disk samples #55 to #57 and the optical recording disk comparative samples #16 and #17 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 16.

TABLE 16

|  | D4/D2 | R3 (%) | R2 (%) | R1 (%) | R0 (%) | difference in reflection coefficients (%) |
|---|---|---|---|---|---|---|
| sample #55 | 0.42 | 3.0 | 4.3 | 4.3 | 4.3 | 1.3 |
| sample #56 | 0.52 | 4.2 | 3.9 | 4.0 | 4.0 | 0.3 |
| sample #57 | 0.68 | 6.4 | 3.5 | 3.5 | 3.5 | 2.9 |
| comparative sample #16 | 0.38 | 2.7 | 4.4 | 4.4 | 4.4 | 1.7 |
| comparative sample #17 | 0.75 | 7.5 | 3.2 | 3.3 | 3.3 | 4.3 |

As shown in Table 16, in the case where the second recording layer, the third recording layer and the fourth recording layer were formed 15 using the target consisting of the mixture of ZnS and $SiO_2$ and the target consisting of Zn, it was found that in the optical recording disk samples #55 to #57 in each of which the ratio D4/D2 of the thickness D4 of the fourth recording layer to the thickness D2 of the second recording layer was 0.42 to 0.68, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #55 to #57 were 1.3%, 0.3% and 2.9%, respectively, and lower than 3.0%, and that the reflection coefficient R0 of the first recording layer, the reflection coefficient R1 of the second recording layer, the reflection coefficient R2 of the third recording layer and the reflection coefficient R03 of the fourth recording layer of each optical recording disk sample were substantially equal to each other.

To the contrary, it was found that in the optical recording disk comparative samples #16 and #17 in each of which the ratio D4/D2 of the thickness D4 of the fourth recording layer to the thickness D2 of the second recording layer was outside of the range 0.42 to 0.68, the reflection coefficient R3 of the fourth recording layer of the optical recording disk comparative sample #16 was lower than 3% and the difference in reflection coefficients of the optical recording disk comparative sample #17 was 4.3% and exceeded 3%. Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

Working Example 17

Similarly to in Working Example 11, a polycarbonate substrate was fabricated and a first recording layer and a first intermediate layer were sequentially formed on the surface of the polycarbonate substrate.

Then, the polycarbonate substrate formed with the first recording layer and the first intermediate layer on the surface thereof was set on the sputtering apparatus and a second recording layer having a thickness of 21.2 nm was formed by the sputtering process using a mixture target consisting of the mixture of $SiO_2$, $Si_3N_4$ and $La_2O_3$ and a target consisting of Mg.

The mole ratio of $SiO_2$, $Si_3N_4$ and $La_2O_3$ contained in the target was 30:50:20.

The composition of the second recording layer was measured similarly to in Working Example 1. It was found that the second recording layer contained 6.2 atomic % of La, 24.1 atomic % of Si, 23.1 atomic % of Mg, 24.6 atomic % of O and 22.0 atomic % of N.

Then, similarly to the manner of forming the first intermediate layer on the first recording layer, a second intermediate layer having a thickness of 15 μm was formed by the sputtering process on the second recording layer and similarly to the manner of forming the second recording layer on the first intermediate layer, a third recording layer having a thickness of 20 nm was formed by the sputtering process on the second intermediate layer.

The ratio D3/D2 of the thickness D3 of the third recording layer to the thickness D2 of the second recording layer was 0.50.

Further, similarly to the manner of forming the first intermediate layer on the first recording layer, a third intermediate layer having a thickness of 15 μm was formed by the sputtering process on the second recording layer and similarly to the manner of forming the second recording layer on the first intermediate layer, a fourth recording layer having a thickness of 19 nm was formed by the sputtering process on the third intermediate layer.

Finally, the fourth recording layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 70 μm.

Thus, the optical recording disk sample #58 was fabricated.

Then, an optical recording disk sample #59 was fabricated in the manner of fabricating the optical recording disk sample #58 except that the third recording layer was formed so that it had a thickness D3 of 25 nm and the ratio D3/D2 of the thickness D3 thereof to the thickness D2 of the second recording layer was 0.63.

Further, an optical recording disk sample #60 was fabricated in the manner of fabricating the optical recording disk sample #58 except that the third recording layer was formed so that it had a thickness D3 of 30 nm and the ratio D3/D2 of the thickness D3 thereof to the thickness D2 of the second recording layer was 0.75.

Then, an optical recording disk sample #61 was fabricated in the manner of fabricating the optical recording disk sample #58 except that the third recording layer was formed so that it had a thickness D3 of 37 nm and the ratio D3/D2 of the thickness D3 thereof to the thickness D2 of the second recording layer was 0.93.

Further, an optical recording disk comparative sample #18 was fabricated in the manner of fabricating the optical recording disk sample #58 except that the third recording layer was formed so that it had a thickness D3 of 13 nm and the ratio D3/D2 of the thickness D3 thereof to the thickness D2 of the second recording layer was 0.33.

Then, an optical recording disk comparative sample #19 was fabricated in the manner of fabricating the optical recording disk sample #58 except that the third recording layer was formed so that it had a thickness D3 of 42 nm and the ratio D3/D2 of the thickness D3 thereof to the thickness D2 of the second recording layer was 1.05.

Further, similarly to in Working Example 10, the optical recording disk samples #58 to #61 and the optical recording disk comparative samples #18 to #19 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 17.

TABLE 17

|  | D3/D2 | R3 (%) | R2 (%) | R1 (%) | R0 (%) | difference in reflection coefficients (%) |
|---|---|---|---|---|---|---|
| sample #58 | 0.50 | 4.1 | 3.1 | 4.3 | 4.3 | 1.2 |
| sample #59 | 0.63 | 4.1 | 4.2 | 3.9 | 4.0 | 0.3 |
| sample #60 | 0.75 | 4.1 | 5.2 | 3.6 | 3.6 | 1.6 |
| sample #61 | 0.93 | 4.1 | 6.1 | 3.2 | 3.3 | 2.9 |
| comparative sample #18 | 0.33 | 4.1 | 1.5 | 5.0 | 5.0 | 3.5 |
| comparative sample #19 | 1.05 | 4.1 | 6.5 | 3.1 | 3.1 | 3.4 |

As shown in Table 17, in the case where the second recording layer, the third recording layer and the fourth recording layer were formed using the target consisting of the mixture of $SiO_2$, $Si_3N_4$ and $La_2O_3$ and the target consisting of Mg, it was found that in the optical recording disk samples #58 to #61 in each of which the ratio D3/D2 of the thickness D3 of the third recording layer to the thickness D2 of the second recording layer was 0.50 to 0.95, the reflective coefficient R0 of the first recording layer, the reflective coefficient R1 of the second recording layer, the reflective coefficient R2 of the third recording layer and the reflective coefficient R3 of the fourth recording layer of each optical recording disk sample exceeded 3% and were sufficiently high. Further, it was found that the differences in reflective coefficients of the optical recording disk samples #58 to #61 were 1.2%, 0.3%, 1.6% and 2.9%, respectively, and lower than 3.0%, and that the reflective coefficient R0 of the first recording layer, the reflective coefficient R1 of the second recording layer, the reflective coefficient R2 of the third recording layer and the reflective coefficient R3 of the fourth recording layer of each optical recording disk sample were substantially equal to each other.

To the contrary, it was found that in the optical recording disk comparative samples #18 and #19 in each of which the ratio D3/D2 of the thickness D3 of the third recording layer to the thickness D2 of the second recording layer was outside of the range of 0.50 to 0.95, the reflection coefficient R2 of the third recording layer of the optical recording disk comparative sample #18 was lower than 3% and the differences in reflection coefficients of the optical recording disk comparative samples #18 and #19 were 3.5% and exceeded 3.4%. Therefore, it was found that the reflective coefficient R0 of the first recording layer, the reflective 15 coefficient R1 of the second recording layer, the reflective coefficient R2 of the third recording layer and the reflective coefficient R3 of the fourth recording layer of each optical recording disk comparative sample were different from each other.

Working Example 18

An optical recording disk sample #62 was fabricated in the manner of fabricating the optical recording disk sample #58 except that the third recording layer and the fourth recording layer were formed so that the thickness D3 of the third recording layer was equal to 24 nm and that the thickness D4 of the fourth recording layer was equal to 16 nm.

The ratio D4/D2 of the thickness D4 of the fourth recording layer to the thickness D2 of the second recording layer of the optical recording disk sample #62 was 0.40.

Then, an optical recording disk sample #63 was fabricated in the manner of fabricating the optical recording disk sample #62 except that the fourth recording layer was formed so that it had a thickness D4 of 19 nm and the ratio D4/D2 of the thickness D4 thereof to the thickness D2 of the second recording layer was 0.48.

Further, an optical recording disk sample #64 was fabricated in the manner of fabricating the optical recording disk sample #62 except that the fourth recording layer was formed so that it had a thickness D4 of 22 nm and the ratio D4/D2 of the thickness D4 thereof to the thickness D2 of the second recording layer was 0.55.

Then, an optical recording disk sample #65 was fabricated in the manner of fabricating the optical recording disk sample #62 except that the fourth recording layer was formed so that it had a thickness D4 of 26 nm and the ratio D4/D2 of the thickness D4 thereof to the thickness D2 of the second recording layer was 0.65.

Further, an optical recording disk comparative sample #20 was fabricated in the manner of fabricating the optical recording disk sample #62 except that the fourth recording layer was formed so that it had a thickness D4 of 13 nm and the ratio D4/D2 of the thickness D4 thereof to the thickness D2 of the second recording layer was 0.33.

Then, an optical recording disk comparative sample #21 was fabricated in the manner of fabricating the optical recording disk sample #62 except that the fourth recording layer was formed so that it had a thickness D4 of 30 nm and the ratio D4/D2 of the thickness D4 thereof to the thickness D2 of the second recording layer was 0.75.

Then, similarly to in Working Example 10, the optical recording disk samples #62 to #65 and the optical recording disk comparative samples #20 and #21 were sequentially set in the above mentioned optical recording medium evaluation apparatus and a laser beam having a wavelength of 405 nm was projected onto the first recording layer, the second recording layer and the third recording layer of each of the samples, whereby the reflection coefficient R0 of the first recording layer, the reflection coefficient R1 of the second recording layer, the reflection coefficient R2 of the third recording layer and the reflection coefficient R3 of the fourth recording layer thereof were measured and the difference in reflection coefficients thereof was calculated.

The results of the measurement and the calculation are shown in Table 18.

TABLE 18

|  | D4/D2 | R3 (%) | R2 (%) | R1 (%) | R0 (%) | difference in reflection coefficients (%) |
|---|---|---|---|---|---|---|
| sample #62 | 0.40 | 3.1 | 4.2 | 4.3 | 4.3 | 1.2 |
| sample #63 | 0.48 | 4.1 | 4.0 | 4.0 | 4.0 | 0.1 |
| sample #64 | 0.55 | 5.1 | 3.7 | 3.8 | 3.8 | 1.3 |
| sample #65 | 0.65 | 6.3 | 3.5 | 3.5 | 3.5 | 2.9 |
| comparative sample #20 | 0.33 | 2.2 | 4.5 | 4.5 | 4.5 | 2.3 |
| comparative sample #21 | 0.75 | 7.4 | 3.3 | 3.3 | 3.3 | 4.2 |

As shown in Table 18, in the case where the second recording layer, the third recording layer and the fourth recording layer were formed using the target consisting of the mixture of $SiO_2$, $Si_3N_4$ and $La_2O_3$ and the target consisting of Mg, it was found that in the optical recording disk samples #62 to #65 in each of which the ratio D4/D2 of the thickness D4 of the fourth recording layer to the thickness D2 of the second recording layer was 0.40 to 0.65, the reflection coefficient R0 of the first recording layer, the reflection coefficient R1 of the second recording layer, the reflection coefficient R2 of the third recording layer and the reflection coefficient R3 of the fourth recording layer of each optical recording disk sample exceeded 3% and were sufficiently high. Further, it was found that the differences in reflection coefficients of the optical recording disk samples #62 to #65 were 1.2%, 0.1%, 1.3% and 2.9%, respectively, and lower than 3.0%, and that the reflection coefficient R0 of the first recording layer, the reflection coefficient R1 of the second recording layer, the reflection coefficient R2 of the third recording layer and the reflection coefficient R3 of the fourth recording layer of each optical recording disk sample were substantially equal to each other.

To the contrary, it was found that in the optical recording disk comparative samples #20 and #21 in each of which the ratio D4/D2 of the thickness D4 of the fourth recording layer to the thickness D2 of the second recording layer was outside of the range 0.40 to 0.65, the reflection coefficient R3 of the fourth recording layer of the optical recording disk comparative sample #20 was lower than 3% and the difference in reflection coefficients of the optical recording disk comparative sample #21 was 4.2% and exceeded 3%. Therefore, it was found that the reflection coefficient R0 of the first recording layer, the reflection coefficient R1 of the second recording layer, the reflection coefficient R2 of the third recording layer and the reflection coefficient R3 of the fourth recording layer of each optical recording disk comparative sample were different from each other.

The present invention has thus been shown and described with reference to specific embodiments and working examples. However, it should be noted that the present invention is in no way limited to the details of the described arrangements but changes and modifications may be made without departing from the scope of the appended claims.

For example, in the above described embodiments, each of the second recording layer 30, the third recording layer 40 and the fourth recording layer 50 of the optical recording medium 10, 100 is formed by a vapor growth process such as the sputtering process using a target consisting of the mixture of ZnS and $SiO_2$ and a target consisting of at least one metal selected from the group consisting of Mg, Al and Ti. However, it is not absolutely necessary for each of the second recording layer 30, the third recording layer 40 and the fourth recording layer 50 of the optical recording medium 10, 100 to be formed by a vapor growth process such as the sputtering process using a target consisting of the mixture of ZnS and $SiO_2$ and a target consisting of at least one metal selected from the group consisting of Mg, Al and Ti, and each of the second recording layer 30, the third recording layer 40 and the fourth recording layer 50 of the optical recording medium 10, 100 may be formed by a vapor growth process such as the sputtering process using a target containing a mixture of ZnS and $SiO_2$ as a primary component and a target containing at least one metal selected from the group consisting of Mg, Al and Ti as a primary component.

Further, in the above described embodiments, each of the second recording layer 30, the third recording layer 40 and the fourth recording layer 50 of the optical recording medium 10, 100 is formed by a vapor growth process such as the sputtering process using a target consisting of the mixture of ZnS and $SiO_2$ and a target consisting of at least one metal selected from the group consisting of Mg, Al and Ti and as a result, each of the second recording layer 30, the third recording layer 40 and the fourth recording layer 50 of the optical recording medium 10, 100 contains Zn, Si, O and S as a primary component and at least one metal selected from the group consisting of Mg, Al and Ti as an additive. However, it is not absolutely necessary for each of the second recording layer 30, the third recording layer 40 and the fourth recording layer 50 of the optical recording medium 10, 100 to be formed by a vapor growth process such as the sputtering process using a target consisting of the mixture of ZnS and $SiO_2$ and a target consisting of at least one metal selected from the group consisting of Mg, Al and Ti and each of the second recording layer 30, the third recording layer 40 and the fourth recording layer 50 of the optical recording medium 10, 100 can be formed by a vapor growth process such as the sputtering process using a target consisting of a mixture of $La_2O_3$, $SiO_2$ and $Si_3N_4$ as a primary component and a target containing at least one metal selected from the group consisting of Mg, Al and Ti as a primary component. In the case where each of the second recording layer 30, the third recording layer 40 and the fourth recording layer 50 of the optical recording medium 10, 100 is formed in this manner, each of the second recording layer 30, the third recording layer 40 and the fourth recording layer 50 contains La, Si, O and S as a primary component and at least one metal selected from the group consisting of Mg, Al and Ti as an additive.

Furthermore, in the above described embodiments, although the second recording layer 30, the third recording layer 40 and the fourth recording layer 50 of the optical recording medium 10, 100 have the same composition, it is sufficient for differences in the contents of one metal selected from the group consisting of Zn, Si, O and S to be equal to or smaller than 5 atomic % and it is not absolutely necessary for the second recording layer 30, the third recording layer 40 and the fourth recording layer 50 of the optical recording medium 10, 100 to have the same composition.

Further, although each of the second recording layer 30 and the third recording layer 40 of the optical recording medium 10 contains Zn, Si, O and S as a primary component and at least one metal selected from the group consisting of Mg, Al and Ti as an additive in the embodiment shown in FIGS. 1 and 2, it is not absolutely necessary for each of the second recording layer 30 and the third recording layer 40 of the optical recording medium 10 to contain Zn, Si, O and S as a primary component and at least one metal selected from the group consisting of Mg, Al and Ti as an additive. It is sufficient for at least one of the second recording layer 30 and the third recording layer 40 of the optical recording medium 10 to contain at least one metal M selected from the group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M and at least one of the second recording layer 30 and the third recording layer 40 of the optical recording medium 10 may contain at least one metal selected from the group consisting of Ni, Cu, Si, Ti, Ge, Zr, Nb, Mo, In, Sn, W, Pb, Bi, Zn and La and at least one element selected from the group consisting of S, O, C and N as a primary component and at least one metal selected from the group consisting of Mg, Al and Ti as an additive.

Furthermore, although each of the second recording layer 30, the third recording layer 40 and the fourth recording layer 50 of the optical recording medium 100 contains Zn, Si, O and S as a primary component and at least one metal selected from the group consisting of Mg, Al and Ti as an additive in the embodiment shown in FIGS. 12 and 13, it is not absolutely necessary for each of the second recording layer 30, the third recording layer 40 and the fourth recording layer 50 of the optical recording medium 100 to contain Zn, Si, O and S as a primary component and at least one metal selected from the group consisting of Mg, Al and Ti as an additive. It is sufficient for at least one of the second recording layer 30, the third recording layer 40 and the fourth recording layer 50 of the optical recording medium 100 to contain at least one metal M selected from the group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M and at least one of the second recording layer 30, the third recording layer 40 and the fourth recording layer 50 of the optical recording medium 100 may contain at least one metal selected from the group consisting of Ni, Cu, Si, Ti, Ge, Zr, Nb, Mo, In, Sn, W, Pb, Bi, Zn and La and at least one element selected from the group consisting of S, O, C and N as a primary component and at least one metal selected from the group consisting of Mg, Al and Ti as an additive.

Moreover, in the above described embodiments, although each of the second recording layer 30, the third recording layer 40 and the fourth recording layer 50 of the optical recording medium 10, 100 is formed using a target consisting of at least one metal selected from the group consisting of Mg, Al and Ti, each of the second recording layer 30, the third recording layer 40 and the fourth recording layer 50 of the optical recording medium 10, 100 may be formed using a target containing Zn or La as a primary component.

Further, in the above described embodiments, although the first recording layer 20 of the optical recording medium 10, 100 includes the first recording film 23a containing Cu as a primary component and the second recording film 23b containing Si as a primary component, it is not absolutely necessary for the first recording layer 20 of the optical recording medium 10, 100 to include the first recording film 23a containing Cu as a primary component and the second recording film 23b containing Si as a primary component. The first recording layer 20 of the optical recording medium 10, 100 may be formed so as to contain at least one metal selected from the group consisting of Ni, Cu, Si, Ti, Ge, Zr, Nb, Mo, In, Sn, W, Pb, Bi, Zn and La and at least one element selected from the group consisting of S, O, C and N as a primary component and at least one metal selected from the group consisting of Mg, Al and Ti as an additive and further, the first recording layer 20 of the optical recording medium 10, 100 may be formed so as to contain at least one metal M selected from the group consisting of Ni, Cu, Si, Ti, Ge, Zr, Nb, Mo, In, Sn, W, Pb, Bi, Zn and La and an element X which can combine with the metal M upon being irradiated with a laser beam for recording data, thereby forming a crystal of a compound of the element X with the metal M.

Furthermore, in the above described embodiments, although the first recording layer 20 of the optical recording medium 10, 100 includes the first recording film 23a containing Cu as a primary component and the second recording film 23b containing Si as a primary component, instead of the first recording layer 20, the support substrate 11 or the first intermediate layer 12 can be utilized as a recording layer adapted to enable only data reading by forming pits on the surface of the support substrate 11 or the first intermediate layer 12 and recording data therein.

Moreover, in the above described embodiments, although the optical recording medium 10, 100 includes the light transmission layer 15, instead of the light transmission layer 15, a hard coat layer containing a hard coat composition as a primary component may be formed or a hard coat layer containing a hard coat composition as a primary component may be formed on the light transmission layer 15. Furthermore, it is possible to add a lubricant to the hard coat layer or to form a lubricant layer on the hard coat layer, thereby causing the surface of the optical recording medium to have a lubricating property and a resistance to contamination.

Further, although the laser beam L is projected via the light transmission layer 15 onto the first recording layer 20, the second recording layer 30 and the third recording layer 40 in the embodiment shown in FIGS. 1 and 2 and the laser beam L is projected via the light transmission layer 15 onto the first recording layer 20, the second recording layer 30, the third recording layer 40 and the fourth recording layer 50, the present invention is not limited to an optical recording medium having such a configuration and the optical recording medium may include two or more recording layers between a substrate formed of a light transmittable material and a protective layer and be constituted so that a laser beam L is projected onto the recording layers via the substrate.

According to the present invention, it is possible to provide an optical recording medium which includes a plurality of recording layers and in which data can be recorded in and reproduced from a farthest recording layer from a light incidence plane in a desired manner and data can be recorded in and data can be reproduced from recording layer(s) other than the farthest recording layer from the light incidence plane in a desired manner.

The invention claimed is:

1. An optical recording medium comprising a substrate, a light transmission layer, and a plurality of recording layers laminated via at least intermediate layers and disposed between the light transmission layer and the substrate, the recording layers constituted so that a laser beam is projected onto the plurality of recording layers via the light transmission layer, at least one of the recording layers other than a recording layer farthest from the light transmission layer among the plurality of recording layers containing at least one element M selected from a group consisting of Ni, Cu, Si, Ti, Ge, Zr, Nb, Mo, In, Sn, W, Pb, Bi, Zn and La, at least one element selected from a group consisting of S, O, C and N as a primary component, and at least one metal different from the element M and selected from a group consisting of Mg, Al and Ti, wherein the at least one recording layers contains the at least one element selected from the group consisting of S, O, C and N and the at least one metal different from the element M and selected from the group consisting of Mg, Al and Ti in a form of a chemical compound thereof, and wherein the at least one element selected from the group consisting of S, O, C and N and the at least one element M are combined upon being irradiated with the laser beam to form a crystal of a chemical compound thereof, thereby recording information in the at least one recording layer.

2. An optical recording medium in accordance with claim 1, wherein all of the recording layers other than the farthest recording layer from the light transmission layer among the plurality of recording layers contain at least one element selected from the group consisting of Ni, Cu, Si, Ti, Ge, Zr, Nb, Mo, In, Sn, W, Pb, Bi, Zn and La and at least one element selected from the group consisting of S, O, C and N as a primary component, and at least one metal different from the element M and selected from the group consisting of Mg, Al and Ti, wherein the at least one recording layers contains the elements selected from a group consisting of S, O, C and N and the at least one metal different from the element M and selected from the group consisting of Mg, Al and Ti in a form of a compound thereof, and wherein the at least one recording layers is constituted so that information is recorded therein upon being irradiated with the laser beam.

3. An optical recording medium in accordance with claim 2, wherein all of the recording layers other than the farthest recording layer from the light transmission layer are formed in such a manner that the recording layers closer to the light transmission layer are thinner.

4. An optical recording medium in accordance with claim 3, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component and a target containing at least one metal selected from a group consisting of Mg, Al and Ti as a primary component.

5. An optical recording medium in accordance with claim 4, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing a mixture of ZnS and $SiO_2$ or a mixture of $La_2O_3$, $SiO_2$ and $Si_3N_4$ as a primary component and a target containing at least one metal selected from a group consisting of Mg, Al and Ti as a primary component.

6. An optical recording medium in accordance with claim 3, which comprises a first recording layer, a second recording layer and a third recording layer on the substrate in this order and the first recording layer, the second recording layer and the third recording layer are formed so that the second recording layer has a thickness of 15 nm to 50 nm and that a ratio of the thickness of the third recording layer to the thickness of the second recording layer is 0.40 to 0.70.

7. An optical recording medium in accordance with claim 3, which comprises a first recording layer, a second recording layer, a third recording layer and a fourth recording layer on the substrate in this order and the first recording layer, the second recording layer, the third recording layer and the fourth recording layer are formed so that the second recording layer has a thickness of 20 nm to 50 nm, that a ratio of the thickness of the third recording layer to the thickness of the second recording layer is 0.48 to 0.93 and that a ratio of the thickness of the fourth recording layer to that of the second recording layer is 0.39 to 0.70.

8. An optical recording medium in accordance with claim 2, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component and a target containing at least one metal selected from a group consisting of Mg, Al and Ti as a primary component.

9. An optical recording medium in accordance with claim 8, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing a mixture of ZnS and $SiO_2$ or a mixture of $La_2O_3$, $SiO_2$ and $Si_3N_4$ as a primary component and a target containing at least one metal selected from a group consisting of Mg, Al and Ti as a primary component.

10. An optical recording medium in accordance with claim 1, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component and a target containing at least one metal selected from a group consisting of Mg, Al and Ti as a primary component.

11. An optical recording medium in accordance with claim 10, wherein the recording layer containing at least one element selected from a group consisting of Ni, Cu, Si, Ti, Ge, Zr, Nb, Mo, In, Sn, W, Pb, Bi, Zn and La and at least one element selected from a group consisting of S, O, C and N as a primary component, and at least one metal different from the element M and selected from a group consisting of Mg, Al and Ti is formed by a vapor growth process using a target containing a mixture of ZnS and $SiO_2$ or a mixture of $La_2O_3$, $SiO_2$ and $Si_3N_4$ as a primary component and a target containing at least one metal selected from a group consisting of Mg, Al and Ti as a primary component.

12. An optical recording medium in accordance with claim 1, wherein the recording layer farthest from a light incidence plane among the plurality of recording layers includes a first recording film containing Cu as a primary component and a second recording film containing Si as a primary component.

13. An optical recording medium in accordance with claim 1, wherein the plurality of recording layers are constituted so that data can be recorded therein and data can be reproduced therefrom using a laser beam having a wavelength of 380 nm to 450 nm.

* * * * *